United States Patent
Arima et al.

(10) Patent No.: US 7,483,094 B2
(45) Date of Patent: Jan. 27, 2009

(54) OPTICAL SHEET, BACKLIGHT AND LIQUID CRYSTAL DISPLAY APPARATUS

(75) Inventors: Mitsuo Arima, Miyagi (JP); Jun Shimizu, Miyagi (JP); Hirokazu Odagiri, Miyagi (JP); Eiji Ohta, Miyagi (JP); Kei Obata, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/598,723

(22) PCT Filed: Sep. 30, 2005

(86) PCT No.: PCT/JP2005/018579

§ 371 (c)(1),
(2), (4) Date: Jun. 12, 2007

(87) PCT Pub. No.: WO2006/036029

PCT Pub. Date: Apr. 6, 2006

(65) Prior Publication Data

US 2007/0242361 A1    Oct. 18, 2007

(30) Foreign Application Priority Data

Sep. 30, 2004    (JP) ............... 2004-288516

(51) Int. Cl.
*G02F 1/1335*    (2006.01)
*G02B 5/02*    (2006.01)

(52) U.S. Cl. ............... 349/95; 349/61; 359/599

(58) Field of Classification Search ......... 349/61–65, 349/95; 359/454, 455, 599, 619, 623; 385/129–132; 362/330, 335, 337, 339
See application file for complete search history.

(56) References Cited

U.S. PATENT DOCUMENTS 7,125,131 B2 * 10/2006 Olczak ............... 362/19

FOREIGN PATENT DOCUMENTS

| JP | 2-214287 | 8/1990 |
|---|---|---|
| JP | 6-301035 | 10/1994 |
| JP | 7-151909 | 6/1995 |
| JP | 9-15730 | 1/1997 |
| JP | 9-21907 | 1/1997 |
| JP | 10-283818 | 1/1998 |

* cited by examiner

*Primary Examiner*—Kevin S Wood
(74) *Attorney, Agent, or Firm*—Bell, Boyd & Lloyd LLP

(57) ABSTRACT

An optical sheet has a large number of cylindrical lens elements provided successively on one of principal faces thereof. The cylindrical lens elements have a hyperboloidal face or a paraboloidal face and have a finite focal distance on the emission side of illumination light. Where a Z axis is taken in parallel to a normal line direction to the optical sheet and an X axis is taken in a direction of the row of the cylindrical lens elements, a cross sectional shape of the cylindrical lens elements satisfies $Z=X^2/(R+\sqrt{R^2-(1+K)X^2})$ (where R is the radius of curvature of a distal end vertex, and K is a conic constant).

35 Claims, 37 Drawing Sheets

FIG.32

| WORKING EXAMPLE | 0.20 μm CONVEX PORTION NUMBER (/mm²) | 0.20 μm CONVEX PORTION DISTANCE (μm) | Rz (μm) | HEIGHT AT CONVEX PORTION 1% AREA (μm) | COEFFICIENT OF DYNAMIC FRICTION (−) | FRONT FACE LUMINANCE RELATIVE VALUE (%) | SLIDING TEST DETERMINATION (−) | PRESENCE/ABSENCE OF EXTERNAL APPEARANCE BLURRING (−) |
|---|---|---|---|---|---|---|---|---|
| 11 | 10 | 318 | 0.6 | 0.269 | 0.30 | 100 | 1 | PRESENCE |
| 12 | 582 | 42 | 23.6 | 10.1 | 0.25 | 68 | 3 | ABSENCE |
| 13 | 61 | 126 | 0.7 | 0.391 | 0.29 | 93 | 1 | PRESENCE |
| 14 | 125 | 90 | 8.2 | 3.456 | 0.25 | 97 | 3 | ABSENCE |
| 15 | 826 | 35 | 16.7 | 7.716 | 0.27 | 65 | 3 | ABSENCE |
| 16 | 362 | 53 | 2.9 | 1.133 | 0.24 | 97 | 2 | ABSENCE |
| 17 | 398 | 46 | 19.3 | 9.63 | 0.25 | 76 | 3 | ABSENCE |
| 18 | 398 | 52 | 5.2 | 1.993 | 0.27 | 94 | 2 | ABSENCE |
| 19 | 76 | 115 | 1.4 | 3.303 | 0.29 | 99 | 2 | ABSENCE |
| 20 | 87 | 108 | 9.5 | 5.312 | 0.26 | 97 | 3 | ABSENCE |
| 21 | 137 | 86 | 5.6 | 3.218 | 0.26 | 86 | 3 | ABSENCE |

FIG.33

| WORKING EXAMPLE | HAZE (%) | $\delta a$ (red) |
|---|---|---|
| 22 | 1 | 0.0023 |
| 23 | 85.5 | 0.4352 |
| 24 | 14.9 | 0.0442 |
| 25 | 13.7 | 0.0733 |
| 26 | 93.2 | 0.4880 |
| 27 | 11 | 0.0522 |
| 28 | 80.7 | 0.3701 |
| 29 | 35.1 | 0.1067 |
| 30 | 5.8 | 0.0245 |
| 31 | 33.6 | 0.1023 |
| 32 | 22.3 | 0.0738 |

OPTICAL SHEET, BACKLIGHT AND LIQUID CRYSTAL DISPLAY APPARATUS

CROSS REFERENCE TO RELATED APPLICATIONS

The present application claims priority to Japanese Patent Document No. P2004-288516 filed on Sep. 30, 2004, the disclosure of which is herein incorporated by reference.

BACKGROUND

This invention relates to an optical sheet for enhancing the directivity of light and a backlight and a liquid crystal display apparatus which include the optical sheet.

In recent years, to a liquid crystal display apparatus which includes a liquid crystal panel, it is a significant subject to enhance the display luminance together with reduction of the power consumption in order to raise the commodity value of the liquid crystal display apparatus. In such a situation as just described, it is demanded strongly to improve the optical gain on the backlight side. Thus, it has been proposed, as a method which satisfies the demand, to provide a liquid crystal display apparatus with a prism sheet which includes a prism array on the emitting side of illumination light (refer to, for example, Japanese Patent No. 3147205).

FIG. 1 shows an external appearance of a conventional prism sheet. FIG. 2 shows a shape of an XZ section of the conventional prism sheet. The prism sheet can separate an incident light ray into a first-order transmission light component T1 which is transmitted directly through a prism lateral face, a return light component R which is reflected by the prism lateral face and then reflected by the other prism lateral face so that it is returned to the incidence side, and a second-order transmission light component T2 which is reflected by the prism lateral face and then transmitted through the other prism lateral face so that it is emitted to a front face of the prism sheet depending upon the incident angle.

The first-order transmission light component T1 is a light flux component which includes light emitted in a front face direction and is utilized effectively. The return light component R is a light flux component which enters and is diffused and reflected by the diffusion sheet, which is regarded as a light emitting face (planar light source), and is effective to increase the luminance of the light emitting face. The second-order transmission light component T2 is a light flux component which is emitted to the wide angle side outside an effective angular field of view of the liquid crystal panel and does not contribute to enhancement of the luminance.

In this manner, the conventional prism sheet refracts and transmits incident light therethrough to condense the incident light in the front face direction thereby to improve the directivity characteristic so as to increase the front face luminance. Further, since reflected light is diffused and scattered by the diffusing sheet which is regarded as a light emitting face (planar light source) to increase the luminance of the light emitting face, the front face luminance increases.

As described above, the conventional prism sheet can separate an incidence light ray into one of the first-order transmission light component T1, second-order transmission light component T2 and return light component R depending upon the incidence angle of the incidence light.

In the conventional prism sheet, as seen in FIG. 2, part of a light flux emitted from an off-axis imaginary light source is totally reflected by one of lateral faces of the prism sheet and re-enters the other lateral face, whereafter it advances in the inside of the sheet and is re-utilized as the return light component R. Or, the part of the light flux is effectively utilized, after multiple reflections thereof, as the first-order transmission light component T1 or as the return light component R to the light source side.

However, some light flux emitted from an off-axis imaginary light source is totally reflected by one of lateral faces of the prism sheet and then is refracted by and transmitted through the other lateral face so that it makes the second-order transmission light component T2 which is emitted to the wide angle side outside the effective angular field of view of the liquid crystal panel. The second-order transmission light component T2 is a light flux component which is ineffective to improvement of the luminance.

Further, depending upon the angle dependent characteristic of a polarized light separation sheet disposed on the succeeding stage, extreme deterioration of the polarized light separation characteristic is sometimes caused by the directivity of incident light, which makes an obstacle to effective luminance enhancement to the liquid crystal panel side.

Further, where the prism sheet described above is interposed between a diffuser and a liquid crystal panel, external appearance blurring appears. Therefore, it is demanded to suppress occurrence of external appearance blurring.

SUMMARY

Accordingly, it is a first object of the present invention to provide an optical sheet which implements a high luminance distribution within a predetermined angular field of view and can suppress appearance of a second-order transmission light component T2 to enhance the luminance and a backlight and a liquid crystal display apparatus which include the optical sheet.

It is a second object of the present invention to provide an optical sheet which implements a high luminance distribution within a predetermined angular field of view and can suppress appearance of a second-order transmission light component T2 to enhance the luminance and besides can suppress, where a prism sheet is provided between a diffuser and a liquid crystal panel, appearance of external appearance blurring and a backlight and a liquid crystal display apparatus which include the optical sheet.

The inventor of the present invention has studied hard in order to solve the subjects described above which the prior art has. An outline is described below.

According to the knowledge of the inventor of the present invention, with a conventional prism sheet, some second order transmission light enters an adjacent prism and hence re-enters the inside of the sheet, and consequently is added to and re-utilized together with return light. Further, some second order transmission light is effectively utilized as first order transmission light or return light to the light source side after multiple reflection. In contrast, some second order transmission light, so-called side robe light, is not utilized effectively. Most of such second order transmission lights are generated when light incident from an oblique direction with respect to a principal surface of a prism sheet is totally reflected by one of faces of a prism and then refracted by and transmitted through the other face of the prism.

Further, according to the knowledge of the inventor, light incident on a portion of the prism in the proximity of a vertex from a direction perpendicular to the principal face of the prism sheet is totally reflected, and therefore, the first order transmission light decreases.

Therefore, the inventor has studied hard with regard to an interface which can forwardly refract and transmit light incident on a portion of a prism in the proximity of a vertex from a direction perpendicular to a principal face of a prism sheet to increase the first order transmission light while it totally reflects light incident from a direction oblique to the principal face of the prism sheet at one face thereof and then totally reflects or refracts and transmits the totally reflected light at the other face thereof to increase the return light. As a result, the inventor has invented an interface wherein a large number of cylindrical lens elements having a hyperboloidal surface or a paraboloidal surface are juxtaposed in a direction perpendicular to a generating line of the cylindrical lens elements.

The present invention has been made based on the studies described above.

In order to solve the subject described above, according to a first aspect of the present invention, there is provided an optical sheet having cylindrical lens elements which have a hyperboloidal face or a paraboloidal face and are provided successively in a row on one of principal faces of the optical sheet, characterized in that, where a Z axis is taken in parallel to a normal line direction to the optical sheet and an X axis is taken in a direction of the row of the cylindrical lens elements, a cross sectional shape of the cylindrical lenses satisfies the following expression:

$$Z = X^2 / (R + \sqrt{(R^2 - (1+K)X^2)})$$

(where R is the radius of curvature of a distal end vertex, and K is a conic constant.)

According to a second aspect of the present invention, there is provided a backlight, characterized in that the backlight comprises:

a light source for emitting illumination light; and an optical sheet for raising the directivity of the illumination light emitted from the light source; that the optical sheet has, provided on one of principal faces thereof, cylindrical lens elements which have a hyperboloidal face or a paraboloidal face and are provided successively in a row; and that, where a Z axis is taken in parallel to a normal line direction to the optical sheet and an X axis is taken in a direction of the row of the cylindrical lens elements, a cross sectional shape of the cylindrical lenses satisfies the following expression:

$$Z = X^2 / (R + \sqrt{(R^2 - (1+K)X^2)})$$

(where R is the radius of curvature of a distal end vertex, and K is a conic constant.)

According to a third aspect of the present invention, there is provided a liquid crystal display apparatus, characterized in that the liquid crystal display apparatus comprises:

a light source for emitting illumination light;

an optical sheet for raising the directivity of the illumination light emitted from the backlight; and a liquid crystal panel for displaying an image based on the illumination light emitted from the optical sheet; that the optical sheet has, provided on one of principal faces thereof, cylindrical lens elements which have a hyperboloidal face or a paraboloidal face and are provided successively in a row; and that, where a Z axis is taken in parallel to a normal line direction to the optical sheet and an X axis is taken in a direction of the row of the cylindrical lens elements, a cross sectional shape of the cylindrical lenses satisfies the following expression:

$$Z = X^2 / (R + \sqrt{(R^2 - (1+K)X^2)})$$

(where R is the radius of curvature of a distal and K is a conic constant.)

In the first, second and third aspects of the present invention, preferably the radius R of curvature, the conic constant K and a configuration unit width D satisfy the following numerical ranges:

0<R<D

−4<K≦−1

In the first, second and third aspects of the present invention, preferably the radius R of curvature and the conic constant K satisfy the following numerical ranges:

0<R<D/2

−3<K≦−1

In the first, second and third aspects of the present invention, preferably the radius R of curvature and the conic constant K satisfy the following numerical ranges:

0<R<2D/5

−3<K≦−1

In the first, second and third aspects of the present invention, preferably convex portions having a height equal to or greater than 0.20 μm from an average central plane are further provided on the other principal face side opposite to the one principal face on which the cylindrical lens elements are provided, and that the density of the convex portions is equal to or higher than 70/mm² but equal to or lower than 400/mm².

In the first, second and third aspects of the present invention, preferably convex portions having a height equal to or greater than 0.20 μm from an average central plane are further provided on the other principal face side opposite to the one principal face on which the cylindrical lens elements are provided, and that the average distance between the convex portions is equal to or greater than 50 μm but equal to or smaller than 120 μm.

In the first, second and third aspects of the present invention, preferably convex portions are further provided on the other principal face side opposite to the one principal face on which the cylindrical lens elements are provided, and that the convex portions are provided such that, in a state wherein the cylindrical lens elements are not formed, the cloudiness degree of the optical sheet is equal to or lower than 60%.

In the first, second and third aspects of the present invention, preferably convex portions are further provided on the other principal face side opposite to the one principal face on which the cylindrical lens elements are provided, and that the convex portions are provided such that, in a state wherein the cylindrical lens elements are not formed, the cloudiness degree of the optical sheet is equal to or lower than 20%.

In the first, second and third aspects of the present invention, preferably convex portions are further provided on the other principal face side opposite to the one principal face on which the cylindrical lens elements are provided, and that the ten-point average roughness SRz of the convex portions is equal to or higher than 1 μm but equal to or lower than 15 μm.

In the first, second and third aspects of the present invention, preferably convex portions are further provided on the other principal face side opposite to the one principal face on which the cylindrical lens elements are provided, and that the height of the convex portions at which the convex portion area occupies 1% is equal to or greater than 1 μm but equal to or smaller than 7 μm.

In the first, second and third aspects of the present invention, preferably convex portions are further provided on the other principal face side opposite to the one principal face on which the cylindrical lens elements are provided, and that the average inclination gradient of the face on the side on which the convex portions are provided is equal to or greater than 0.25.

Since the convex portions are provided on the other principal face on the opposite side to the one principal face on which the cylindrical lens elements are provided, also where the optical sheet is provided on a diffuser, the optical sheet can be preventing from adhering to the diffuser.

According to the present invention, the directivity can be improved to enhance the front face luminance to achieve contribution to the enhancement of the characteristic by the polarized light separation sheet on the succeeding stage. Consequently, the display luminance of the liquid crystal panel can be enhanced together with reduction of the power consumption.

Further, since the second order transmission light flux component T2 to be emitted to the wide angle is reduced, the front face luminance can be enhanced to achieve contribution to the enhancement of the characteristic by the polarized light separation sheet on the succeeding stage. Consequently, the display luminance of the liquid crystal panel can be enhanced together with reduction of the power consumption.

Further, the incident angle of the illumination light flux to the liquid crystal panel itself can be controlled to the normal line direction, and the color separation (blurring in color) on the wide angle side can be controlled.

Further, since the convex portions are provided on the other principal face on the opposite side to the one principal face on which the cylindrical lens elements are provided, where the optical sheet is provided in the liquid crystal display apparatus, appearance of external appearance blurring can be suppressed. Further, since the sliding characteristic can be enhanced, appearance of damage to the rear face of the lens sheet and to another sheet disposed in an opposing relationship to the rear face can be suppressed.

Additional features and advantages of the present invention are described in, and will be apparent from, the following Detailed Description and the Figures.

BRIEF DESCRIPTION OF THE FIGURES

FIG. 32 is a table illustrating a result of evaluation of lens sheets;

FIG. 33 is a table illustrating a result of evaluation of lens sheets;

DETAILED DESCRIPTION

Figure 1:
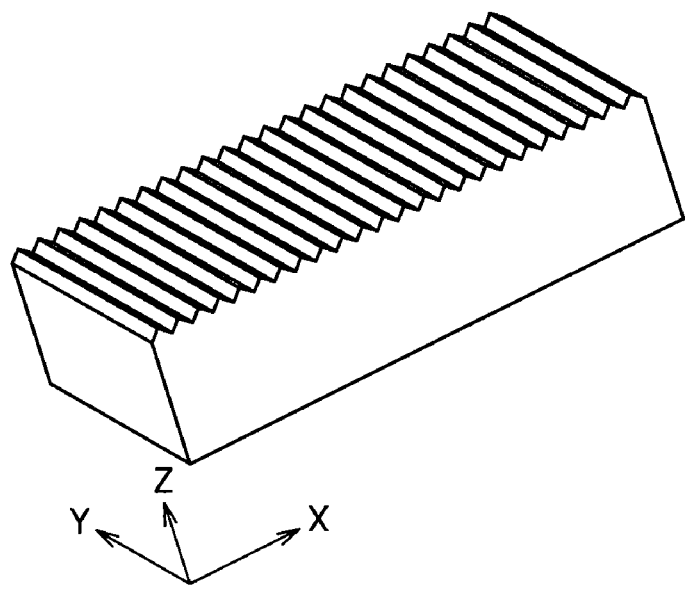
FIG. 1 is a pe-rspective view showing an external appearance of a prism sheet.
Figure 2:
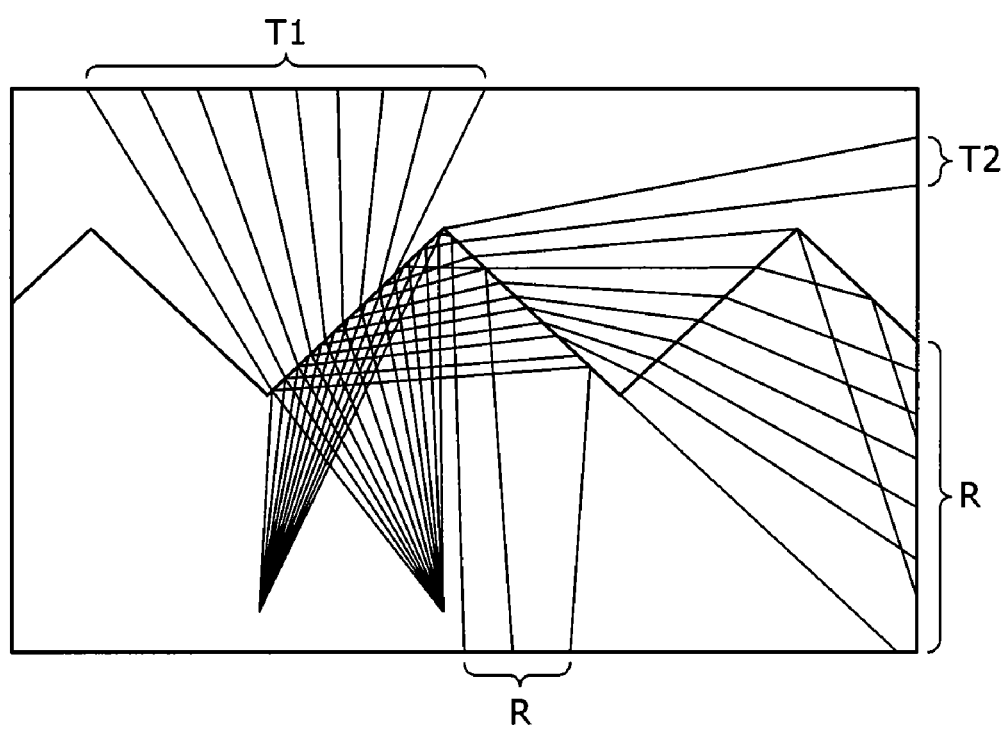
FIG. 2 is a schematic view showing an XZ section of the prism sheet.

In the following, an embodiment of the present invention is described with reference to the drawings. It is to be noted that, in all of the figures of the embodiment described below, like or corresponding elements are denoted by like reference characters.

Configuration of a Liquid Crystal Display Apparatus

Figure 3:
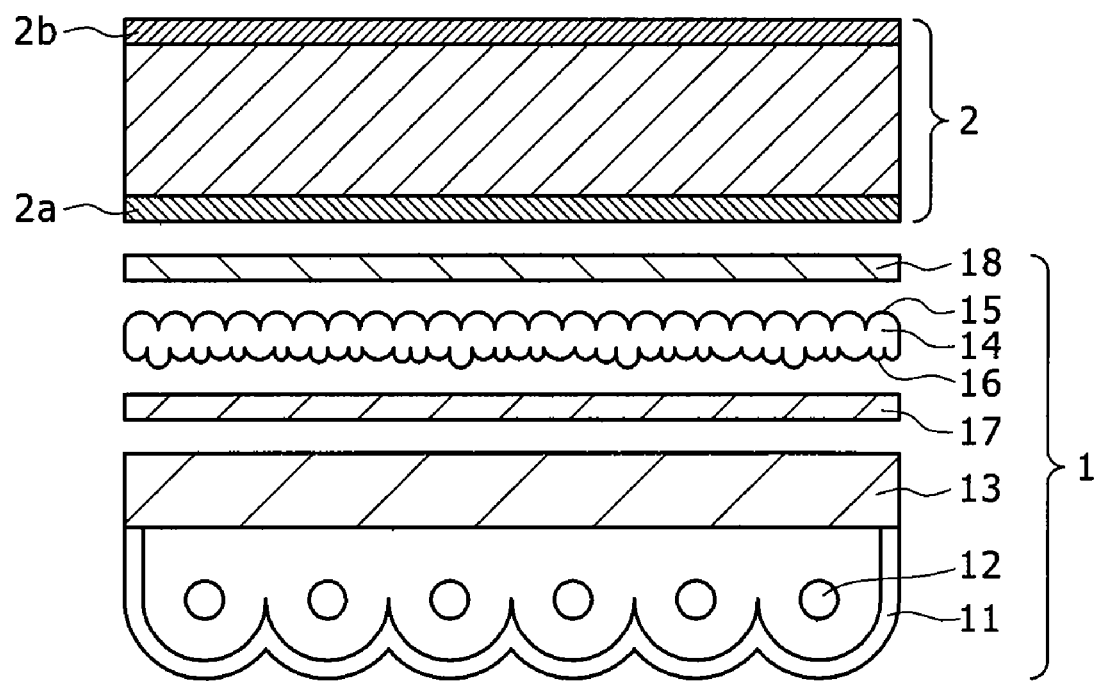
FIG. 3 is a cross sectional view showing an example of a configuration of a liquid crystal display apparatus according to an embodiment of the present invention.

FIG. 3 is a sectional view showing an example of a configuration of a liquid crystal display apparatus according to an embodiment of the present invention. Referring to FIG. 3, the liquid crystal display apparatus includes a backlight 1 and a liquid crystal panel 2. While it is described here that the backlight 1 is of the direct type, the backlight 1 may be of the edge light type (side light type).

The backlight 1 is for supplying light to the liquid crystal panel 2 and is disposed directly below the backlight 1. The liquid crystal panel 2 is for temporally and spatially modulating the light supplied thereto from the backlight 1 to display information. A pair of polarizing plates 2a and 2b are provided on the opposite faces of the liquid crystal panel 2. Each of the polarizing plate 2a and the polarizing plate 2b transmit one of orthogonally polarized light components of incident light therethrough and intercept the other one of the orthogonally polarized light components by absorption. The polarizing plate 2a and the polarizing plate 2b are provided such that, for example, the transmission axes thereof are orthogonal to each other.

As seen in FIG. 3, the backlight 1 includes, for example, a reflecting plate 11, one or a plurality of light sources 12, a diffuser 13, a diffusing sheet 17, a lens sheet 14, and a reflection type polarizer 18. The one or plural light sources 12 are for supplying light to the liquid crystal panel 2 and are each in the form of, for example, a fluorescent lamp (FL), an EL (Electro Luminescence) element or an LED (Light Emitting Diode).

The reflecting plate 11 is provided such that it covers the one or plural light sources 12 from below and sidewardly and is for reflecting light emitted downwardly or sidewardly from the one or plural light sources 12 to direct the light toward the liquid crystal panel 2. It is to be noted that a chassis may be provided in place of the reflecting plate 11.

The diffuser 13 is provided above the one or plural light sources 12 and is for diffusing emitted light from the one or light sources 12 and reflected light from the reflecting plate 11 to make the luminance uniform.

The diffusing sheet 17 is provided on the diffuser 13 and is for at least diffusing the light diffused by the diffuser 17. Further, the diffusing sheet 17 may additionally have a function of condensing light.

The lens sheet 14 which is an example of an optical sheet is provided above the diffuser 13 and is for enhancing the directivity and so forth of illumination light.

The reflection type polarizer 18 is provided on the lens sheet 14 and is for transmitting one of orthogonally polarized light components of the light whose directivity has been enhanced by the lens sheet 14 while reflecting the other one of the orthogonally polarized light components.

In the following, a configuration of the lens sheet 14 described above is described in more detail.

Configuration of the Lens Sheet

Figure 4:
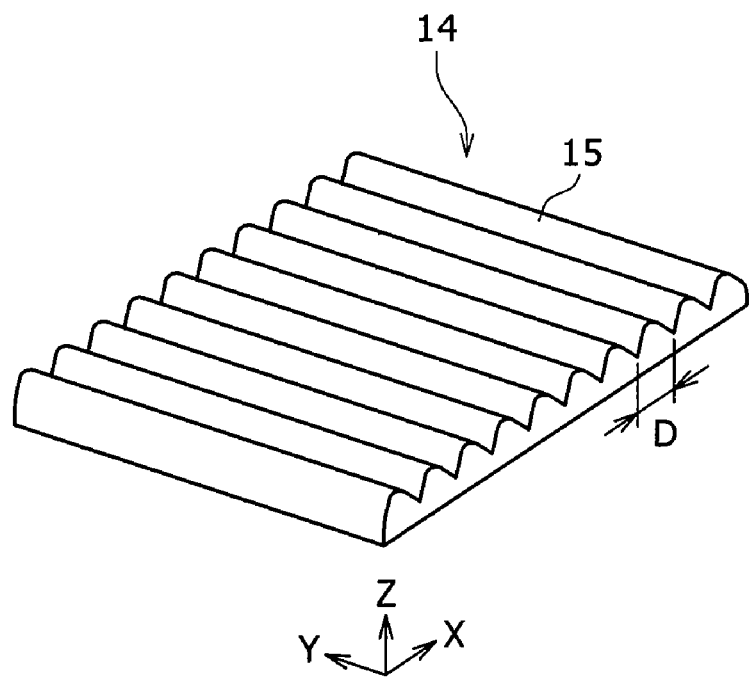
FIG. 4 is a perspective view showing an example of a shape of a lens sheet according to the embodiment of the present invention.

FIG. 4 is a perspective view showing an example of a shape of the lens sheet 14 according to the embodiment of the present invention. Referring to FIG. 4, the lens sheet 14 has a form of a sheet and has, for example, a quadrangular shape as viewed from a principal face side thereof. In the present specification, a sheet includes not only a film-like sheet but also sheets having various forms of thin plates having flexibility or some degree of hardness.

In the following description, one principal face of the lens sheet 14 on the side on which light from the light sources 12 is incident is referred to as rear face, and the other principal face on the side from which light from the light sources 12 is emitted is referred to as front face.

A plurality of convex portions 16 are provided on the rear face side of the lens sheet 14, and a large number of cylindrical lens elements 15 having a leftwardly and rightwardly symmetrical hyperboloidal face or paraboloidal face are juxtaposed in a direction perpendicular to the generating line of the hyperboloidal faces or paraboloidal faces on the front face side of the lens sheet 14. The cylindrical lens elements 15 have one focal distance fa on the side thereof from which light from the light sources 12 is emitted. It is to be noted that, as shown in FIG. 4, an X axis is taken in parallel to the direction of the row of the cylindrical lens elements 15; a Y axis is taken in parallel to the direction of the generating line of the cylindrical lens elements 15; and a Z axis is taken in parallel to the normal line direction to the lens sheet 14.

The width of the cylindrical lens elements 15 provided on the front face side of the lens sheet 14, that is, a configuration unit width (pitch) D, is selected from within a range of 10 to 120 μm, and preferably selected in accordance with pixels of the liquid crystal panel. For example, where the lens sheet 14 is used for a liquid crystal television set or a liquid crystal monitor for a personal computer, the configuration unit width (pitch) D is selected preferably within a range of 50 to 100 μm. On the other hand, where the lens sheet 14 is used for a monitor for a portable apparatus, the configuration unit width D is preferably selected from within another range of 10 to 80 μm.

It is to be noted that the lens sheet 14 is provided between the diffuser 13 and the liquid crystal panel 2 such that the side thereof on which the plural cylindrical lens elements 15 are provided is opposed to the liquid crystal panel 2.

Further, the shape of an XZ section of the cylindrical lens elements 15 satisfies the following expression (1).

$$Z = X^2 / (R + \sqrt{(R^2 - (1+K)X^2)}) \tag{1}$$

where R is the radius of curvature of a distal end vertex, and K is a conic constant. It is to be noted that, in the present specification, "$\sqrt{\phantom{x}}$" signifies a square root of a value determined by a numerical expression following the same.

Where the configuration unit width D in the expression (1) is D=50 μm, preferably the radius R of curvature of the distal end vertex and the conic constant K are set to values within numerical ranges of $0 < R < 50$ μm and $-4 < K \leq -1$, respectively.

On the other hand, where the configuration unit width D in the expression (1) is D=50 μm, the radius R of curvature of the distal end vertex and the conic constant K are preferably set to values within numerical ranges of $0<R<25$ μm and $-3<K\leq-1$, respectively, and more preferably set to values within the numerical ranges of $0<R<20$ μm and $-3<K\leq-1$, respectively.

Where the configuration unit width D is D=20 μm, the radius R of curvature of the distal end vertex and the conic constant K are preferably set to values within numerical ranges of $0<R<20$ μm and $-4<K\leq 1$, respectively, and more preferably set to values within numerical ranges of $0<R<10$ μm and $-3<K\leq-1$, respectively, and still more preferably set to values within numerical ranges of $0<R<8$ μm and $-3<K\leq-1$, respectively.

Where the configuration unit width D is D=80 μm, the radius R of curvature of the distal end vertex and the conic constant K are preferably set to values within numerical ranges of $0<R<80$ μm and $-4<K\leq-1$, respectively, and more preferably set to values within the numerical ranges of $0<R<40$ μm and $-3<K\leq-1$, respectively, and still more preferably set to values within numerical ranges of $0<R<32$ μm and $-3<K\leq-1$, respectively.

The height of the convex portions 16 provided on the rear face of the lens sheet 14 is preferably set equal to or more than 0.20 μm from an average center plane (JIS B0601-1994). Further, the density of the convex portions 16 having a height of 0.20 μm or more from the average center plane is preferably set to a value equal to or higher than 70/mm² but equal to or lower than 500/mm². Further, the average distance of the convex portions 16 having a height of 0.20 μm or more from the average center plane is preferably set to a value within a region equal to or higher than 50 μm but equal to or lower than 120 μm.

Further, the convex portions 16 provided on the rear face of the lens sheet 14 are preferably provided such that, in a state wherein the cylindrical lens elements 15 are not formed, the degree of cloudiness of the lens sheet 14 is equal to or lower than 60%, and more preferably provided such that the degree of cloudiness of the lens sheet 14 is equal to or lower than 20%.

Furthermore, the convex portions 16 provided on the rear face of the lens sheet 14 are preferably provided such that the ten-point average roughness SRz is set to a value within a range equal to or higher than 1 μm but equal to or lower than 15 μm. Further, the convex portions 16 on the one principal face side of the lens sheet 14 are preferably provided such that the height thereof at which the convex portion area occupies 1% is set to a value equal to or greater than 1 μm but equal to or smaller than 7 μm.

Now, a method of producing the lens sheet according to the embodiment of the present invention is described.

First, an extruded sheet precision molding apparatus for use with the production method for the lens sheet according to the embodiment of the present invention is described with reference to FIG. 5.

Configuration of the Extruded Sheet Precision Molding Apparatus

Figure 5:
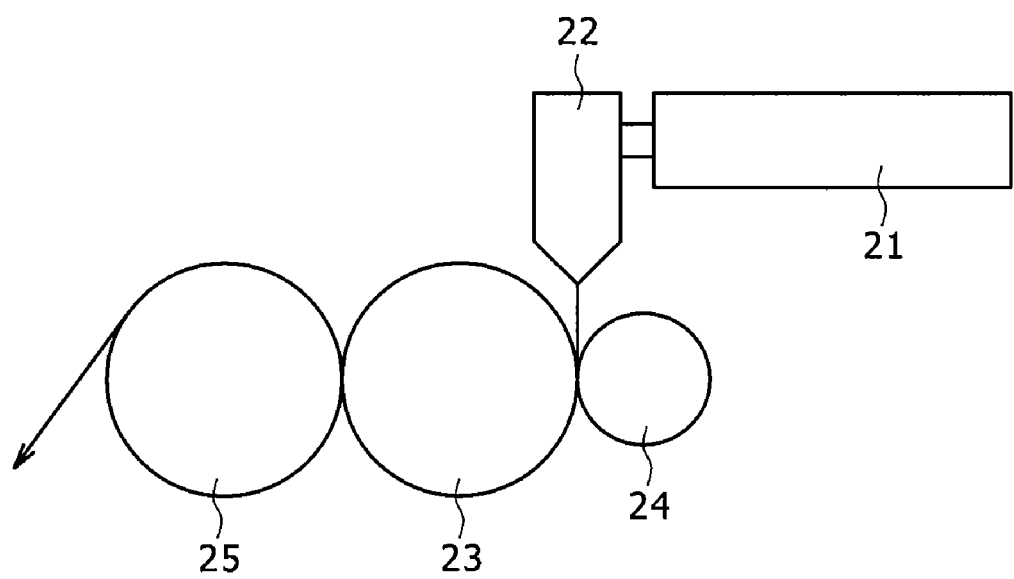
FIG. 5 is a schematic view showing an example of a configuration of an extruded sheet precision molding apparatus used in a production method for an optical film according to the embodiment of the present invention.

Referring to FIG. 5, the extruded sheet precision molding apparatus includes an extruder 21, a T die 22, a forming roll 23, an elastic roll 24 and a cooling roll 25.

For molding of the lens sheet 14, at least one kind of transparent thermoplastic resin is used. As the thermoplastic material, a thermoplastic material having a refractive index of 1.4 or more is preferably used taking a function of controlling the light emitting direction into consideration. As such resins, for example, a polycarbonate resin, an acrylic resin represented by a polymethyl methacrylate resin, a polyester resin or an amorphous copolymer polyester resin represented by polyethylene terephthalate, a polystyrene resin, a polyvinylchloride resin and so forth can be listed.

Further, where the transfer performance of a lens pattern by a melt extrusion method is taken into consideration, more preferably the melt viscosity around a molding temperature is equal to or higher than 1,000 Pa but equal to or lower than 10,000 Pa.

Furthermore, at least one kind of release agent is preferably contained in the thermoplastic resin. Where a release agent is contained in this manner, the close contact property between the forming roll 23 and a sheet when the sheet is to be exfoliated from the forming roll 23 can be adjusted to prevent an exfoliation line from being formed on the lens sheet 14.

The amount of the release agent to be added to the thermoplastic material is preferably equal to or more than 0.02 wt % but equal to or smaller than 0.4 wt %. If the amount decreases further than 0.02 wt %, then the releasability is deteriorated and an exfoliation line is formed on the lens sheet 14. On the other hand, where the amount increases further than 0.04 wt %, then the releasability becomes excessively high. Consequently, before the transparent thermoplastic resin cures, it is exfoliated from the forming roll 23, resulting in a failure that the shape of the cylindrical lens elements 15 is deformed.

Further, at least one kind of ultraviolet absorbing agent or light stabilizer is contained in the thermoplastic resin. Where the ultraviolet absorbing agent or light stabilizer is contained in this manner, a color change of the thermoplastic resin by light irradiation from a light source can be suppressed.

The amount of the ultraviolet absorbing agent or light stabilizer to be added to the thermoplastic resin is preferably equal to or greater than 0.02 wt % but equal to or lower than 0.4 wt %. Where the amount decreases further than 0.02 wt %, it becomes impossible to suppress a hue change. On the other hand, where the amount increases further than 0.4 wt %, the lens sheet 14 becomes yellowish.

As the ultraviolet absorbing agent, ultraviolet absorbing agents of the salicylic acid type, benzophenone type, benzotriazole type, cyanoacrylate type and so forth can be listed. More particularly, for example, Adekastab LA-31, Adekastab LA-32 (by ADEKA Corporation), Cyasorb UV-5411 (by Sun Chemical Company Ltd.), Tinuvin P, Tinuvin 234, Tionuvin 320, Tinuvin 327, Tinuvin 327 (by Nihon Ciba-Geigy K.K.), Sumisorb 110, Sumisorb 140 (by Sumitomo Chemical Co., Ltd.), Kemisorb 110, Kemisorb 140, Kemisorb 12, Kemisorb 13 (by Chemipro Kasei Kaisha, Ltd.), Uvinul X-19, Uvinul Ms-40 (by BASF), Tomisorb 100, Tobisorb 600 (by Yoshitomi Pharmaceutical Industries, Ltd.), Viosorb-90 (by Kyodo Chemical Co., Ltd.) and so forth are listed. Meanwhile, as the light stabilizer, a hindered amine light stabilizer and so forth are listed, and more particularly, for example, Adekastab LA-52 (by ADEKA Corporation), Sanol LS-770, Sanol LS-765, Sanol Ls774 (by Sankyo Co., Ltd.), Sumisorb TM-061 (by Sumitomo Chemical Co., Ltd.) and so forth are listed.

Further, also it is possible to add, in addition to the release agent and the ultraviolet absorbing agent described above, such an additive as an anti-oxidizing agent, an antistatic agent, a coloring agent, a plasticizer, a compatibilizer, a fire retardant or the like. However, most additives make a factor of generation of gas upon heating in melt extrusion of the T die 22 or the like and give rise to deterioration of the film formation or of the working environment. Therefore, the total amount of additives is preferably minimized, and the amount of additives to be added to a thermoplastic resin is preferably set equal to or smaller than 2 wt %.

The extruder 21 melts a resin material supplied thereto from a hopper not shown and supplies the molten resin material to the T die 22. The T die 22 has a "-" shaped opening, and expands the resin material supplied thereto from the extruder 21 so as to have a width of a sheet to be molded and discharges the expanded resin material.

The forming roll 23 has a cylindrical shape and is configured to be driven to rotate around an axis of rotation which is a center axis thereof. Further, the forming roll 23 is configured so as to be cooled. In particular, the forming roll 23 has one, two or more flow paths for circulation of a coolant in the inside thereof. As the coolant, for example, an oil medium is used, and the temperature of this oil medium is varied within a range, for example, from 120° C. to 230° C.

A sculpture shape for transferring a fine pattern to a sheet discharged from the T die 22 is provided on a cylindrical surface of the forming roll 23. The sculpture shape is a fine concave and convex shape for transferring, for example, the cylindrical lens elements 15 to a sheet. The concave and convex shape is formed, for example, by precision cutting by means of a diamond cutting tool. Further, the sculpture shape is formed toward a circumferential direction or a widthwise direction (heightwise direction) of the forming roll 23 having a cylindrical shape.

The elastic roll 24 has a cylindrical shape and is configured to be driven to rotate around an axis of rotation which is the center axis thereof. Further, the surface of the elastic roll 24 is formed for elastic deformation such that, when a sheet is nipped by the forming roll 23 and the elastic roll 24, a face of the elastic roll 24 contacting with the forming roll 23 is elastically deformed into a squashed state.

The elastic roll 24 is covered with a seamless tube formed from, for example, plated Ni, and a resilient member for allowing the surface of the elastic roll 24 to be elastically deformable is provided in the inside of the elastic roll 24. The configuration and the material of the elastic roll 24 are not limited particularly only if the surface of the elastic roll 24 elastically deforms when it contacts with the forming roll 23 with a predetermined pressure. For example, a rubber material, a metal material or a composite material may be used as the material. The elastic roll 24 is not limited to a roll-shaped one, but a belt-shaped one may be used.

When the convex portions 16 are to be provided on the rear face of the lens sheet 14, recesses for forming the convex portions 16 on the rear face side of the lens sheet 14 are provided on the cylindrical face of the elastic roll 24. The elastic roll 24 is configured so as to be cooled. In particular, the elastic roll 24 has one, two or more flow paths for circulation of a coolant in the inside thereof. As the coolant, for example, water can be used. Then, a temperature regulator of the pressurized hot water type not shown is used to set the basic temperature, for example, to 80° C. and 130° C. It is to be noted that an oil temperature regulator may be used as the temperature regulator.

The cooling roll 25 has a cylindrical shape and is configured to be driven to rotate around an axis of rotation which is the center axis thereof. The cooling roll 25 is configured so as to be cooled. In particular, the cooling roll 25 has one, two or more flow paths for circulation of a coolant in the inside thereof. As the coolant, for example, water can be used. Then, a temperature regulator of the pressurized hot water type not shown is used to set the basic temperature, for example, to 115° C. It is to be noted that an oil temperature regulator may be used as the temperature regulator.

Production Method for the Lens Sheet

A production method for a lens sheet according to the embodiment of the present invention is described below.

First, a resin material is melted by the extruder 21 and successively supplied to the T die 22 so that a sheet is discharged continuously from the T die 22.

Then, the sheet discharged from the T die 22 is nipped by the forming roll 23 and the elastic roll 24. Consequently, the sculpture shape of the forming roll 23 is transferred to the front face of the sheet while the concave and convex shape of the elastic roll 24 is transferred to the rear face of the sheet. Thereupon, the surface temperature of the forming roll 23 is kept within a temperature range from Tg+20° C. to Tg+45° C., and the surface temperature of the elastic roll 24 is kept within another temperature range from 20° C. to Tg ° C. Here, Tg is a glass transition temperature of the resin material. Since the surface temperatures of the forming roll 23 and the elastic roll 24 are kept within the temperature ranges specified as above, the sculpture shape can be transferred well to the sheet. Further, the temperature of the resin material when the sculpture shape is transferred to the sheet is preferably set to Tg+50° C. to Tg+230° C. and more preferably set to Tg+80° C. to Tg+200° C. Where the temperature of the resin is kept within the temperature range specified above, the sculpture shape can be transferred well to the sheet.

Then, while the sheet is nipped by the forming roll 23 and the cooling roll 25 to suppress fluttering thereof, the sheet is exfoliated from the forming roll 23 by the cooling roll 25. Thereupon, the surface temperature of the cooling roll 25 is kept within a temperature range equal to or lower than Tg. Where the surface temperature of the cooling roll 25 is kept within such a temperature range as specified above and the sheet is nipped by the forming roll 23 and the cooling roll 25 to suppress fluttering thereof, the sheet can be exfoliated well from the forming roll 23. Further, the temperature of the resin material upon exfoliation is preferably equal to or higher than Tg, and more preferably is Tg+20° C. to Tg+85° C. and still more preferably is Tg+30° C. to Tg+60° C. Where the temperature of the resin is kept within such a temperature range as specified just above and the sheet is nipped by the forming roll 23 and the cooling roll 25 to suppress fluttering thereof, the sheet can be exfoliated well from the forming roll 23. According to the foregoing, an object lens sheet can be obtained.

According to the embodiment of the present invention, the following effects can be achieved.

In a conventional production method for a lens sheet, a lens shape is formed principally with a UV (ultraviolet rays) curing resin (for example, a UV curing acrylic resin or the like) on a film substrate of polyethylene terephthalate (PET) or the like. This production method has problems that the UV curing resin is expensive and that, since it is necessary to perform UV irradiation sufficiently on the UV curing resin in order to harden the resin, the production speed is low. Further, the production method has a problem also that, since a two-layer structure of a sheet and a lens layer is used, warping is liable to occur due to the difference in expansion coefficient by the heat or temperature and the assembly process is complicated.

Against the problems, the lens sheet production method according to the present embodiment can achieve, because it uses an integrated molded article by thermal transfer to a thermoplastic resin, such special effects that a less expensive material can be used, that the productivity of a lens sheet can be enhanced and that also appearance of warping on a lens sheet can be suppressed.

In the following, the present invention is described in connection with working examples. However, the present invention is not limited only to the working examples.

The inventor of the present invention performed a study through a simulation in which the numerical values of the radius R of curvature and the conic constant K in the expression (1) given hereinabove were varied in order to define the radius R of curvature and the conic constant K.

CONVENTIONAL EXAMPLE

Figure 6:
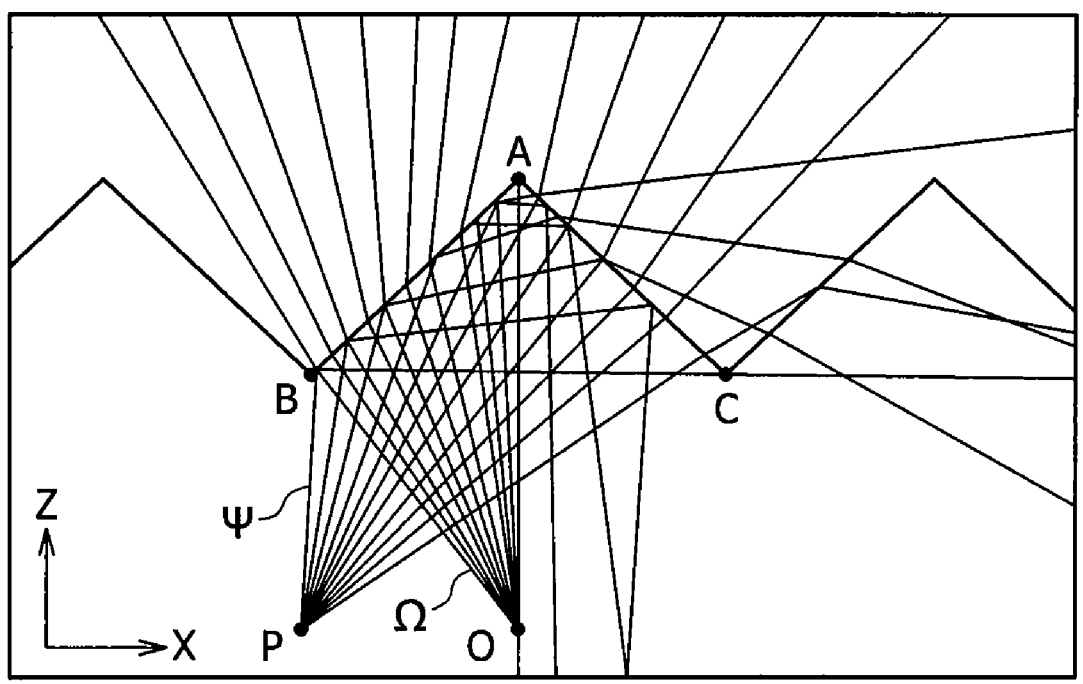
FIG. 6 is a schematic view showing part of an XZ section of a conventional prism sheet in an enlarged scale.

FIG. 6 shows part of an XZ section of a prism sheet of a conventional example in an enlarged scale. A plurality of very small prisms are provided successively on one of principal faces of the prism sheet. It is to be noted that, in FIG. 6, a point A indicates a vertex of a prism, and another point B and a further point C indicate each a joining point with an adjacent prism, and a still further point O is an imaginary light start point just below the vertex A. A yet further point P indicates an imaginary light start point just below the joining point B. Further, in the following description, a face between the vertex A and the joining point B is referred to as AB face, and a face between the vertex A and the joining point C is referred to as AC face.

Further, FIG. 6 shows a locus of a light flux $\Omega$ which enters the AB face from the imaginary light start point O and a locus of another light flux $\Psi$ which enters the AB face and the AC face from the imaginary light start point P. The loci of the light flux $\Omega$ and the light flux $\Psi$ were determined through a simulation. It is to be noted that, also in the working examples hereinafter described, like or corresponding elements are denoted by like reference characters.

Figure 7:
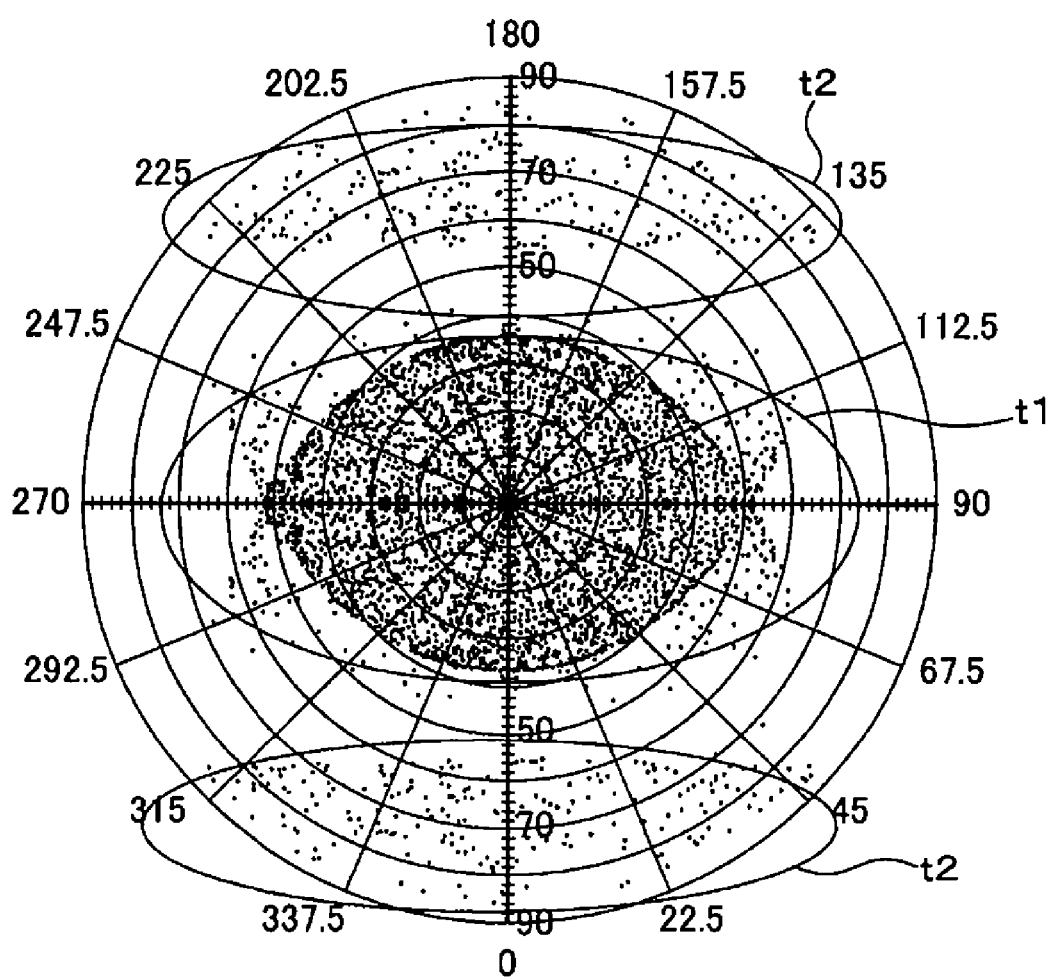
FIG. 7 is a distribution diagram illustrating an orientation characteristic of a conventional prism sheet.
Figure 8:
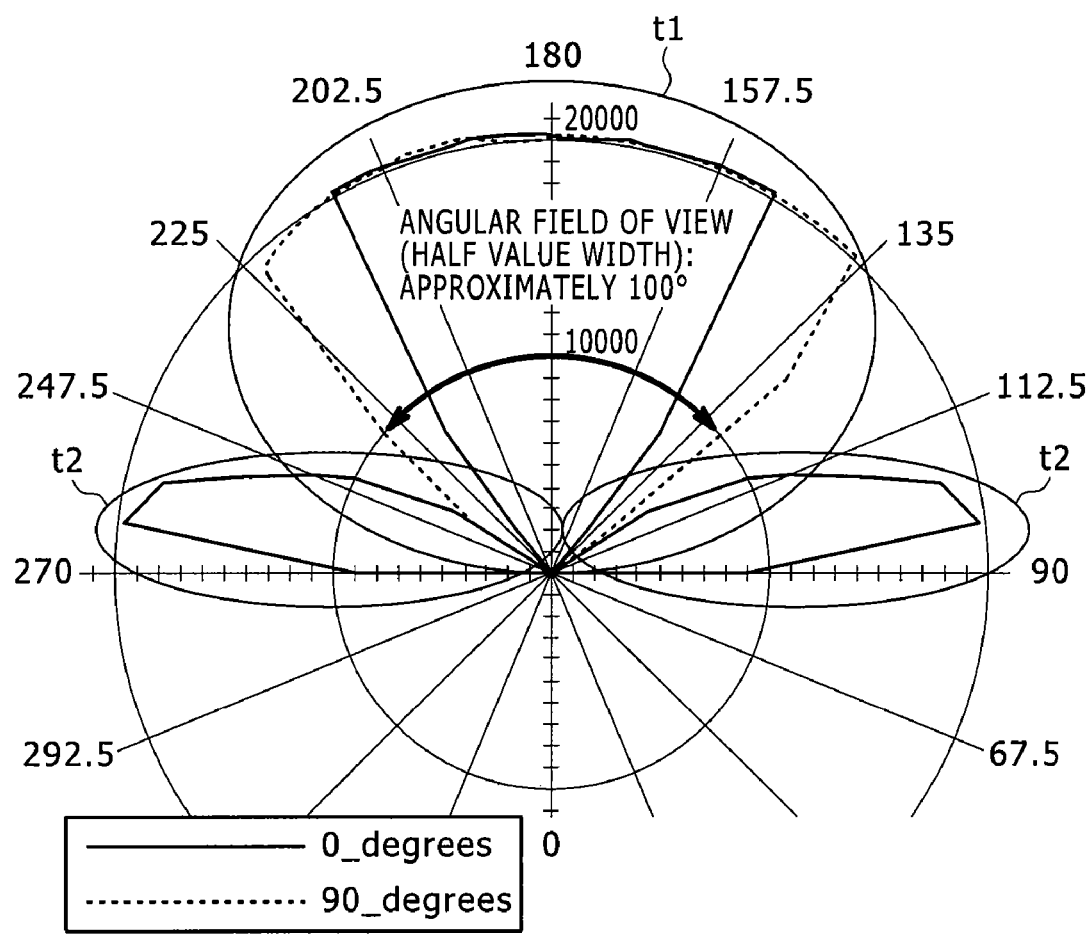
FIG. 8 is a distribution diagram illustrating a visual field characteristic of a conventional prism sheet.

FIG. 7 illustrates a luminous intensity distribution characteristic of the prism sheet of the conventional example. FIG. 8 illustrates a visual field characteristic of the prism sheet of the conventional example. It is to be noted that, in FIGS. 7 and 8, a distribution surrounded by a framework t1 corresponds to the first order transmission light, and a distribution surrounded by another framework t2 corresponds to the second order transmission light. The distribution diagram of FIG. 7 shows circles whose center is set to 0° C. and indicate angles such that the first circle from the center indicates an angle of 10°, the second circuit indicates another angle of 20°, ..., and the outermost circle indicates 90°. Further, the distribution diagrams of FIGS. 7 and 8 are drawn through a computer simulation. Also the distribution diagrams of the working examples hereinafter described depend upon a simulation similarly.

From FIG. 7, it can be confirmed in what angle light emitted from the prism sheet expands. Further, it can be seen that a distribution corresponding to the second order transmission light T2 appears in the proximity of 70° above and below the center. Further, from FIG. 8, it can be seen that the angular field of view by the half value width with respect to the front face luminance is approximately 100°.

Then, a prism of a triangular shape described hereinabove was produced on the one principal face of the sheet by a melt extrusion method, and the shape of the prism was evaluated.

In the following, a production method for a lens sheet by the melt extrusion method is described particularly.

First, the elastic roll was produced in the following manner. A seamless tube was formed by Ni plating, and a Cr plating process was performed for the surface of the seamless tube. Thereafter, the plated Cr layer was polished to 0.2 S to produce a seamless tube (hereinafter referred to as flexible sleeve) having a thickness of 340 microns.

Then, a resilient member was adhered to a roll in which coolant can be circulated, and the flexible sleeve was fitted on the resilient member to obtain an elastic roll having a configuration that cooling water can be circulated between the resilient member and the flexible sleeve. It is to be noted that the resilient member was made of nitrile-butadiene rubber (NBR) having a hardness of 85 degrees with a thickness of 20 mm. Further, the diameter $\Phi$ of the elastic roll was set to 260 mm, and the face length (width of the forming roll) was set to 450 mm.

Thereafter, a forming roll having a structure wherein coolant can be circulated in the inside thereof through a plurality of flow paths so that the temperature distribution can be reduced was prepared. It is to be noted that the material was S45C and was subject to hardening and tempering and then to mirror finish (equal to or less than 0.5 S) and an electroless NiP (Nickel and Phosphorus) plating (100 microns thick) process.

A sculpture shape was formed on the cylindrical face of the forming roll in the following manner. First, a diamond cutting tool having a predetermined shape was set in position on a superfine lathe wherein the forming roll was placed in a chamber of a constant temperature and a constant humidity (temperature 23° C., humidity 50%). Then, lens patterns of the prism of the triangular shape described above were formed in a circumferential direction of the forming roll. It is to be noted that the forming roll has a diameter of $\Phi$300, a face length of 460 mm and a groove working width of 300 mm.

An oil medium was used as the coolant for the forming roll. Water was used as the coolant for the elastic roll and the cooling roll, and a temperature regulator of the pressurized hot water type was used to regulate the temperature of the coolants.

As the extruder, an extruder including a screw with a vent having a diameter of $\Phi$50 mm and having no gear pump was used. Further, as the T die, a coach hanger type die was used, and the lip width of the same was 550 mm and the lip gap was 1.5 mm. Further, the air gap was 105 mm.

The extruded sheet precision molding apparatus having the configuration described above was used to perform molding of a lens sheet.

First, the polycarbonate E2000R (by Mitsubishi Engineering-Plastic Corporation) was extruded from the T die as undried. Then, the material was nipped by the forming roll and the elastic roll and then wrapped around the forming roll. It is to be noted that the surface temperature of the forming roll was kept at Tg+35° C., and the surface temperature of the elastic roll was kept at 75° C. Here, Tg is the glass transition temperature of the polycarbonate resin.

Thereafter, the sheet was exfoliated from the forming roll by the cooling roll. It is to be noted that the surface temperature of the cooling roll was kept at 115° C. Further, the speed of a takeup apparatus was 7 m/min. As a result of the foregoing, an optical film of a thickness of 220 microns having grooves transferred to one of the principal faces thereof was obtained.

The surface temperatures of the forming roll and the elastic roll described above were obtained such that a sensor was contacted with the roll surfaces to perform measurement at a position immediately preceding to the nip point at which the measurement is least likely to be influenced by the heat of the resin. Meanwhile, the surface temperature of the cooling roll was obtained such that a sensor was contacted with the surface of the cooling roll to perform measurement at a position at which the film is nipped by the cooling roll and the forming roll. It is to be noted that, as the thermometers, a handy type digital thermometer (by Chino Corporation, commodity name: ND511-KHN) was used, and as the sensors, a sensor for surface temperature measurement (by Anritsu Meter Co., Ltd., commodity name U-161K-00-D0-1) was used.

Thereafter, the prism lens formed on one of the principal surfaces of the prism sheet in such a manner as described above and the prism lens described hereinabove with reference to FIG. 6 were compared with each other in shape. As a result, it was found that a desired lens shape was not successfully obtained because it was impossible to cause the thermoplastic resin to advance into a vertex portion of the lens pattern of the prism of the triangular shape.

Working Example 1

(Where R=5, K=−2)

Figure 9:
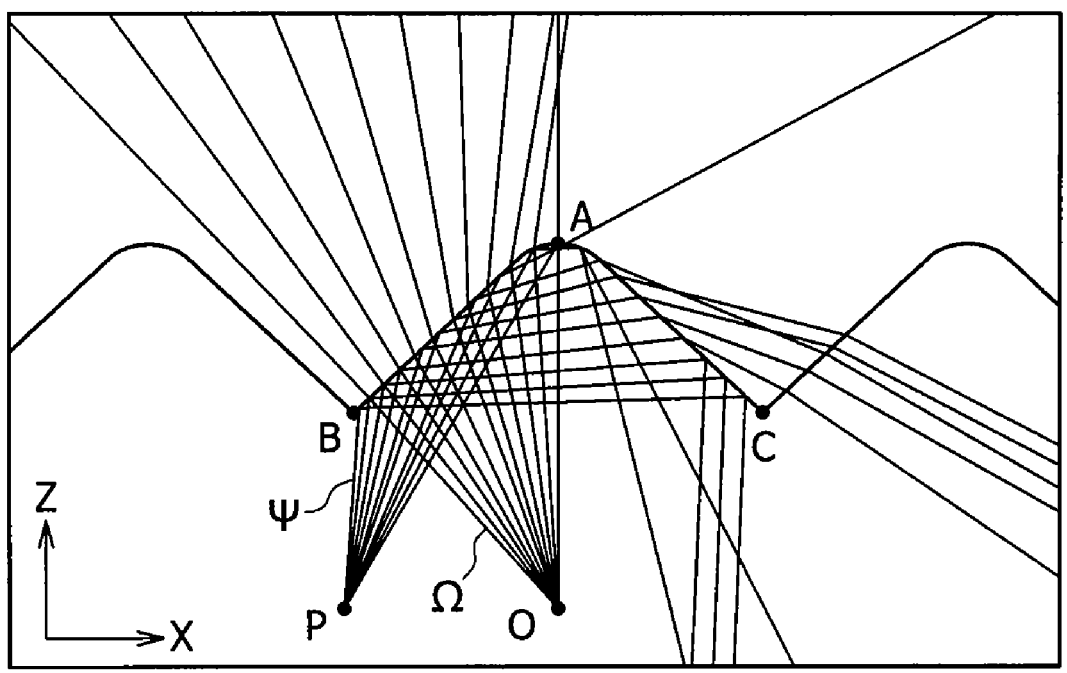
FIG. 9 is a schematic view showing part of an XZ section of a lens sheet of a working example 1 in an enlarged scale.

FIG. 9 shows an XZ section of a lens sheet of a working example 1 in an enlarged scale. A large number of cylindrical lens elements having a finite focal distance on the emission side of illumination light and having a leftwardly and rightwardly symmetrical hyperboloidal face are arrayed successively on the surface of the lens sheet. This hyperboloidal face is represented by $Z=X^2/(5+\sqrt{(25+X^2)})$ obtained by substituting K=−2 and R=5 into the expression (1) given hereinabove.

In the lens sheet shown in FIG. 9, a light flux Q emitted from the imaginary light start point O just below the vertex of the hyperboloidal face and entering the AB face is refracted by and transmitted forwardly through the lens sheet.

In the conventional prism sheet, part of the light flux Q incident to a portion in the proximity of the vertex is totally reflected to form the return light component R because the incidence angle exceeds the critical angle θc=Sin−1(1/n). For example, where the sheet material is polycarbonate (n=1.59), the critical angle θc is θc=38.97°.

In the lens sheet shown in FIG. 9, since a large number of cylindrical lens elements having a leftwardly and rightwardly symmetrical hyperboloidal face are arrayed successively, the part of the light flux Q which makes the return light component R with the conventional prism sheet can be refracted and transmitted forwardly through the lens sheet. Therefore, the lens sheet shown in FIG. 9 contributes enhancement of the luminance in the front face direction when compared with the conventional prism sheet.

Further, a light flux Ψ shown in FIG. 9 emitted from the imaginary light start point P just below the joining face between hyperboloidal faces and entering the AB face is totally reflected most by the AB face and is refracted or totally reflected by the AC face to form the return light component R. Therefore, the probability in which the light flux Ψ contributes to generation of side lobe light as the second-order transmission light component T2 can be reduced, and the light flux Ψ can contribute to enhancement of the luminance in the front face direction.

Furthermore, also on the face in the proximity of the vertex A on the side between the points A and C, the angle of a normal line to the face forms a shallow angle with respect to the Z axis with regard to a reflected light flux from the first totally reflecting face (AB face). Therefore, an effect that the reflected light flux is totally reflected to form the return light component R is exhibited.

Furthermore, also on the curved face in the proximity of the vertex, the reflected light flux from the AB face undergoes a refraction transmission effect higher than that of the conventional prism shape and undergoes even a total reflection effect.

In this manner, in the present invention, by improving the refraction and transmission effect to the front face side over an overall area from a perpendicular component direction and the refraction capacity and the total reflection capacity for an incident light flux from a side face direction, the first order transmission light can be increased thereby to raise the front face luminance while the light distribution is maintained in the forward direction. Further, by suppressing the second-order transmission light component T2 to increase the contribution to the return light component R, light can be utilized effectively, and therefore, the gain characteristic of light can be enhanced.

Figure 10:
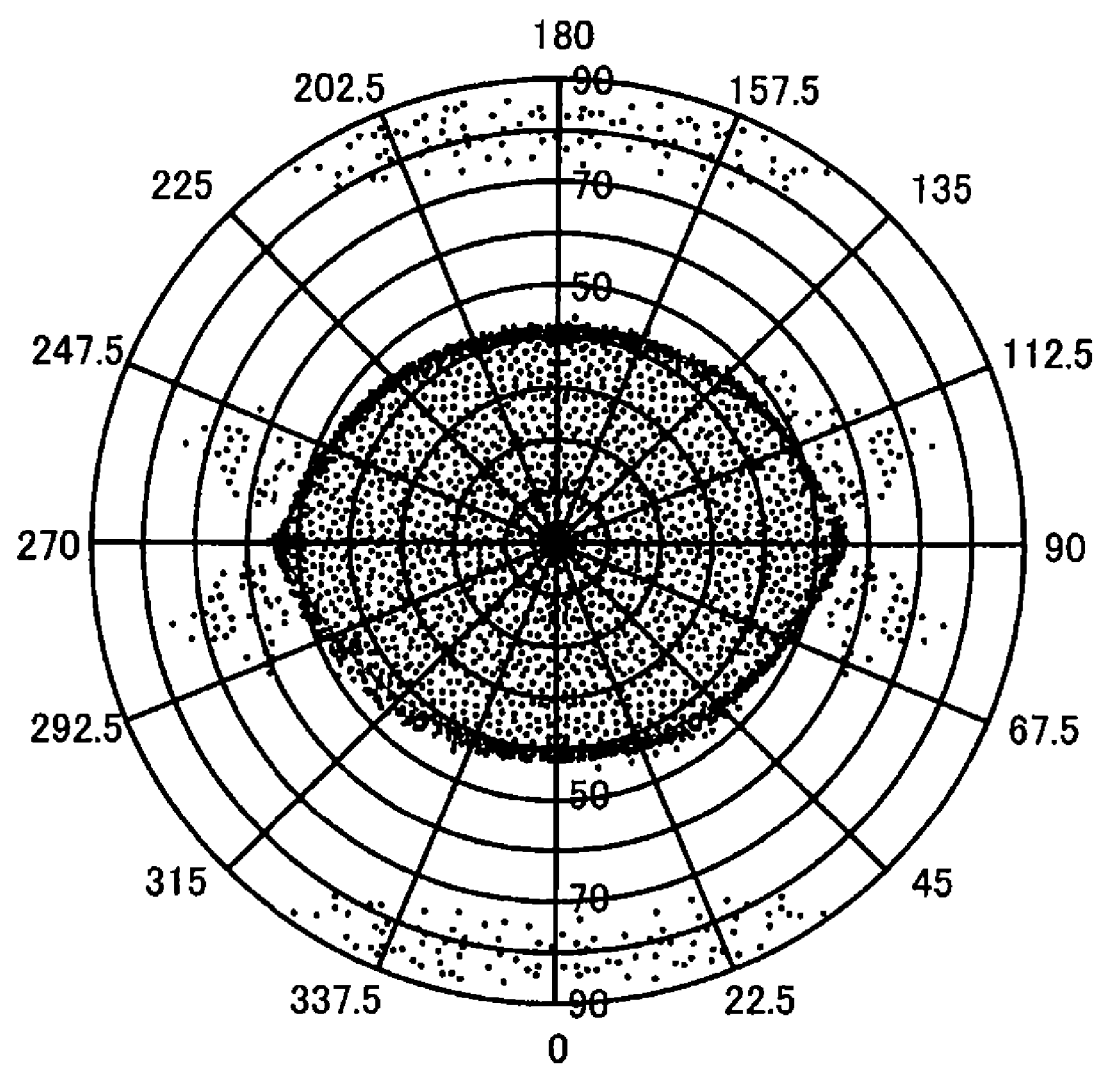
FIG. 10 is a distribution diagram illustrating an orientation characteristic of the lens sheet of the working example 1.

FIG. 10 is a distribution diagram representing the light distribution characteristic of the lens sheet shown in FIG. 9. FIG. 10 illustrates in what angle the light emitted from the lens sheet shown in FIG. 9 expands.

As shown in FIG. 10, the lens sheet of FIG. 9 has a light distribution characteristic similar to that of the conventional prism sheet shown in FIG. 6. However, the lens sheet of FIG. 9 can reduce the second-order transmission light component T2 when compared with the conventional prism sheet.

Then, cylindrical lens elements of a hyperboloidal face represented by $Z=X^2/(5+\sqrt{(25+X^2)})$ specified as above were produced by a melt extrusion method on one of the principal faces of the sheet, and the shape of the cylindrical lens elements was evaluated.

The lens sheet was produced similarly to the conventional example described hereinabove except that a lens pattern represented by $Z=X^2/(5+\sqrt{(25+X^2)})$ specified as above was formed on the cylindrical face of the forming roll described hereinabove.

Then, the toroidal lens elements formed on one of the principal faces of the lens sheet in such a manner as described above and the toroidal lens element represented by $Z=X^2/(5+\sqrt{(25+X^2)})$ specified as above were compared in shape with each other. As a result, it was found that the two have a substantially same shape. In other words, it was found that the thermoplastic resin can be advanced into a vertex portion of the lens pattern of the toroidal lens element and a desired toroidal lens shape can be obtained.

Working Example 2

(Where R=5, K=−3)

Figure 11:
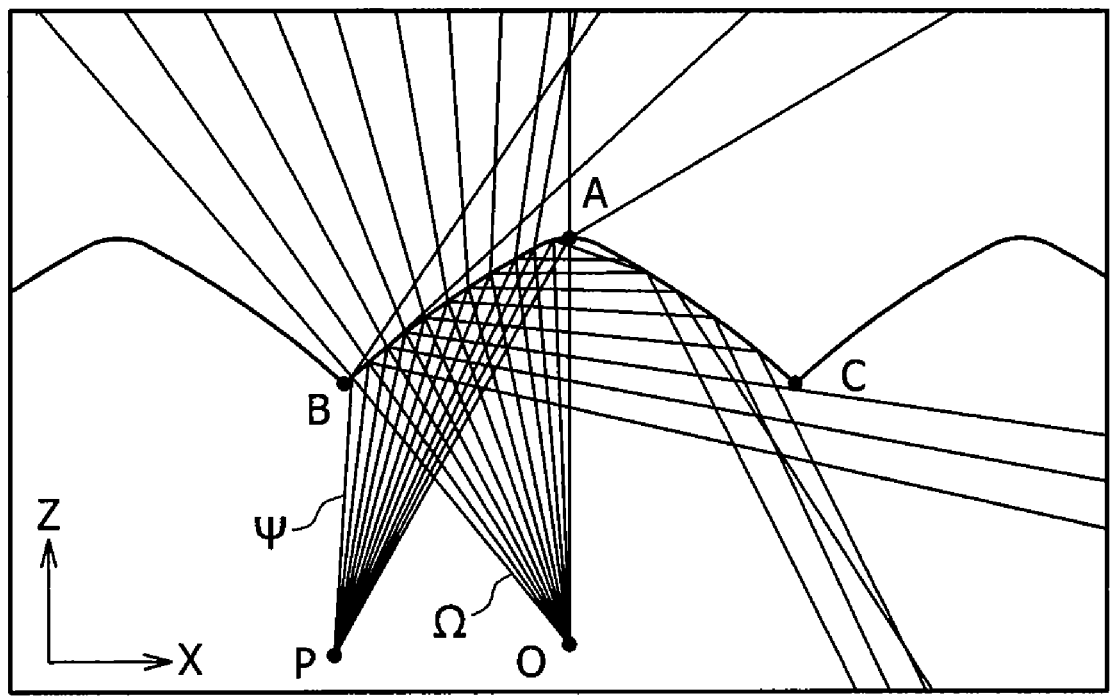
FIG. 11 is a schematic view showing part of an XZ section of a lens sheet of a working example 2 in an enlarged scale.

FIG. 11 shows the shape of an XZ section of a lens sheet in an enlarged scale. Cylindrical lens elements having a finite focal distance on the emission side of illumination light and having a leftwardly and rightwardly symmetrical hyperboloidal face are arrayed successively on the surface of the lens sheet. This hyperboloidal face is represented by $Z=X^2/(5+\sqrt{(25+2X^2)})$ obtained by substituting K=−3 and R=5 into the expression (1) given hereinabove.

Since the angle at which the asymptotes intersects with each other is expanded when compared with that of the lens sheet of FIG. 9 as seen in FIG. 11, the refraction transmission light of the light flux Ω is expanded. Further, the AB face by which the light flux Ψ is reflected or refracted becomes less effective in total reflection, and components which are refracted and transmitted increase. Since the probability that the transmission direction may appear at an angle greater than the angle at which the asymptotes of the hyperboloidal face intersect with each other is suppressed, the second-order transmission light component T2 decreases.

Figure 12:
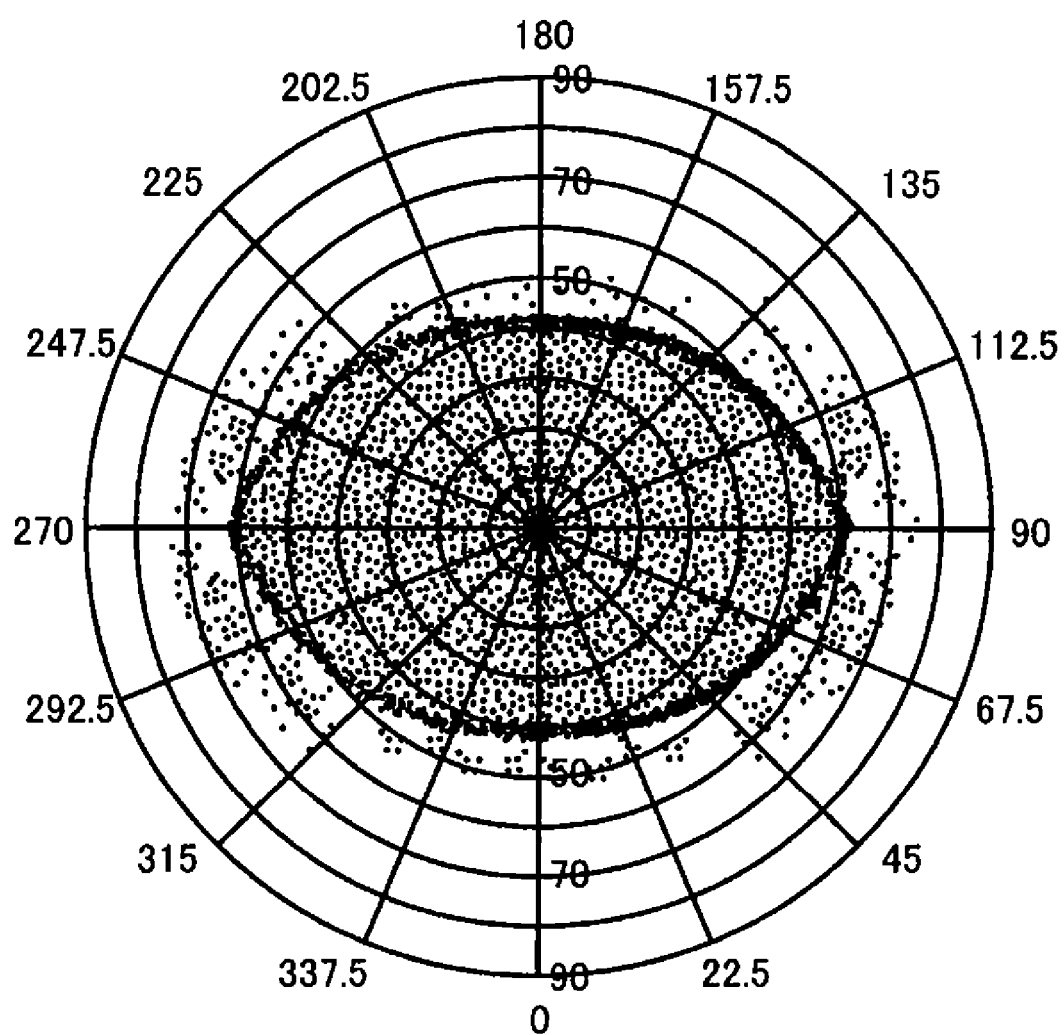
FIG. 12 is a distribution diagram illustrating an orientation characteristic of the lens sheet of the working example 2.

FIG. 12 is a distribution diagram representing the light distribution characteristic of the lens sheet shown in FIG. 11. As shown in FIG. 12, the lens sheet of FIG. 11 has a light distribution characteristic similar to that of the conventional prism sheet shown in FIG. 6. However, the lens sheet of FIG. 11 can reduce the second-order transmission light component T2 significantly when compared with the conventional prism sheet.

Then, a lens sheet was produced in a similar manner as in the working example 1, and the toroidal lens elements formed on one of the principal faces of the lens sheet and the toroidal lens element represented by $Z=X^2/(5+\sqrt{(25+2X^2)})$ specified as above were compared in shape with each other. As a result, it was found that the two have a substantially same shape.

Working Example 3

(R=1, K=−2)

Figure 13:
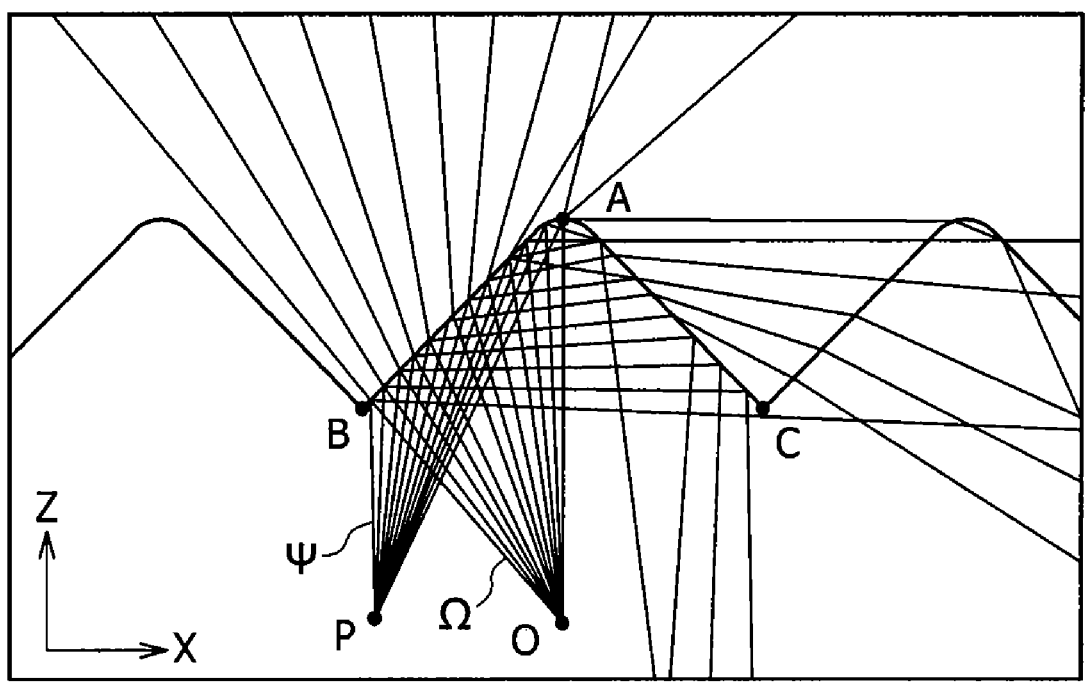
FIG. 13 is a schematic view showing part of an XZ section of a lens sheet of a working example 3 in an enlarged scale.

FIG. 13 shows the shape of an XZ Section of a lens sheet of a working example 3 in an enlarged scale. Cylindrical lens elements having a finite focal distance on the emission side of illumination light and having a leftwardly and rightwardly symmetrical hyperboloidal face are arrayed successively on the surface of the lens sheet. This hyperboloidal face is represented by $Z=X^2/(1+\sqrt{(1+X^2)})$ obtained by substituting K=−2 and R=1 into the expression (1).

As seen in FIG. 13, the light flux Q is refracted and transmitted forwardly by the lens sheet. The light flux Ψ is totally reflected most and then refracted or totally reflected to return by the face between the points A and C to form the return light component R. Meanwhile, the refracted light from the face in the proximity of the vertex undergoes variation of the normal line direction so that its light distribution direction is dispersed, and appearance of the second-order transmission light component T2 is moderated.

Figure 14:
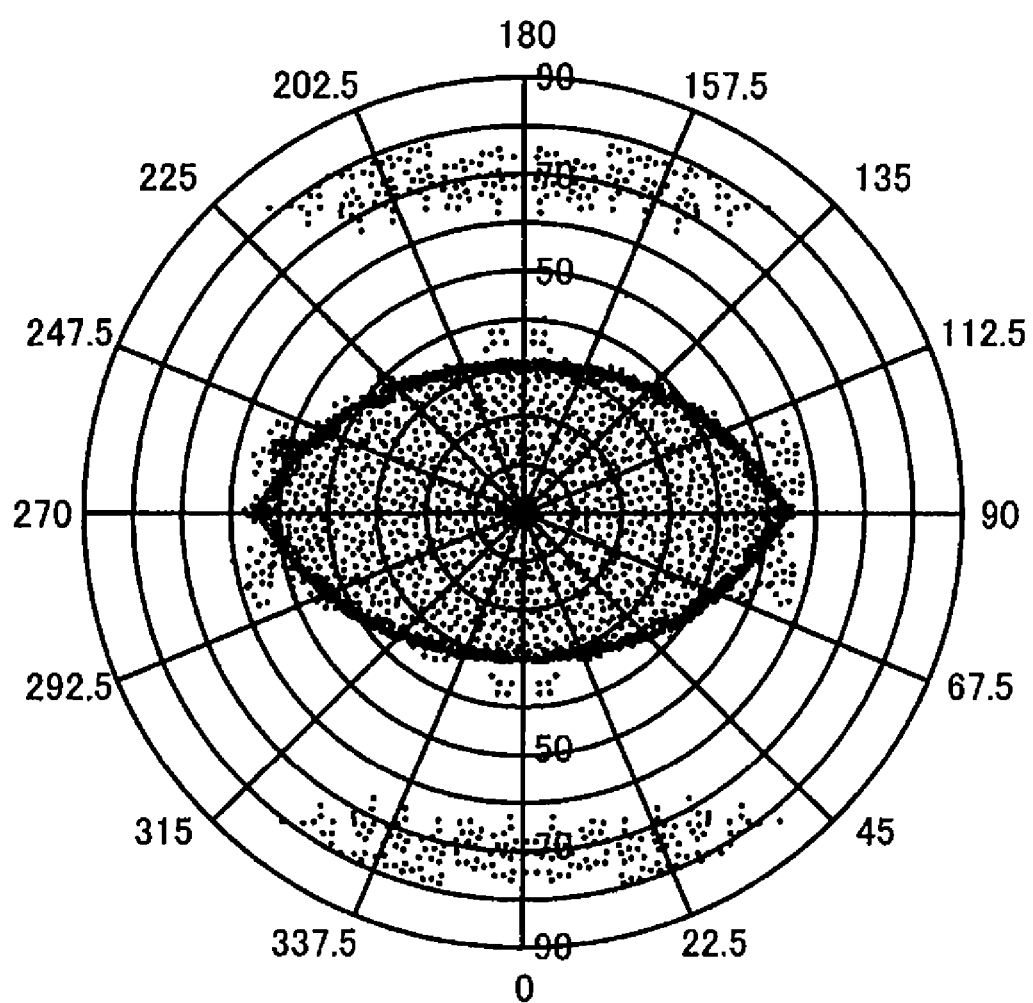
FIG. 14 is a distribution diagram illustrating an orientation characteristic of the lens sheet of the working example 3.

FIG. 14 is a distribution diagram representing the light distribution characteristic of the lens sheet shown in FIG. 13. As shown in FIG. 14, the lens sheet of FIG. 13 has a light distribution characteristic similar to that of the conventional prism sheet shown in FIG. 6. However, the lens sheet of FIG. 11 can reduce the second-order transmission light component T2 when compared with the conventional prism sheet.

Then, a lens sheet was produced in a similar manner as in the working example 1, and the toroidal lens elements formed on one of the principal faces of the lens sheet and the toroidal lens element represented by $Z=X^2/(1+\sqrt{(1+X^2)})$ specified as above were compared in shape with each other. As a result, it was found that the two have a substantially same shape.

Working Example 4

(R=50, K=−2)

Figure 15:
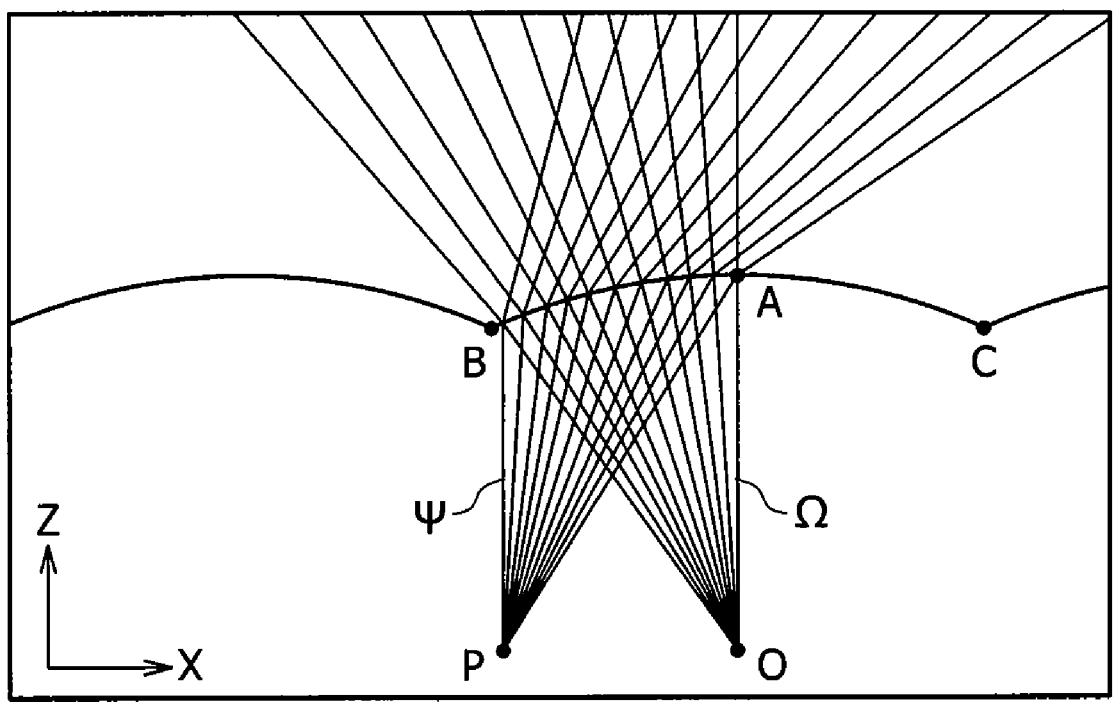
FIG. 15 is a schematic view showing part of an XZ section of a lens sheet of a working example 4 in an enlarged scale.

FIG. 15 shows the shape of an XZ Section of a lens sheet of a working example 4 in an enlarged scale. Cylindrical lens elements having a finite focal distance on the emission side of illumination light and having a leftwardly and rightwardly symmetrical hyperboloidal face are arrayed successively on the surface of the lens sheet. This hyperboloidal face is represented by $Z=X^2/(50+\sqrt{(2500+X^2)})$ obtained by substituting K=−2 and R=50 into the expression (1).

Figure 16:
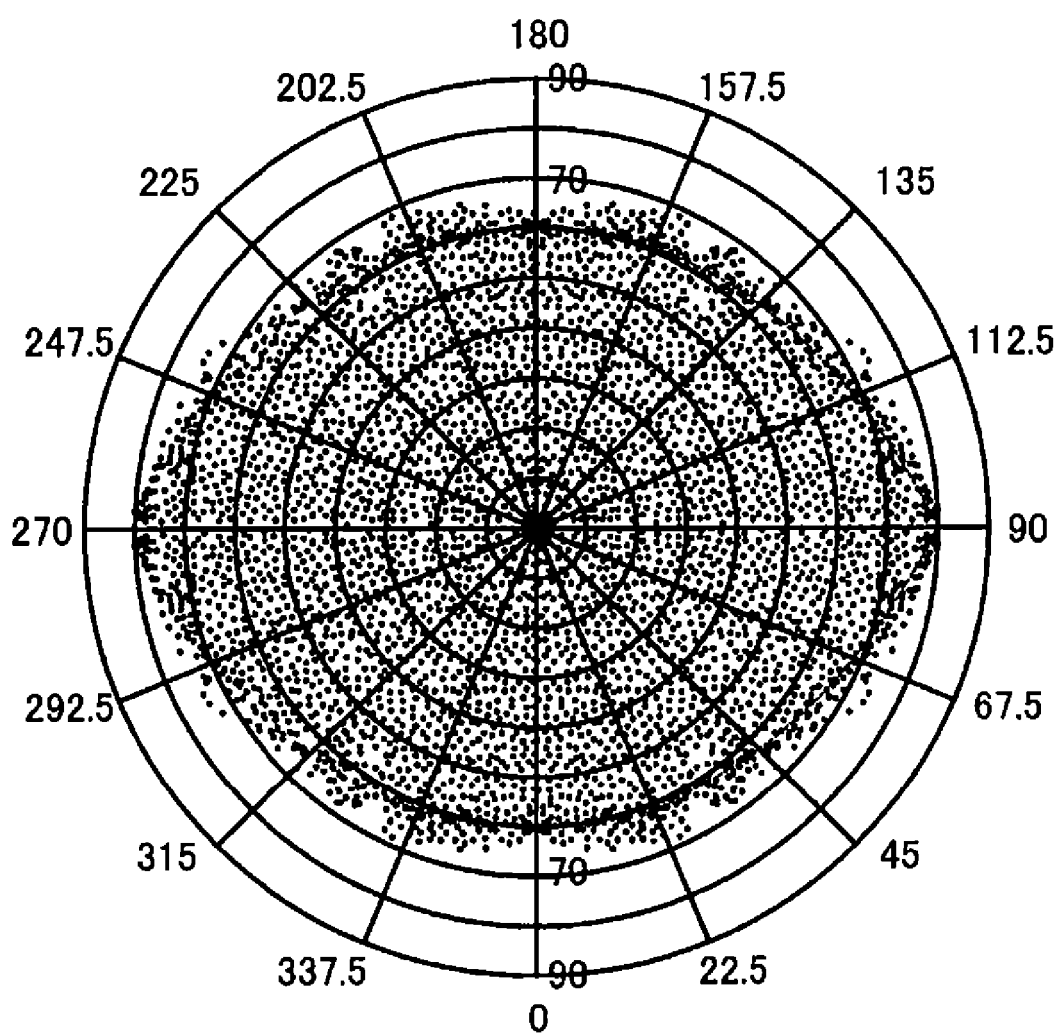
FIG. 16 is a distribution diagram illustrating an orientation characteristic of the lens sheet of the working example 4.

FIG. 16 is a distribution diagram representing the light distribution characteristic of the lens sheet shown in FIG. 15. As shown in FIG. 16, the lens sheet has a light distribution characteristic that light is expanded widely and uniformly.

As seen in FIG. 15, since the light flux Q emitted from the imaginary light start point and the light flux Ψ emitted from the imaginary light bright spot are both refracted and transmitted forwardly and distributed in the front face direction because the incidence angles of them are moderate, the second order transmission light components can be reduced. However, the light distribution characteristic of the first order transmission light in the front face direction is expanded excessively as seen in FIG. 16, and efficient utilization of light to the polarized light separation sheet disposed on the next stage becomes difficult. Accordingly, R in the expression (1) is preferably set lower than R=50.

Then, a lens sheet was produced in a similar manner as in the working example 1, and the toroidal lens elements formed on one of the principal faces of the lens sheet and the toroidal lens element represented by $Z=X^2/(50+\sqrt{(2500+X^2)})$ specified as above were compared in shape with each other. As a result, it was found that the two have a substantially same shape.

Working Example 5

(Where R=60)

Figure 17:
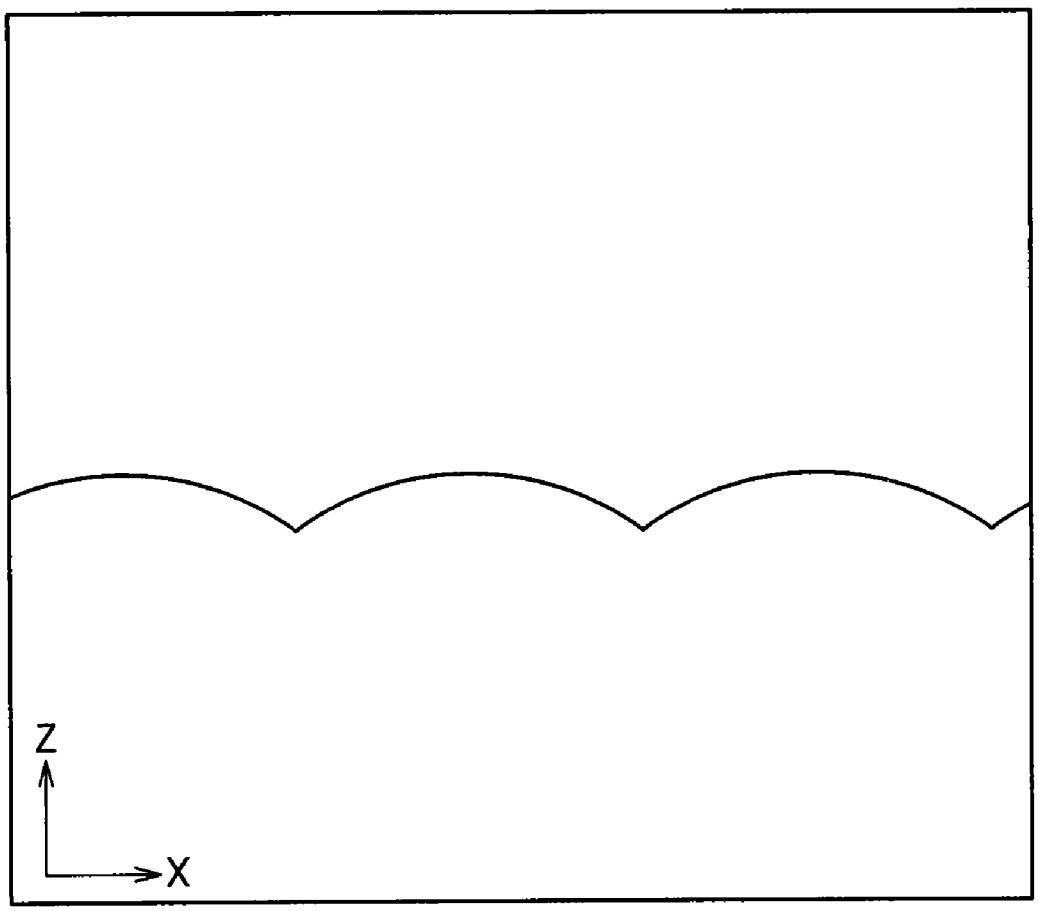
FIG. 17 is a schematic view showing part of an XZ section of a lens sheet of a working example 5 in an enlarged scale.

FIG. 17 shows the shape of an XZ section of a lens sheet of a working example 7 in an enlarged scale. Cylindrical lens elements having a finite focal distance on the emission side of illumination light and having a leftwardly and rightwardly symmetrical hyperboloidal face are arrayed successively on the surface of the lens sheet. This hyperboloidal face is represented by an expression where R=60 is substituted into the expression (1).

Figure 18:
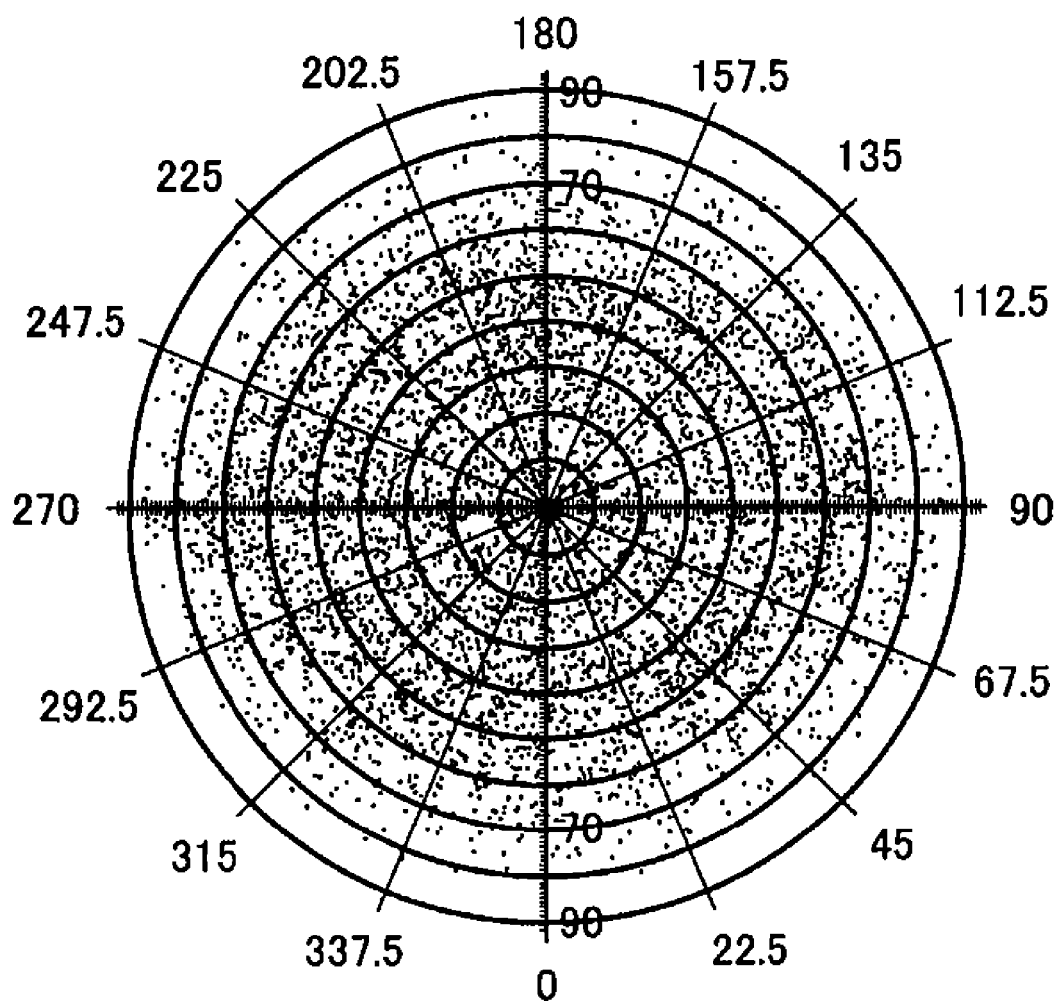
FIG. 18 is a distribution diagram illustrating an orientation characteristic of the lens sheet of the working example 5.

FIG. 18 is a distribution diagram representing the light distribution characteristic of the lens sheet shown in FIG. 17. As shown in FIG. 18, the lens sheet has a light distribution characteristic that light is expanded widely and uniformly although the second-order transmission light component T2 does not appear. Accordingly, it is considered that the lens sheet is not necessarily optimum from the point of view of use of a liquid crystal display apparatus for which it is demanded to raise the directivity in the front face direction to increase the luminance in the front face direction.

Working Example 6

(Where R=60, K=−6)

Figure 19:
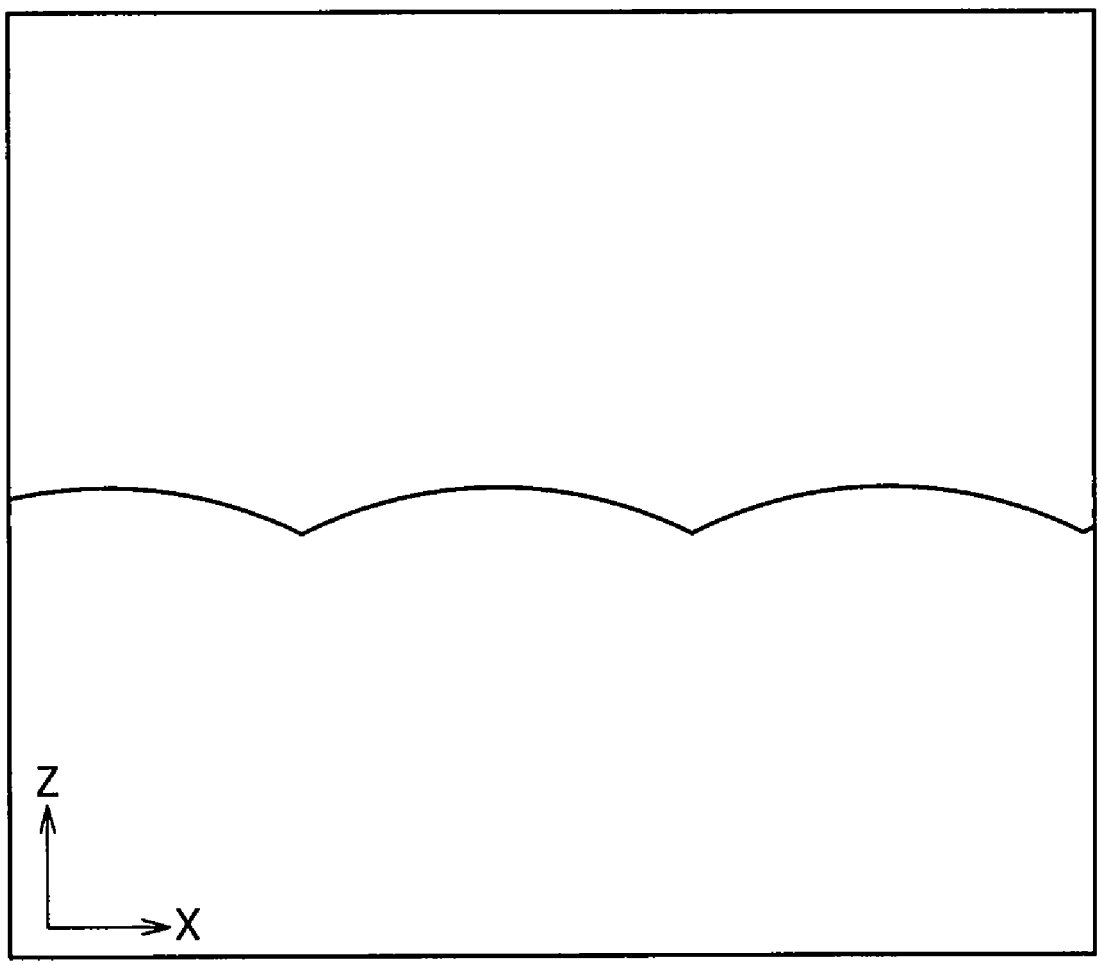
FIG. 19 is a schematic view showing part of an XZ section of a lens sheet of a working example 6 in an enlarged scale.

FIG. 19 shows the shape of an XZ section of a lens sheet of a working example 7 in an enlarged scale. Cylindrical lens elements having a finite focal distance on the emission side of illumination light and having a leftwardly and rightwardly symmetrical hyperboloidal face are arrayed successively on the surface of the lens sheet. The shape of the XZ section is represented by $Z=X^2/(60+\sqrt{(3600+5X^2)})$ obtained by substituting K=−6 and R=60 into the expression (1) given hereinabove.

This lens sheet has a shape similar to that of the hyperboloidal face of the lens sheet of FIG. 17 in that the angle at which the asymptotes of the hyperboloidal shape intersect with each other expands to a great extent.

Figure 20:
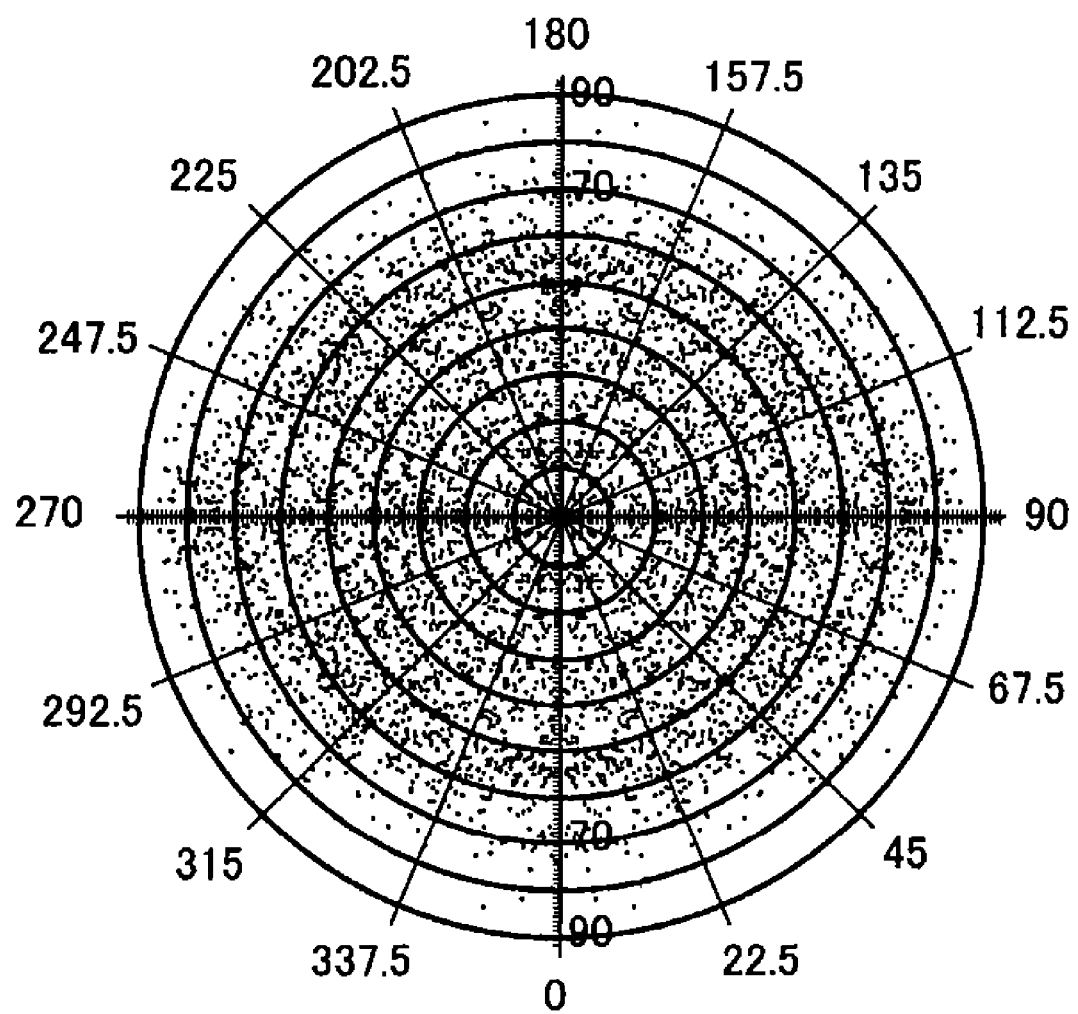
FIG. 20 is a distribution diagram illustrating an orientation characteristic of the lens sheet of the working example 6.

FIG. 20 is a distribution diagram representing a light distribution characteristic of the lens sheet shown in FIG. 19. As shown in FIG. 20, the lens sheet has a light distribution characteristic similar to that of the lens sheet of FIG. 17.

Working Example 7

(Where R=50, K=−5)

Figure 21:
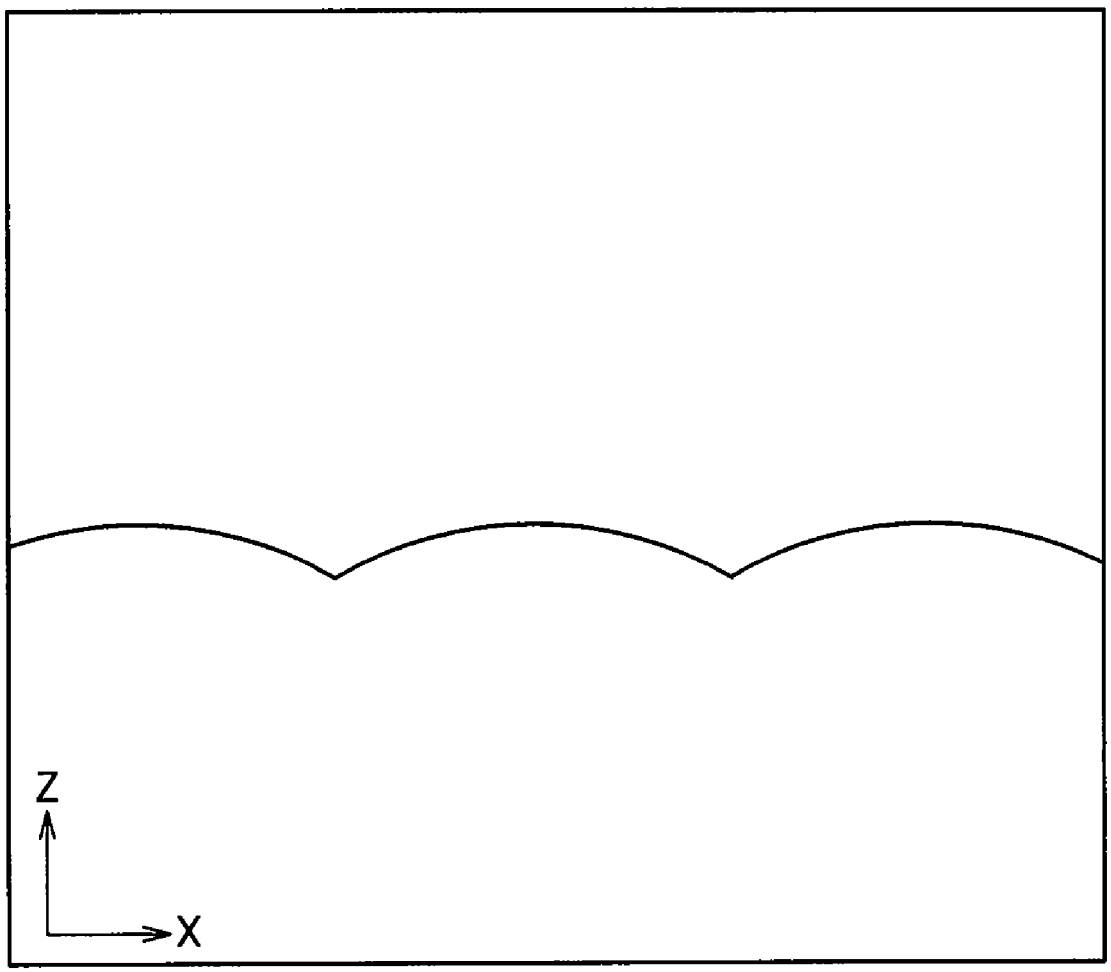
FIG. 21 is a schematic view showing part of an XZ section of a lens sheet of a working example 7 in an enlarged scale.

FIG. 21 shows the shape of an XZ section of a lens sheet of a working example 8 in an enlarged scale. Cylindrical lens elements having a finite focal distance on the emission side of illumination light and having a leftwardly and rightwardly symmetrical hyperboloidal face shape are arrayed successively on the surface of the lens sheet. The shape of the XZ section is represented by $Z=X^2/(50+\sqrt{(2500+4X^2)})$ obtained by substituting K=−5 and R=50 into the expression (1) given hereinabove.

This lens sheet has a sectional shape formed such that, when compared with the lens sheet of FIG. 19, the value of K is higher and the angle at which the asymptotes intersect with each other is reduced.

Figure 22:
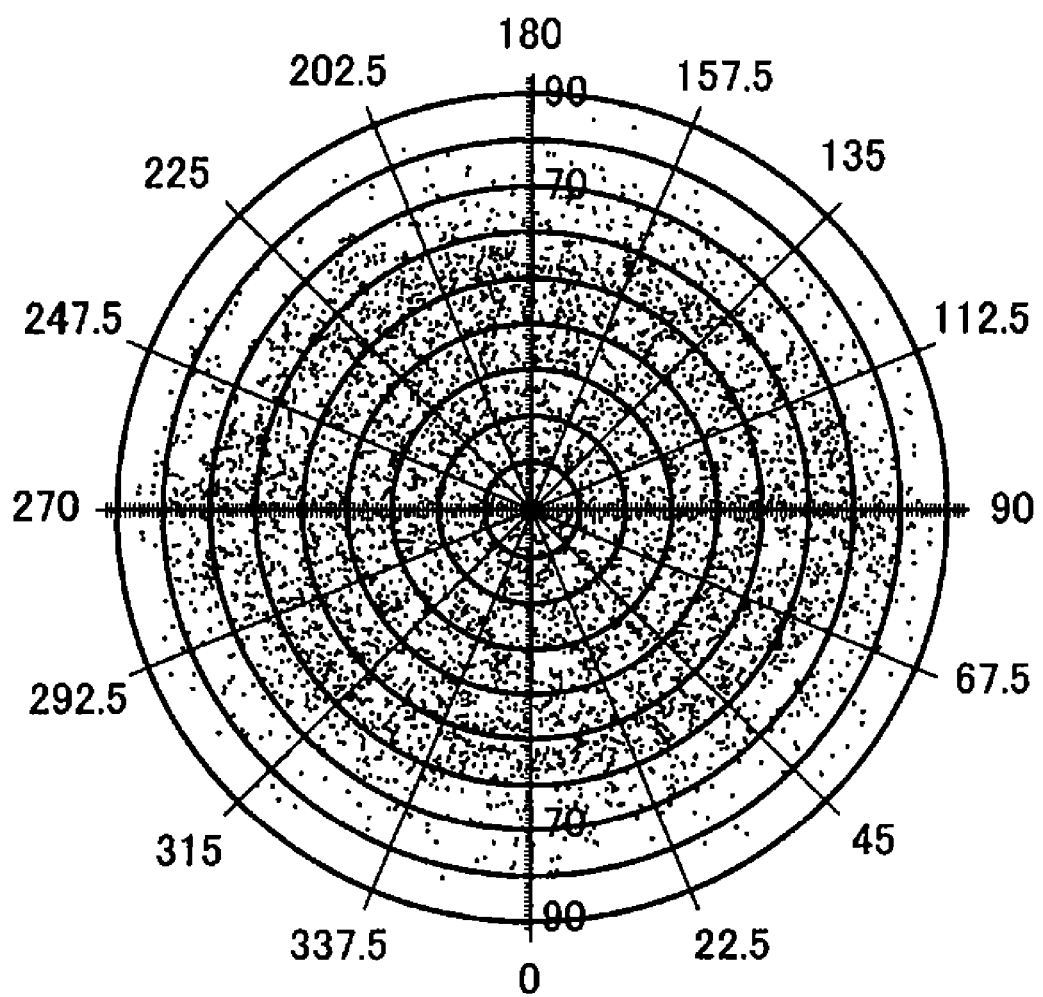
FIG. 22 is a distribution diagram illustrating an orientation characteristic of the lens sheet of the working example 7.

FIG. 22 is a distribution diagram representing the light distribution characteristic of the lens sheet shown in FIG. 21. As shown in FIG. 21, the lens sheet has a light distribution characteristic similar to that of the lens sheet of FIG. 17.

Working Example 8

(Where R=20, K=−4)

Figure 23:
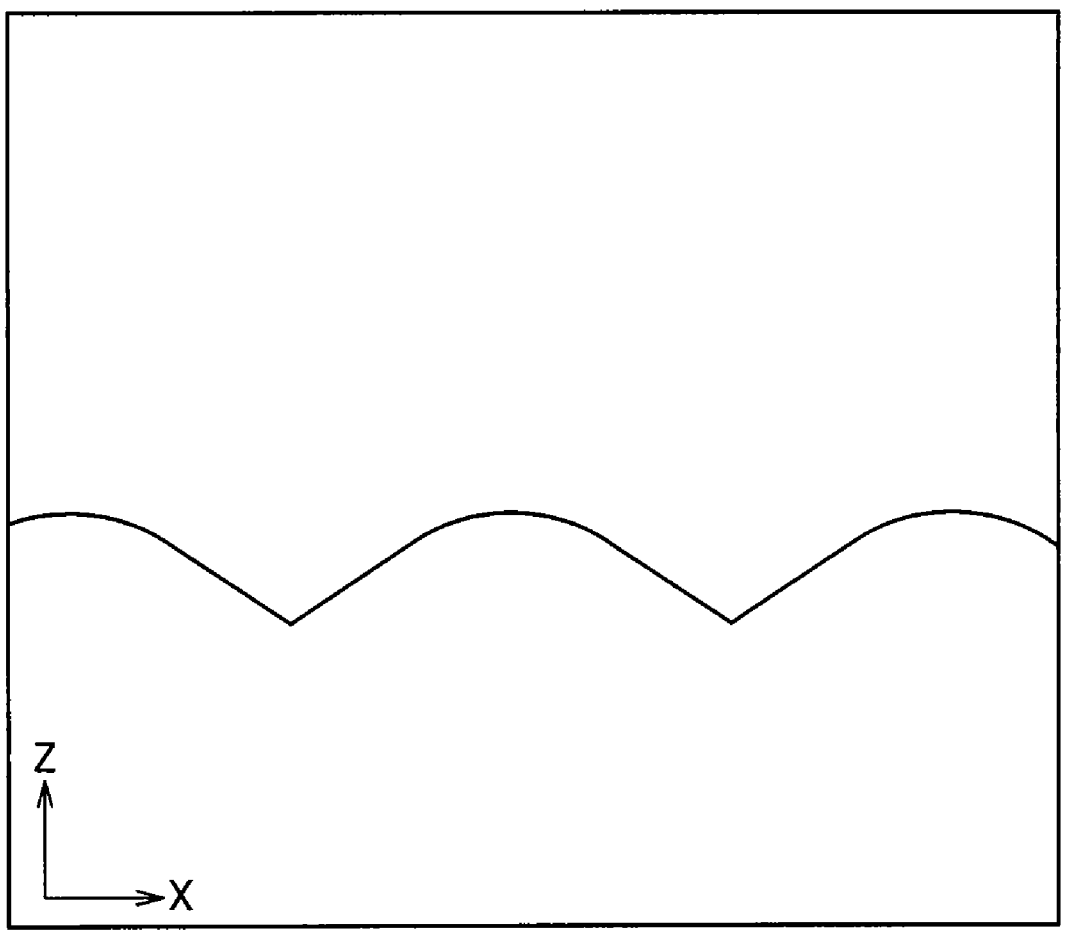
FIG. 23 is a schematic view showing part of an XZ section of a lens sheet of a working example 8 in an enlarged scale.

FIG. 23 shows the shape of an XZ section of a lens sheet of a working example 9 in an enlarged scale. Cylindrical lens elements having a finite focal distance on the emission side of illumination light and having a leftwardly and rightwardly symmetrical hyperboloidal face shape are arrayed successively on the surface of the lens sheet. The shape of the XZ section is represented by $Z=X^2/(20+\sqrt{(400+3X^2)})$ obtained by substituting K=−4 and R=20 into the expression (1) given hereinabove.

This lens sheet has a sectional shape formed such that, when compared with the lens sheet of FIG. 19, the value of K is higher and the angle at which the asymptotes intersect with each other is reduced.

Figure 24:
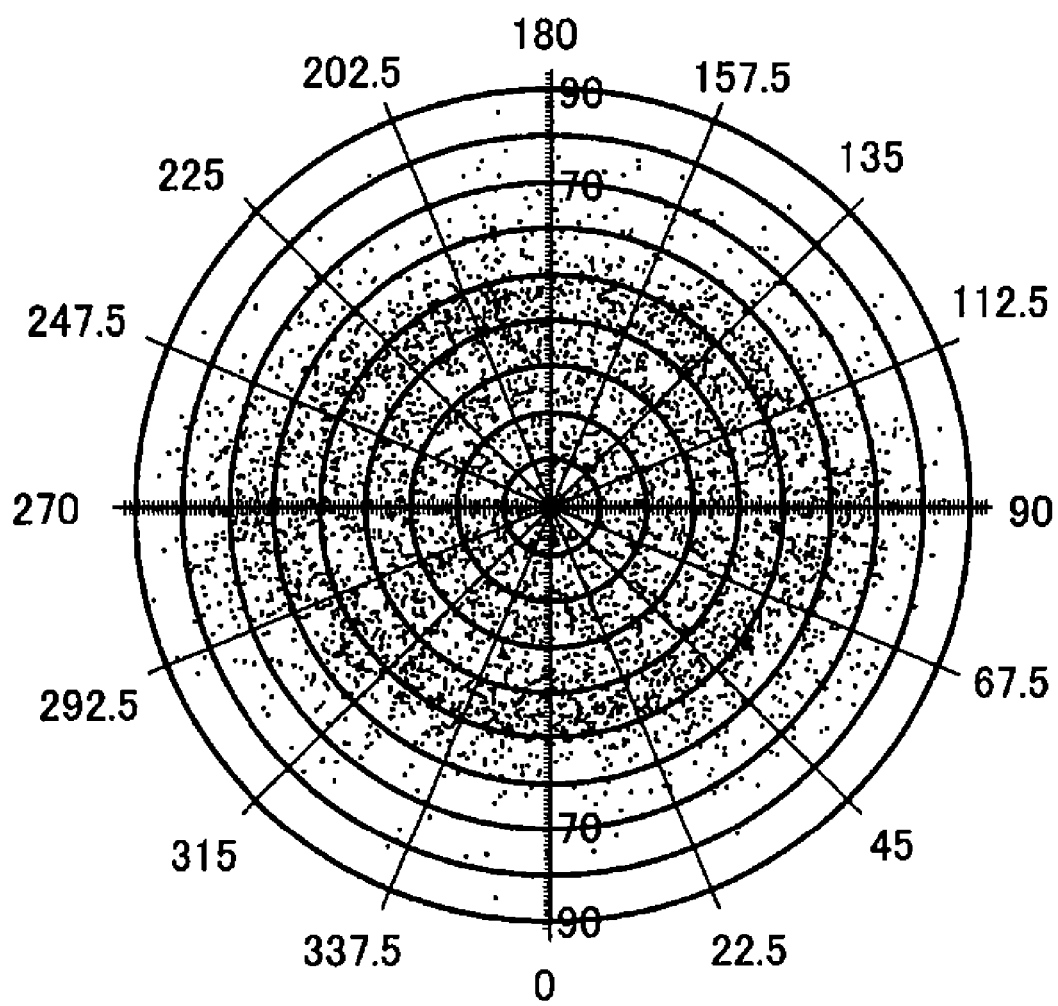
FIG. 24 is a distribution diagram illustrating an orientation characteristic of the lens sheet of the working example 8.

FIG. 24 is a distribution diagram representing the light distribution characteristic of the lens sheet shown in FIG. 23. As shown in FIG. 24, the lens sheet has a light distribution characteristic which is stronger in the front face direction when compared with the working examples described hereinabove, but still are not necessarily considered optimum from the point of view in use of a liquid crystal display. Accordingly, the value of K in the expression (1) preferably is within a range of −4<K<−1.

Now, study results relating to the numerical ranges of the radius R of curvature of the distal end vertex and the conic constant K based on the peak luminance distribution are described.

Working Example 9

Figure 25:
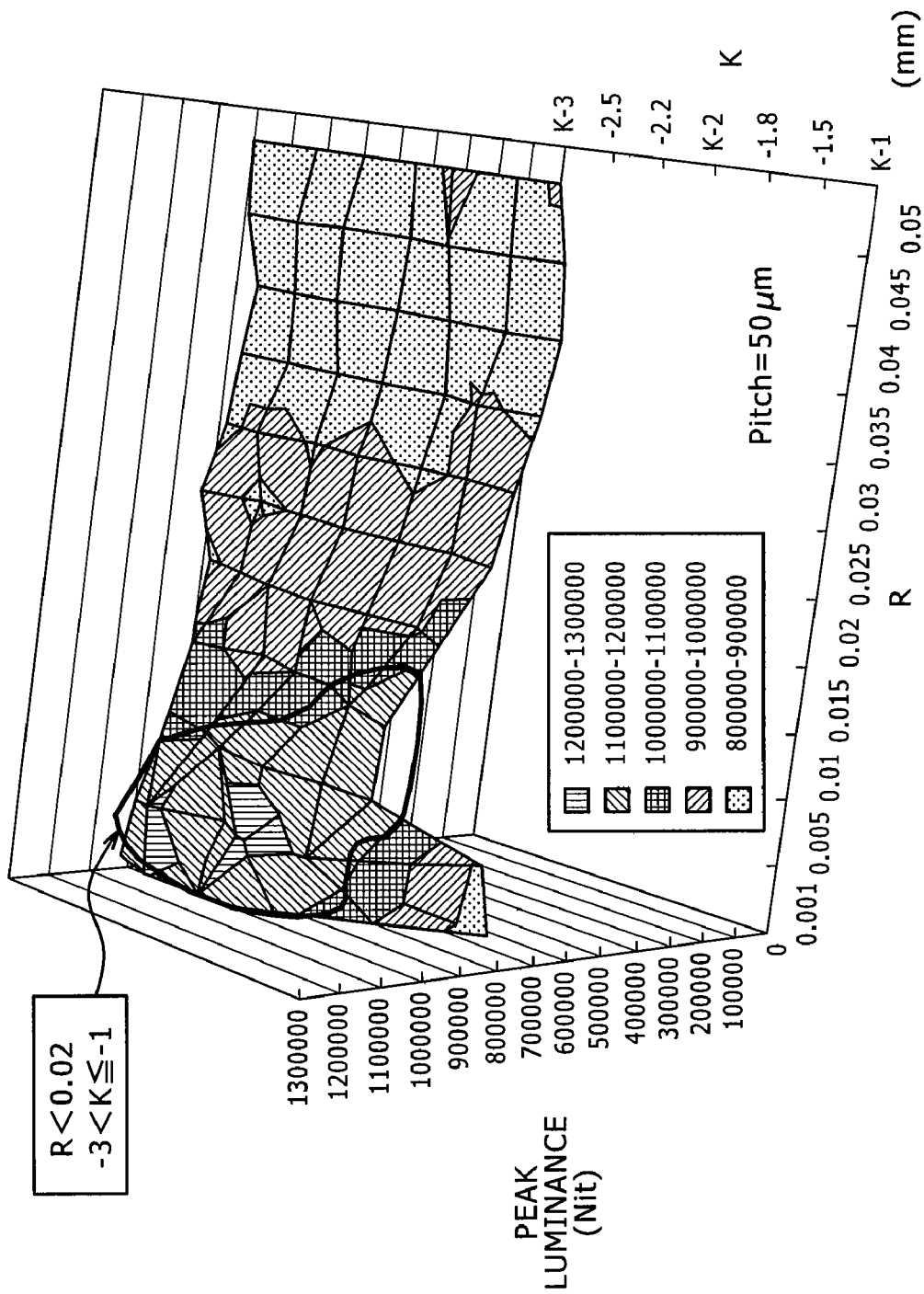
FIG. 25 is a peak luminance distribution diagram according to variation of a radius R of curvature of a distal end vertex and an aspheric coefficient A.

A peak luminance distribution in response to a variation of the radius R of curvature of the distal end vertex and the conic constant K according to the expression (1) given hereinabove was determined. FIG. 25 illustrates a peak luminance distribution in response a variation of the radius R of curvature of the distal end vertex and the point A. In FIG. 25, a region wherein the peak luminance is equal to or higher than 1,100,000 nits (Nit) is indicated by a delineating thick line.

Figure 26:
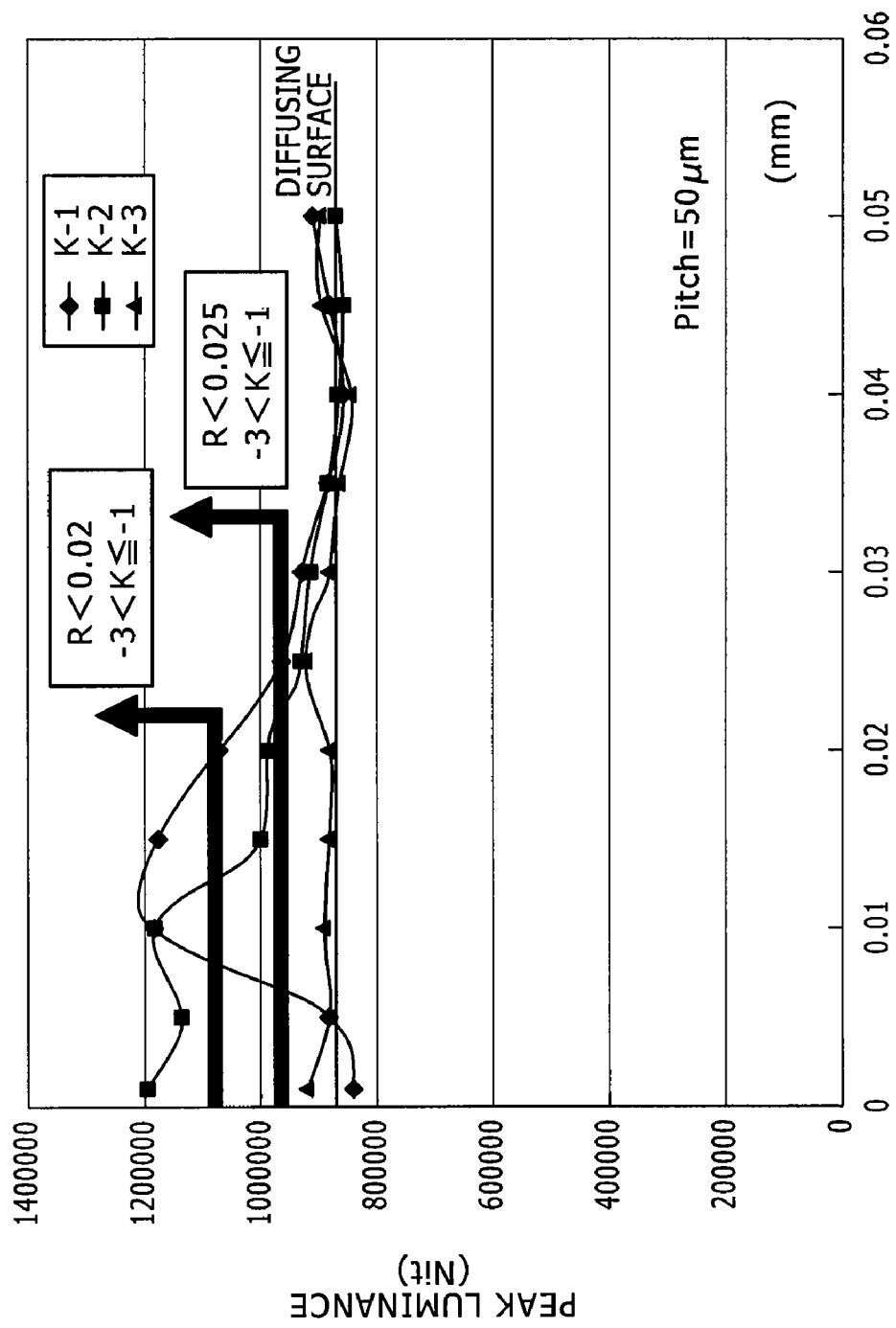
FIG. 26 is a graph illustrating a variation of the peak luminance distribution with respect to a distal end vertex curvature in the cases of K=−1, −2, −3.

FIG. 26 is a graph which illustrates a variation of the peak luminance distribution with respect to the radius R of curvature of the distal end vertex where K=−1, −2, −3. In FIG. 26, the luminance of a diffusing surface indicated by a straight line represents the diffusing surface of the diffusion sheet.

From FIGS. 25 and 26, it can be seen that the radius R of curvature of the distal end vertex and the conic constant K are preferably set within numerical ranges of R<0.025 mm=25 μm and −3<K≦−1, respectively, and more preferably set within numerical ranges of R<0.02 mm=20 μm and −3<K≦−1, respectively.

Where R<25 μm and −3<K≦−1 are satisfied, the peak luminance of the lens sheet can be enhanced by approximately 10% when compared with the luminance of the diffusing surface. Further, where R<20 μm and −3<K≦−1 are satisfied, the peak luminance of the lens sheet can be enhanced by approximately 20% when compared with the luminance of the diffusing surface.

Now, results of comparison and study of differences in shape, orientation characteristic and so forth between the lens sheets of the working examples and lenses of comparative examples are described.

Comparative Example 1

Figure 27:
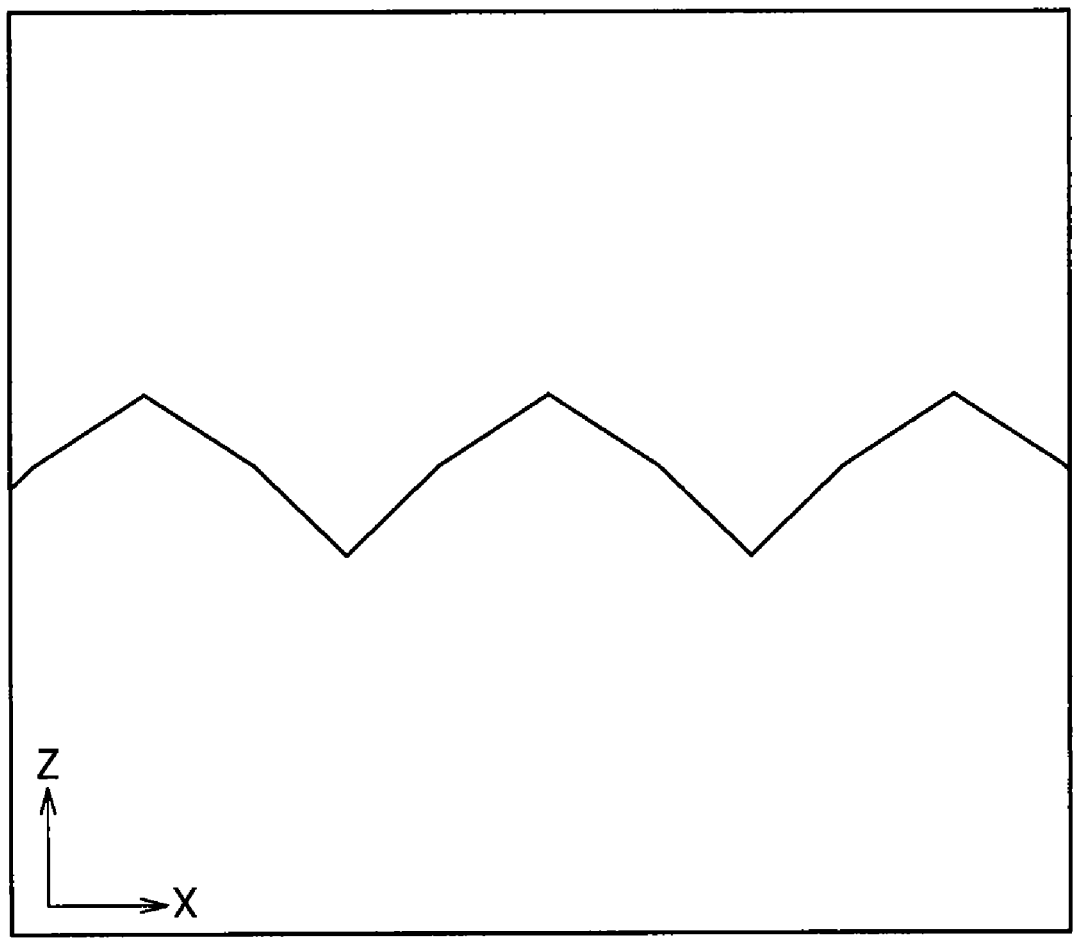
FIG. 27 is a schematic view showing part of an XZ section of a lens sheet of a comparative example 1 in an enlarged scale.
Figure 28:
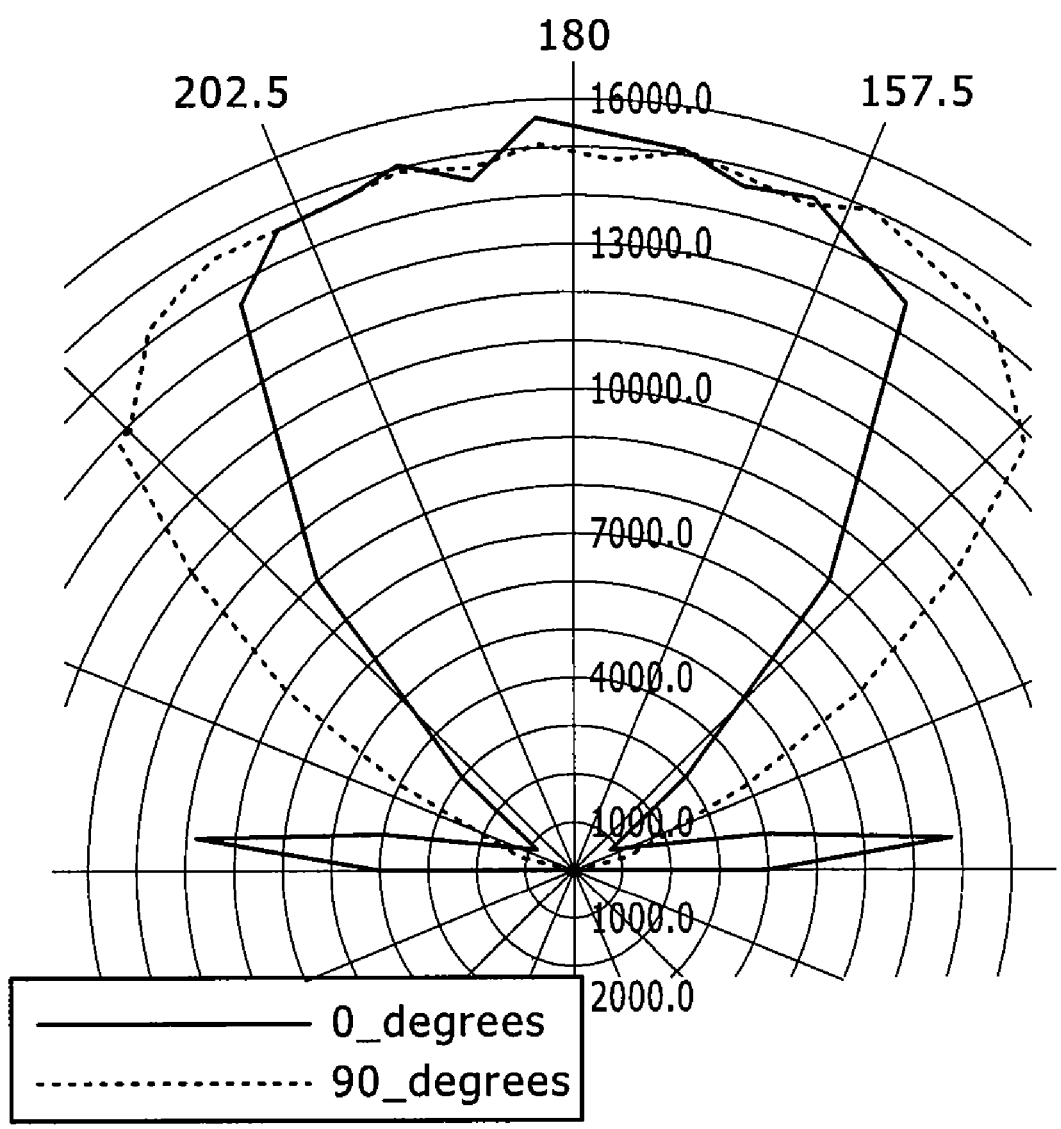
FIG. 28 is a schematic view illustrating a visual field characteristic of the lens sheet of the comparative example 1.

FIG. 27 shows the shape of an XZ section of a lens sheet of a comparative example 1 in an enlarged scale. FIG. 28 illustrates a visual field characteristic of the lens sheet of the comparative example 1.

The XZ sectional shape and the visual field characteristic shown in FIGS. 27 and 28 are based on the following expressions:

$$z = Ax \ (0 \leq x \leq B)$$
$$dz/dx = ((x+0.5T)/L - n(T-x)/M)/$$
$$((h-z)/L - nz/M) \ (B < x < T/2)$$
$$dz/dx = (nx/M' - (1.5T-x)/L'))/((h-z)/L' - nz/M')$$
$$(T/2 < x < T-B)$$
$$z = -A(x-T) \ (T-B \leq x \leq T)$$
$$\left(\text{where } L = \sqrt{((x+0.5)^2 + (z-h)^2)}, M = \sqrt{((T-x)^2 + z^2)}\right.$$
$$\left. L' = \sqrt{((1.5T-x)^2 + (z-h)^2)}, M' = \sqrt{(x^2 + z^2)}\right)$$

n represents the refraction factor of the shape unit, and T represents the width of the shape unit.)

Comparative Example 2

Figure 29:
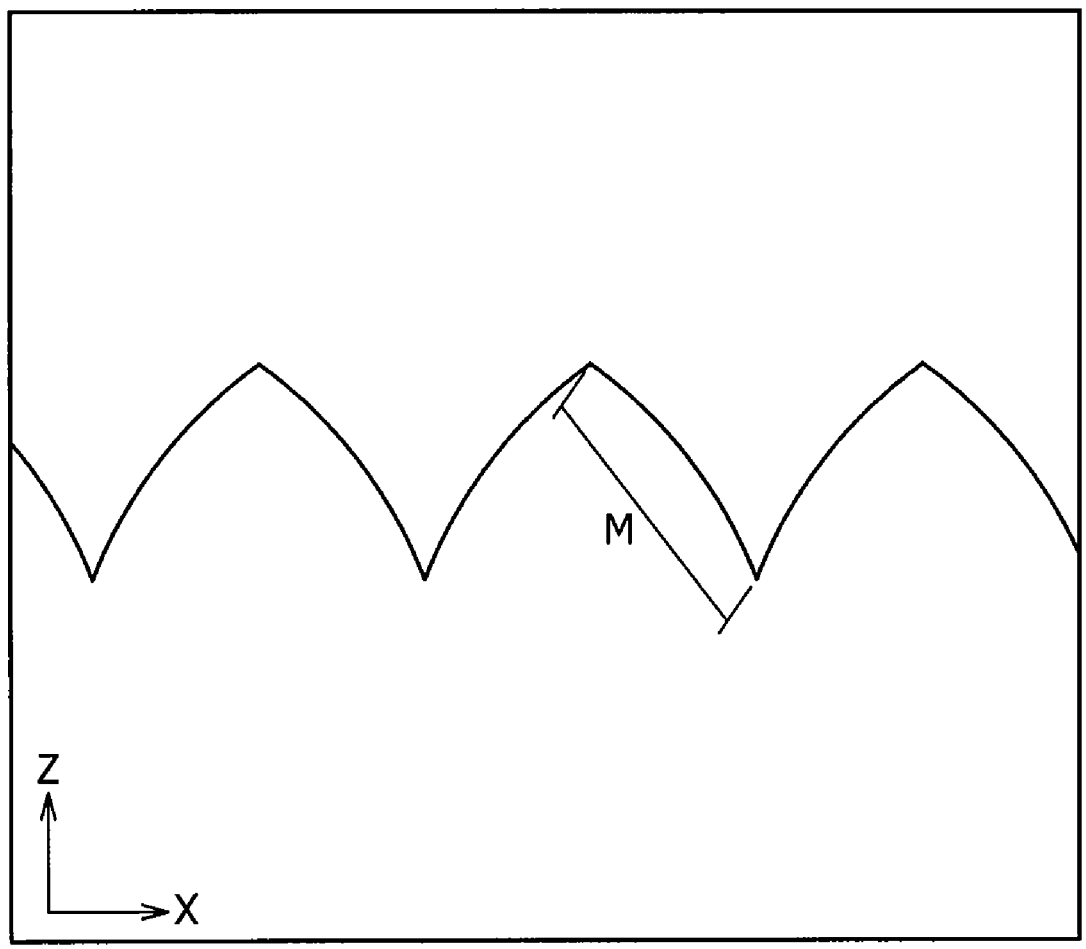
FIG. 29 is a schematic view showing part of an XZ section of a lens sheet of a comparative example 2 in an enlarged scale.
Figure 30:
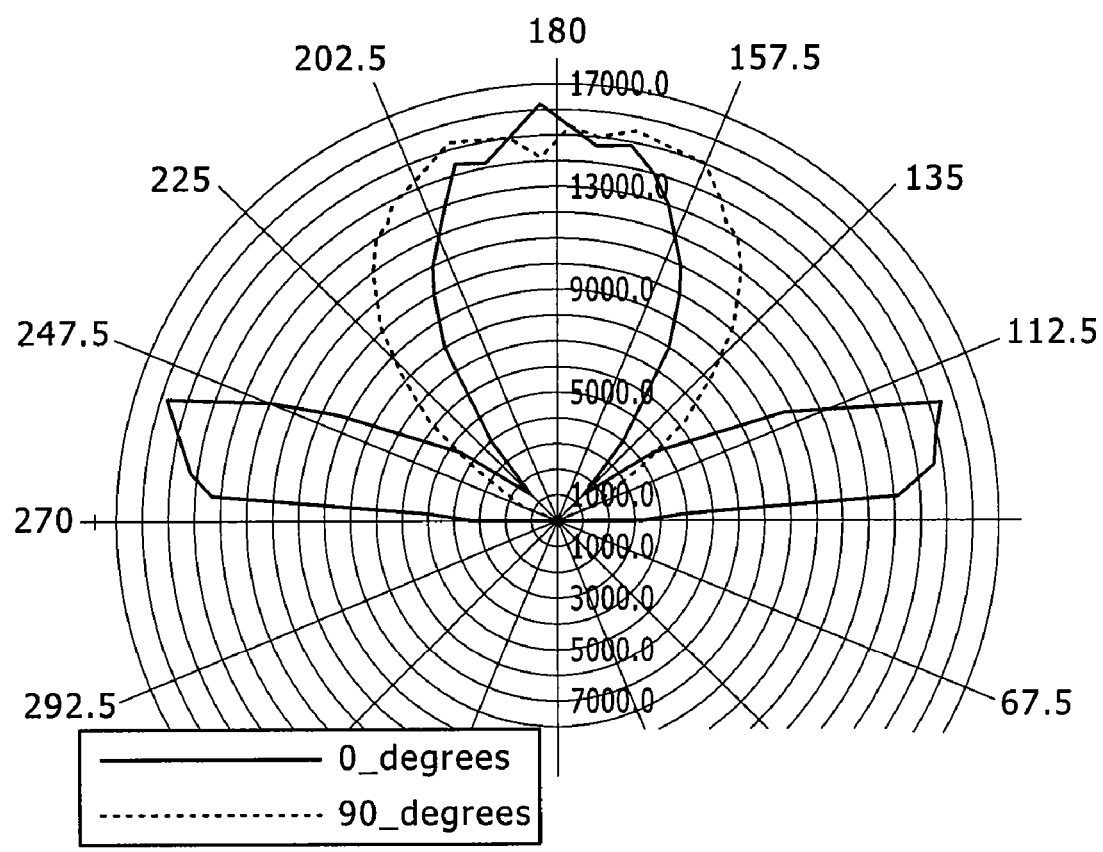
FIG. 30 is a schematic view illustrating a visual field characteristic of the lens sheet of the comparative example 2.

FIG. 29 shows the shape of an XZ section of a lens sheet of a comparative example 2 in an enlarged scale. FIG. 30 illustrates a visual field characteristic of the lens sheet of the comparative example 2.

The lens sheet of the present comparative example 3 has a large number of prism units formed in parallel to each other on one of faces thereof. The prism units have a cross section of a triangular shape, and the vertical angle thereof is within a range of 60 to 150 degrees. Further, the difference in height between swells of the prism faces is equal to or greater than 1 μm and is equal to or smaller than ⅕ of the width M of the prism faces.

Working Example 10

Figure 31:
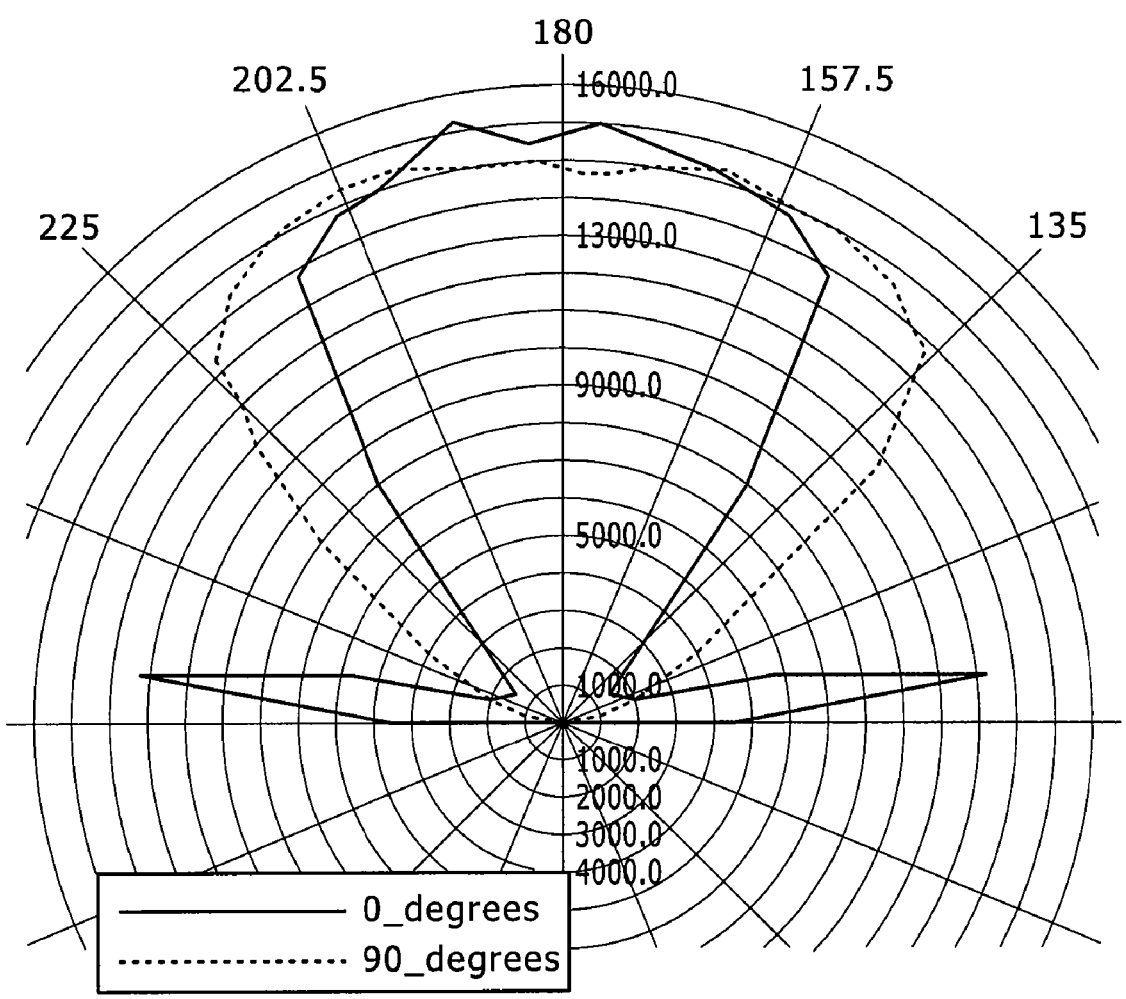
FIG. 31 is a schematic view illustrating a visual angle characteristic of a lens sheet of a working example 10.

FIG. 31 illustrates a visual field characteristic of a lens sheet of a working example 10. The XZ section of the lens sheet of the working example 10 is represented by $Z=X^2/(7.5+\sqrt{(56.5+X^2)})$ obtained by substituting K=−2 and R=7.5 into the expression (1) given hereinabove.

Differences between the working example 10 and the comparative example 1 are studied. The working example 10 has an integrated curved columnar structure wherein it does not have a flat face portion represented by Z=Ax and z=−A(x−T) as in the comparative example 1 and flat faces connecting to convex curved columnar elements whose generating lines extend parallel to each other are not coupled and besides it does not have a vertex which forms an inflection point.

Further, where the comparative example 1 is produced by a melt extrusion method, it is so poor in transfer property of the lens shape due to the inflection point at the vertex that the shape of the vertex is not transferred and a desired function cannot be obtained. In contrast, since the working example 10 does not have an inflection point which forms a vertex, it is superior in transfer property of the lens shape and a desired function can be obtained. Also in this regard, the comparative example 1 and the working example 10 are different from each other.

Now, the working example 10 and the comparative example 2 are studied. The working example has an integral curved face columnar structure wherein it does not have a vertex which forms an inflection point as in the comparative example 2 and the difference in height at any other than the distal end curvature portion is within 1 μm.

Meanwhile, since the comparative example 2 has a prism shape, a side robe appears in the proximity of the inflection point at the vertex. Further, the front face luminance is reduced by the amount of the difference in height from the prism face.

Now, results of studies relating to convex portions provided on the rear face side of a lens sheet are described.

Working Example 11

First, an elastic roll was produced in the following manner. A seamless tube was formed by Ni plating, and a Cr plating process was performed for the surface of the seamless tube. Thereafter, the plated Cr layer was polished to 0.2 S to produce a seamless tube (hereinafter referred to as flexible sleeve) having a thickness of 340 microns. Then, the outer circumferential face of the flexible sleeve was processed with a stainless steel material (SUS material).

Then, glass beads having a predetermined particle size (diameter) were blasted into the flexible sleeve by a bead blast processing machine produced by Fuji Manufacturing Co., Ltd. to form a concave and convex shape on the outer circumferential face of the flexible sleeve. It is to be noted that the blasting angle was approximately 30° with respect to a normal line to the outer circumferential face of the flexible sleeve.

Then, an elastic member was adhered to a roll in which coolant can be circulated and the flexible sleeve was fitted on the elastic member to obtain an elastic roll having a configuration that cooling water is circulated between the resilient member and the flexible sleeve. It is to be noted that, as the resilient member, nitrile-butadiene rubber (NBR) having a hardness of 85 degrees was used and the thickness thereof was set to 20 mm. Further, the diameter Φ of the elastic roll was set to 260 mm and the face length (width of the molding roll) was set to 450 mm.

Then, the elastic roll obtained in this manner was attached to an extruded sheet precision molding apparatus, and a lens sheet was produced in the following manner.

First, the polycarbonate E2000R (by Mitsubishi Engineering-Plastic Corporation) was successively discharged from the T die until it was nipped by the forming roll and the elastic roll, and then was wrapped around the forming roll. It is to be noted that the surface temperature of the forming roll was kept at Tg+35° C., and the surface temperature of the lens sheet 14 was kept at 75° C. Here, Tg is the glass transition temperature of the polycarbonate resin.

Thereafter, the sheet was exfoliated from the forming roll by the cooling roll. It is to be noted that the surface temperature of the cooling water was kept at 115° C. Further, the speed of the takeup machine was set to 7 m/min. From the foregoing, a lens sheet of 200 μm thick having the cylindrical lens elements provided on the front face thereof and having convex portions provided on the rear face thereof was obtained.

The surface temperatures of the forming roll and the elastic roll described above were measured at a position immediately preceding to the nip at which the measurement is least likely to be influenced by the heat of the resin while a sensor was contacted with the surface of the rolls. Further, the surface temperature of the cooling roll was measured at a position at which the sheet was nipped by the cooling roll and the forming roll while a sensor was contacted with the surface of the cooling roll. It is to be noted that, as the thermometers, a handy type digital thermometer (by Chino Corporation, commodity name: ND511-KHN) was used, and as the sensors, a sensor for surface temperature measurement (Anritsu Meter Co., Ltd., commodity name U-161K-00-D0-1) was used.

Working Examples 12 to 21

Lens sheets were obtained in a similar manner as in the working example 1 described hereinabove except that a concave and convex shape was formed on an outer circumferential face of a flexible sleeve using glass beads having a particle size (diameter) different among the different working examples and an elastic roll having the flexible sleeve provided thereon was used to form the rear face side of the sheet.

Then, evaluation of the number of convex portions provided on the rear face side of the lens sheets of the working examples 11 to 21 obtained in such a manner as described above, the distance between the convex portions, the ten-point average roughness, the height of the convex portions at which the convex portion area occupies 1%, the dynamic coefficient of friction, the front face luminance relative value, the sliding test and the external appearance blurring was conducted.

Evaluation of the Number of Convex Portions

The rear face of the lens sheets was measured by a three-dimensional measuring instrument (by Kosaka Ltd., commodity name: E4100). Then, the measured surface shape was subject to oblique arithmetic operation-correction of a measurement oblique face by the least squares method to obtain an average central plane (JIS B0601-1994). Thereafter, the number of convex portions having a height equal to or greater than 0.20 μm from the average central face was calculated.

Evaluation of the Distance between Convex Portions

An average distance between those convex portions having a height of 0.2 μm from the average central plane described above was determined.

Evaluation of the Ten-Point Average Roughness

Further, the differences between five greatest heights and five greatest valley heights from the average central plane described above were averaged to calculate the ten-point average roughness SRz.

Evaluation of the Height of those Convex portions at Which the Convex Portion Area Occupies 1%

The height from a certain central plane to a cutting plane along which the convex portions were cut in parallel to the central plane when, within a projection range from a normal direction to the central plane, the ratio of the total area of the cross sections of the convex portions was 1% with respect to the projection area was determined. The height at which the sectional area exhibited the area ratio of 1% (5,000 μm$^2$) was determined within a range of 1,000 μm×500 μm.

Evaluation of the Dynamic Coefficient of Friction

A surface measuring instrument (by Shinto Scientific Co., Ltd., commodity name: Type-22) was used to measure the friction of the lens sheet rear face side with respect to the diffusion sheet BS702 by Keiwa as an object of sliding motion with a load of 200 g.

Evaluation of the Front Face Luminance Relative Value

In order to evaluate actual machine characteristics, a lens sheet was mounted on a 19-inch TV (television) set on the market manufactured by Sony. In particular, a diffuser for mixture of light and non-uniformity elimination and a lens sheet of a working example were mounted successively on a unit in which a cold cathode fluorescent tube (CCFL) was accommodated to form a backlight system, and a liquid crystal panel was mounted on the backlight system to obtain a liquid crystal display apparatus. Then, the front face luminance of the liquid crystal display apparatus was measured by means of the CS-1000 by Konica Minolta.

Then, a lens sheet produced in a similar manner to a working example except that the formation of convex portions on the rear face side was omitted was mounted similarly on a 19-inch TV receiver on the market manufactured by Sony to obtain a liquid crystal display apparatus, and the front face luminance of the liquid crystal display apparatus was measured by means of the CS-1000 by Konica Minolta.

Then, the relative value of the front face luminance of the former liquid crystal display apparatus was determined with reference to the front face luminance of the latter liquid crystal display apparatus.

Evaluation by a Sliding Test

A surface measuring instrument (by Shinto Scientific Co., Ltd., commodity name: Heiden Type-22) was used to perform a sliding test between the rear surface of a lens sheet and a diffuser (MS resin). It is to be noted that the load was set to 200 g and the number of times of reciprocating sliding movement was set to 100. Then, a scar of the sliding face was observed through a backlight unit for observation of a photographic negative on the market, and the degree of the scar was evaluated into three stages including (1) that a few scars exist, (2) that several scars exit and (3) that scars exist over an overall area.

Evaluation of the External Appearance Blurring

When a lens sheet was mounted on a 19-inch TV receiver on the market manufactured by Sony to observe a liquid crystal panel in a similar manner as in the case of the evaluation of the front face luminance relative value described above, it was confirmed by visual observation whether or not a blurring state on an external appearance (ununiformity in luminance) was observed while the observation direction was successively changed.

Working Examples 22 to 32

Lens sheets having no lenses provided on the front face side and having a concave and convex shape provided on the rear face side were obtained in a similar manner as in the working examples 11 to 21 described hereinabove except that a forming roll having a mirror face-like molding face was prepared and used to prepare a lens sheet.

Evaluation of the Haze

The haze (degree of cloudiness) of the lens sheets of the working examples 22 to 32 obtained in such a manner as described above was measured using a haze meter (by Murakami Color Research Laboratory, commodity name: HM-150).

Evaluation of the Average Inclination Gradient

The average inclination gradient of the lens sheets of the working examples 22 to 32 obtained in such a manner as described above was determined.

The average inclination gradient is given by the following expression where the rectangular coordinate axes of the X and Y axes are placed on the center of a roughness curve and an axis perpendicular to the center plane is set as the Z axis and the roughness curve is represented by f(x, y) while the size of the reference plane is represented by Lx and Ly:

$$\delta a = \frac{1}{S_M} \int_0^{Lx} \int_0^{Ly} \sqrt{\left(\frac{\delta f}{\delta x}\right)^2 + \left(\frac{\delta f}{\delta y}\right)^2} \, dx \, dy$$

$$S_M = Lx \times Ly$$

FIGS. 32 and 33 illustrate results of the evaluation obtained in such a manner as described above. It is to be noted that numerals in the column of a decision result of the sliding test indicates the following decision results.

Figure 34:
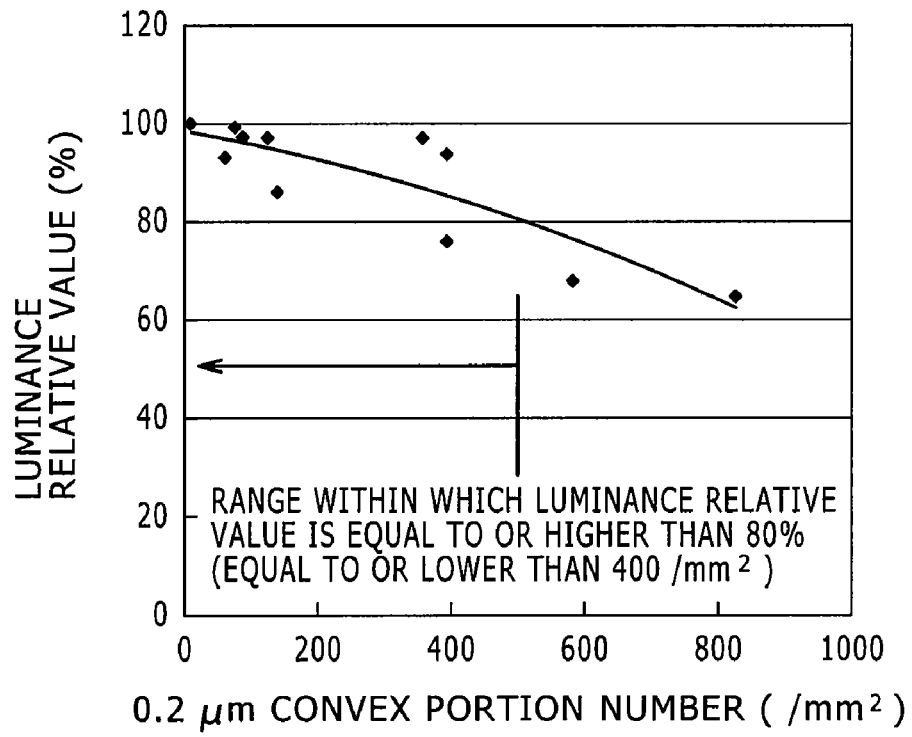
FIG. 34 is a graph illustrating a relationship between the number of convex portions of a size equal to or greater than 0.2 μm and the luminance relative value.
Figure 35:
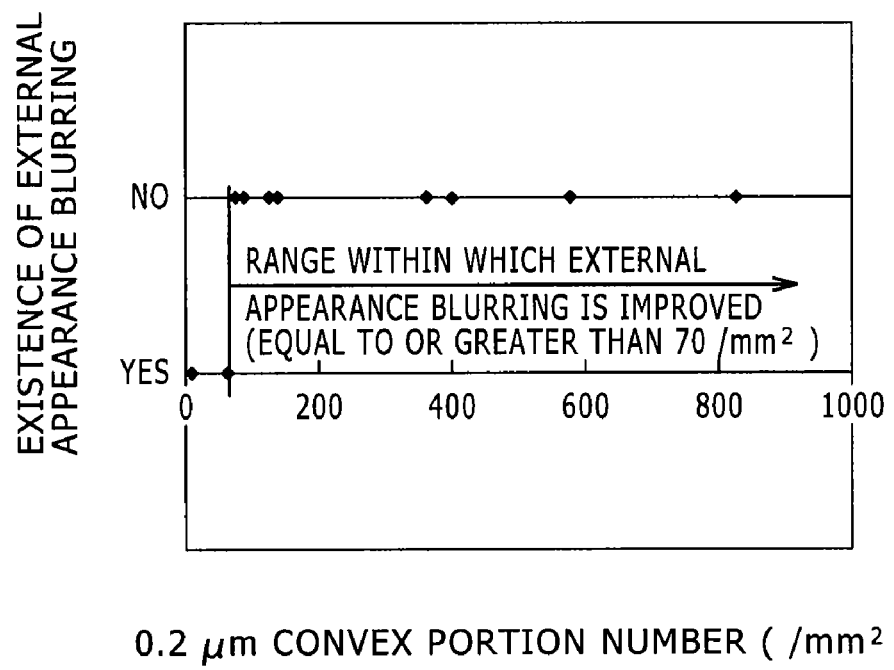
FIG. 35 is a graph illustrating the number of convex portions of a size equal to or greater than 0.2 μm and the external appearance blurring.
Figure 36:
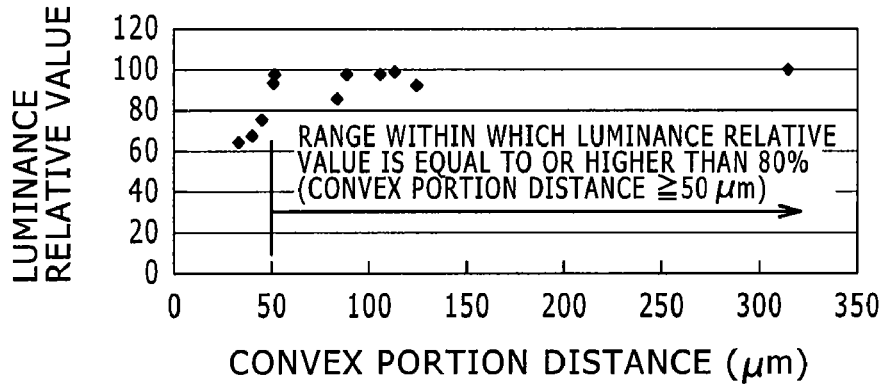
FIG. 36 is a graph illustrating a relationship between the distance between convex portions of s size equal to or greater than 0.2 μm and the luminance relative value.
Figure 37:
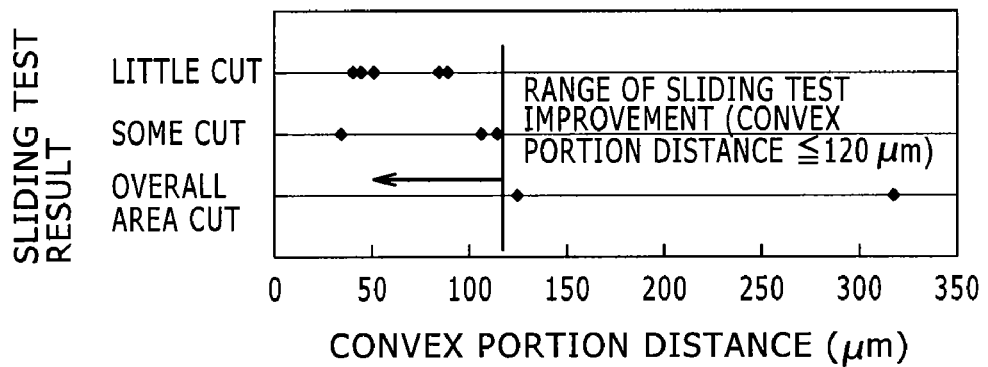
FIG. 37 is a graph illustrating a relationship between the distance between convex portions of a size equal to or greater than 0.2 μm and a result of a sliding test.
Figure 38:
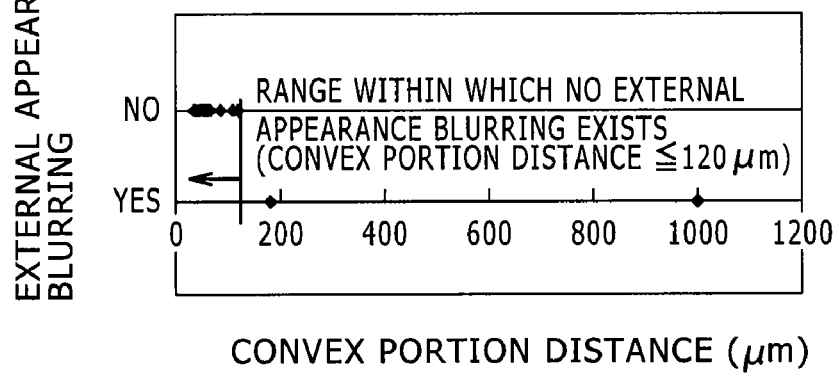
FIG. 38 is a graph illustrating a relationship between the distance between convex portions of a size equal to or greater than 0.2 μm and the external appearance blurring.
Figure 39:
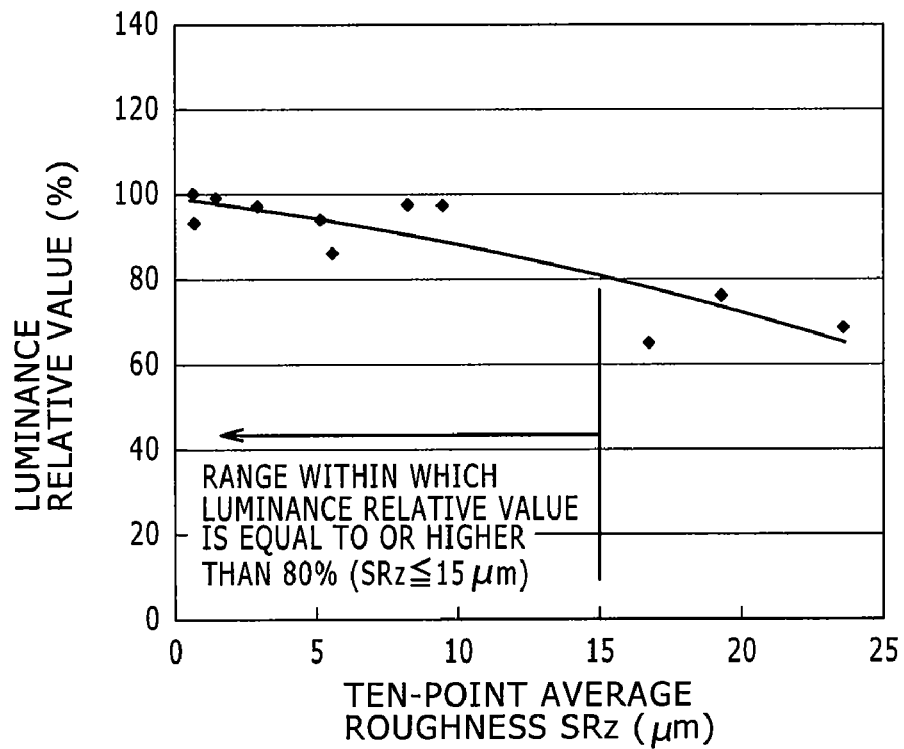
FIG. 39 is a graph illustrating a relationship between the ten-point average roughness SRz and the luminance relative value.
Figure 40:
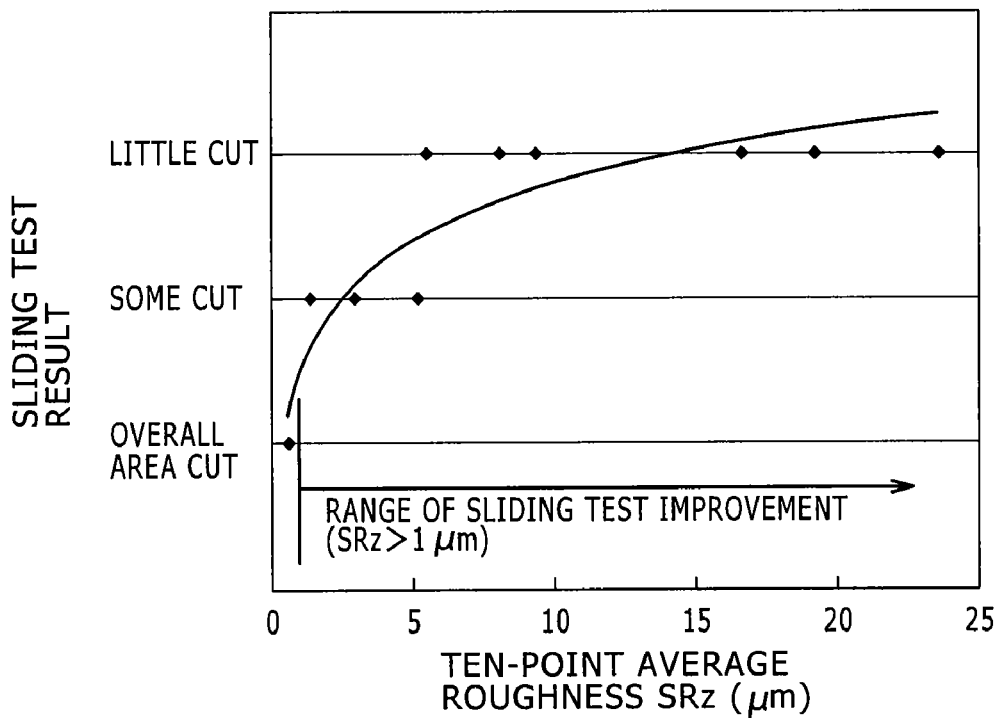
FIG. 40 is a graph illustrating a relationship between the ten-point average roughness SRz and a result of a sliding test.
Figure 41:
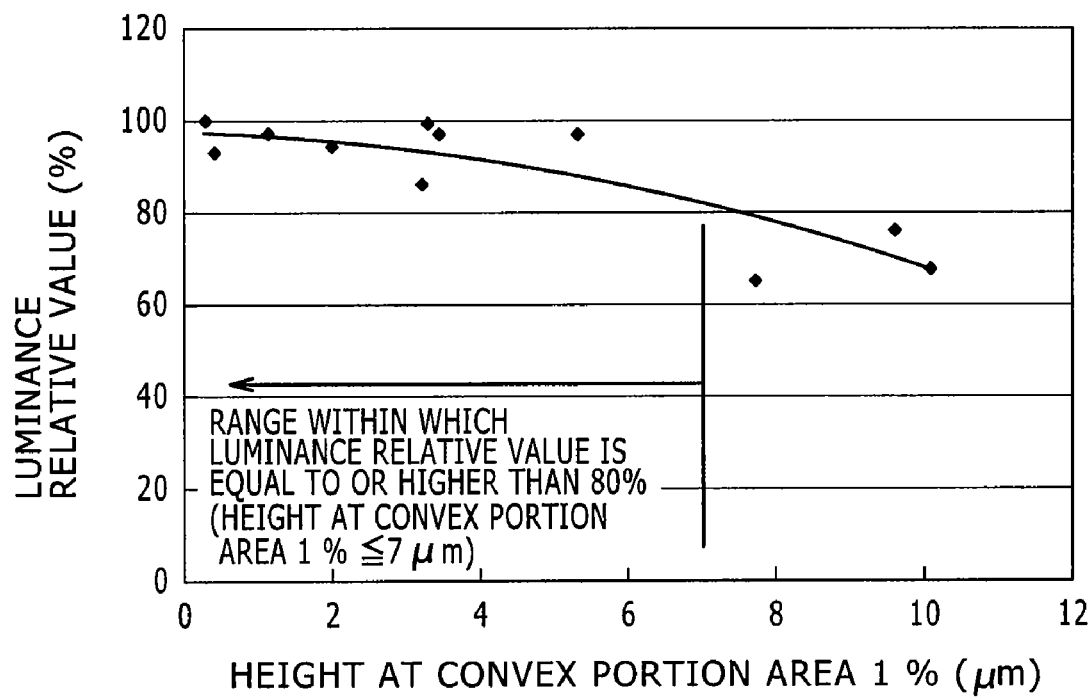
FIG. 41 is a graph illustrating a relationship between the height at which the convex portion area occupies 1% and the luminance relative value.
Figure 42:
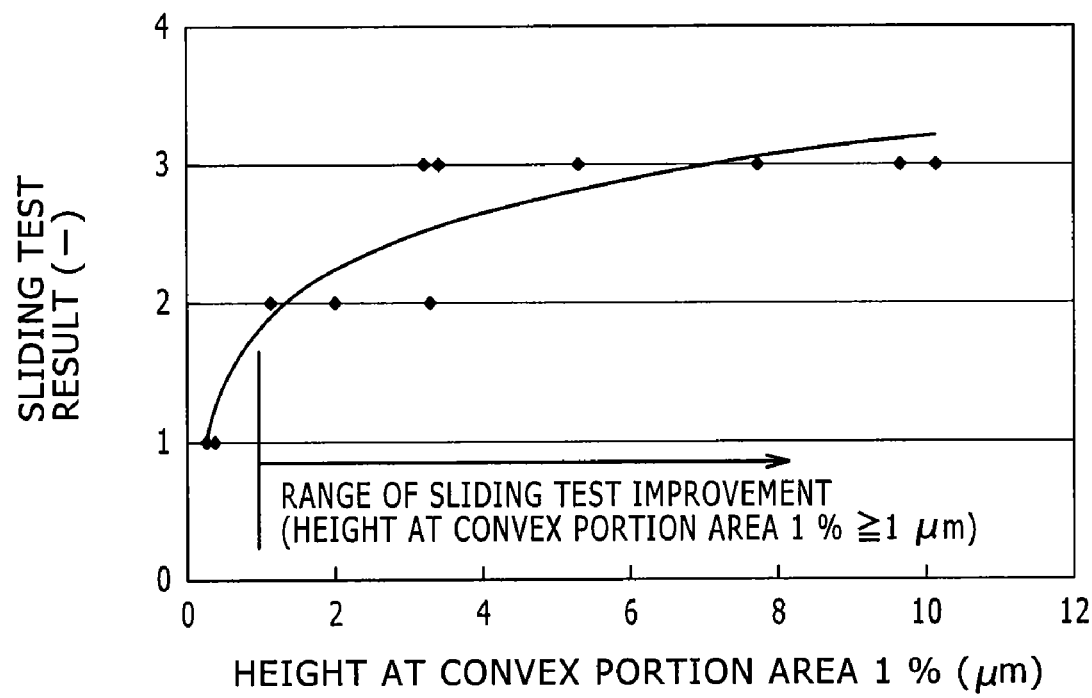
FIG. 42 is a graph illustrating the height at which the convex portion area occupies 1% and a result of the sliding test.
Figure 43:
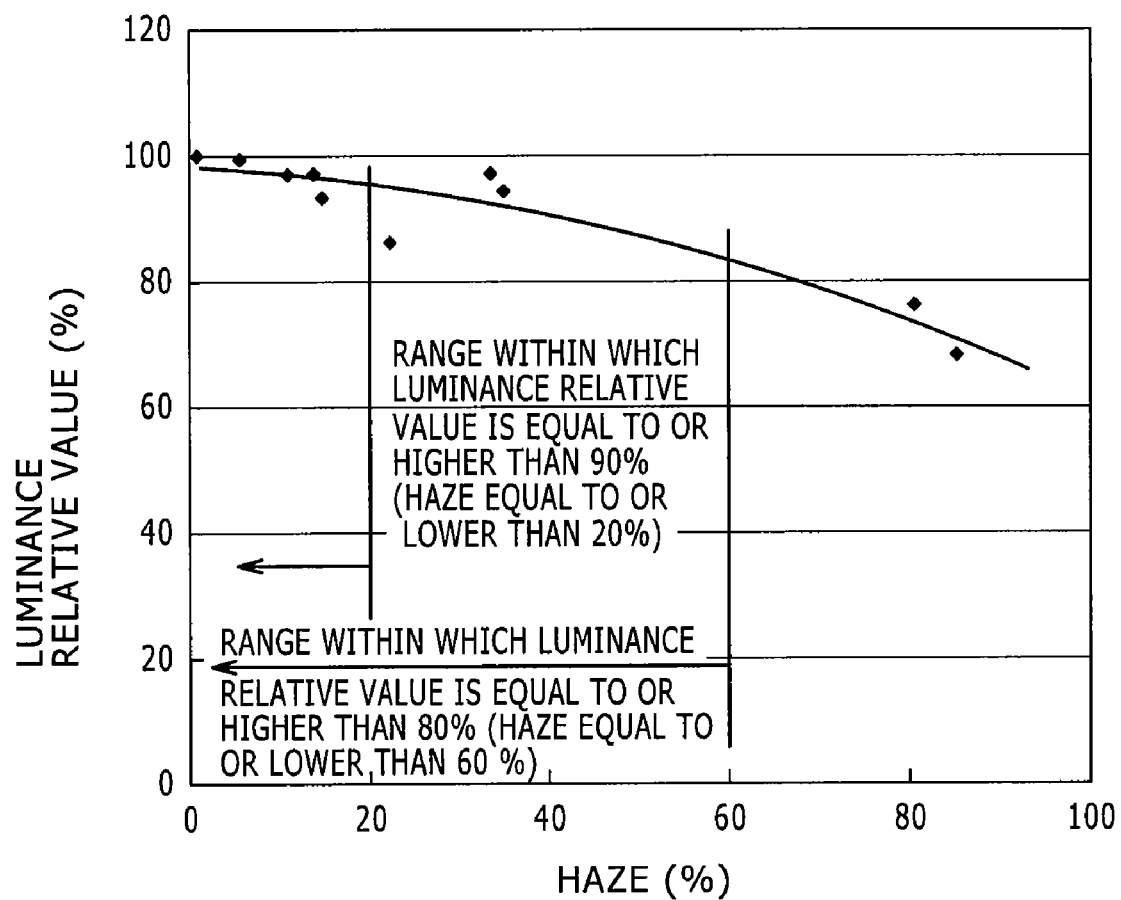
FIG. 43 is a graph illustrating a relationship between the haze and the luminance relative value.
Figure 44:
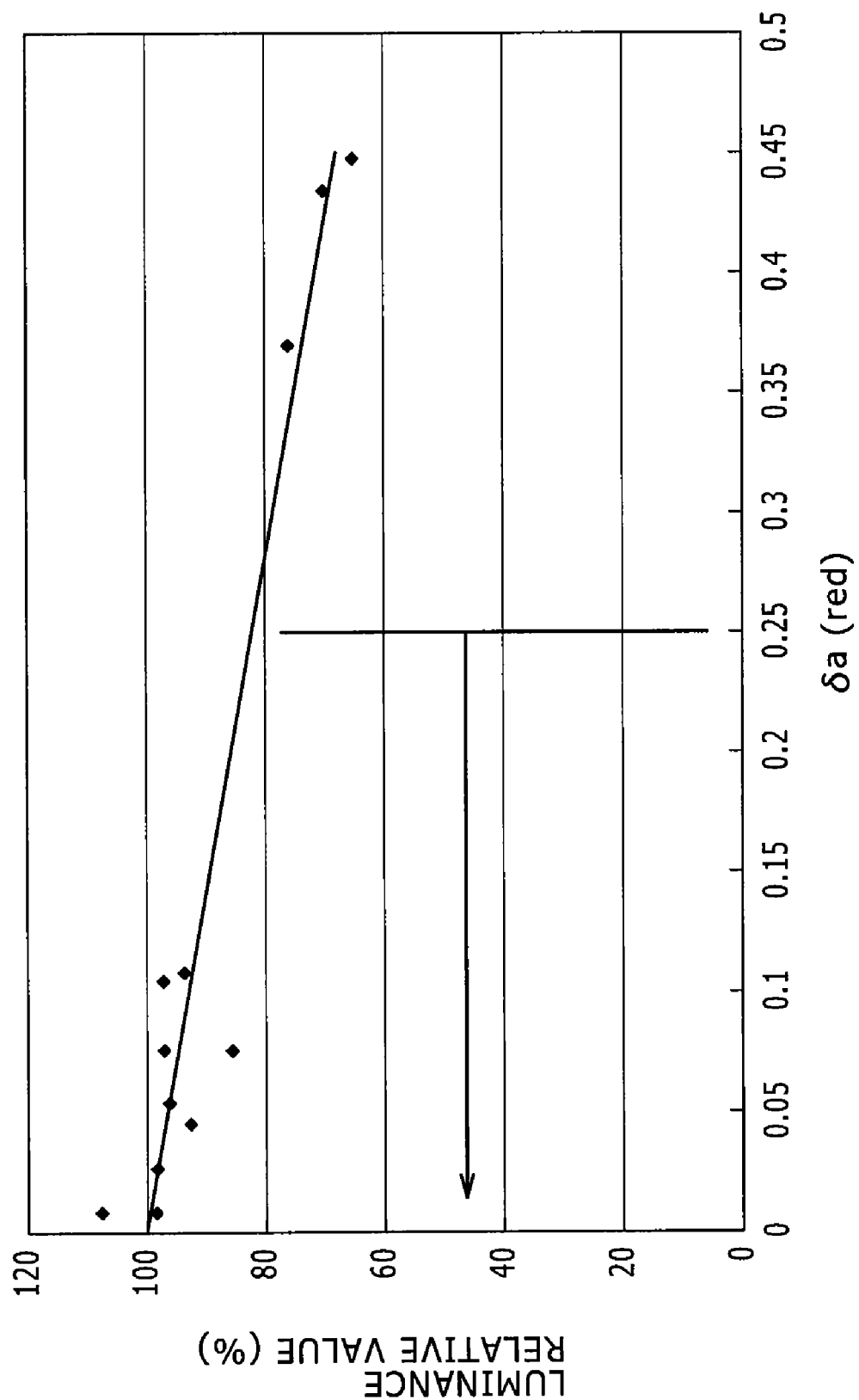
FIG. 44 is a graph illustrating a relationship between the average inclination gradient and the luminance relative value.

1: scars exist over an overall area, 2: several scars exist, 3: a few scars exist FIG. 34 is a graph illustrating a relationship between the number of those convex portions equal to or greater than 0.2 μm and the luminance relative value. FIG. 35 is a graph illustrating a relationship between the number of those convex portions equal to or greater than 0.2 μm and the external appearance blurring. FIG. 36 is a graph illustrating a relationship between the distance between those convex portions equal to or greater than 0.2 μm and the luminance relative value. FIG. 37 is a graph illustrating a relationship between the distance between those convex portions equal to or greater than 0.2 μm and the sliding test result. FIG. 38 is a graph illustrating a relationship between the number of those convex portions equal to or greater than 0.2 μm and the external appearance blurring. FIG. 39 is a graph illustrating a relationship between the ten-point average roughness SRz and the luminance relative value. FIG. 40 is a graph illustrating a relationship between the ten-point average roughness SRz and the sliding test result. FIG. 41 is a graph illustrating a relationship between the height at which the convex portion area occupies 1% and the luminance relative value. FIG. 42 is a graph illustrating a relationship between the height at which the convex portion area occupies 1% and the sliding test result. FIG. 43 is a graph illustrating a relationship between the haze and the luminance relative value. FIG. 44 is a graph illustrating a relationship between the average inclination gradient and the luminance relative value.

From the evaluation results of FIGS. 32 to 43, the followings can be recognized.

Evaluation Results of the Number of Convex Portions

From the evaluation result of the external appearance blurring (refer to FIG. 35), it can be recognized that, by setting the density of convex portions equal to or greater than 70/mm², the external appearance blurring caused by interference of the diffuser provided on the rear face side of a lens sheet with the flat face portion can be improved.

Further, from the evaluation result of the front face luminance relative value (refer to FIG. 34), it can be recognized that, by setting the density of convex portions equal to or lower than 400/mm², a drop of the luminance of a liquid crystal display apparatus caused by provision of the convex portions on the rear face side of a lens sheet can be suppressed.

Evaluation Results of the Distance Between the Convex Portions

From the evaluation result of the front face luminance relative value (refer to FIG. 36), it can be recognized that, by setting the average distance between the convex portions equal to or more than 50 μm, a drop of the luminance of a liquid crystal display apparatus caused by provision of the convex portions on the rear face side of a lens sheet can be suppressed.

Further, from the evaluation result of the sliding test and the evaluation result of the external appearance blurring (refer to FIGS. 37 and 38), it can be recognized that, by setting the average distance between the convex portions equal to or smaller than 120 μm, formation of scars on the surface of the diffuser by the rear face of the lens sheet can be prevented and the external appearance blurring caused by interference of the diffuser provided on the rear face side of the lens sheet with the flat face portion can be improved.

Evaluation Results of the Ten-Point Average Roughness

From the evaluation result of the sliding test and the evaluation result of the external appearance blurring (refer to FIGS. 32 and 40), it can be recognized that, by setting the ten-point average roughness SRz of the convex portions equal to or higher than 1 μm, formation of scars on the surface of the diffuser by the rear face of the lens sheet can be prevented and the external appearance blurring caused by interference of the diffuser provided on the rear face side of the lens sheet with the flat face portion can be improved.

From the evaluation result of the front face luminance relative value (refer to FIG. 39), it can be recognized that, by setting the ten-point average roughness SRz of the convex portions equal to or less than 15 μm, a drop of the luminance of a liquid crystal display apparatus caused by provision of the convex portions on the rear face side of a lens sheet can be suppressed.

Evaluation Results of the Height of the Convex Portions at Which the 1% Area is Exhibited From the evaluation result of the sliding test and the evaluation result of the external appearance blurring (refer to FIGS. 32 and 42), it can be recognized that, by setting the height of the convex portions at which the convex portion area occupies 1% equal to or greater than 1 μm, formation of scars on the surface of the diffuser by the rear face of the lens sheet can be prevented and the external appearance blurring caused by interference of the diffuser provided on the rear face side of the lens sheet with the flat face portion can be improved.

Further, from the evaluation result of the front face luminance relative value (refer to FIG. 41), it can be recognized that, by setting the height of the convex portions at which the convex portion area occupies 1% equal to or smaller than 7 μm, a drop of the luminance of a liquid crystal display apparatus caused by provision of the convex portions on the rear face side of a lens sheet can be suppressed.

Evaluation Result of the Haze

From the evaluation result of the front face luminance relative value (refer to FIG. 43), it can be recognized that, by setting the haze of a lens sheet in a state wherein no lens pattern is formed equal to or lower than 60%, a drop of the luminance of a liquid crystal display apparatus caused by provision of the convex portions on the rear face side of a lens sheet can be suppressed. Further, it can be recognized that, by setting the haze of a lens sheet in a state wherein no lens pattern is formed equal to or lower than 20%, a drop of the luminance of a liquid crystal display apparatus caused by provision of the convex portions on the rear face side of a lens sheet can be further suppressed.

Evaluation Result of the Average Inclination Gradient

From the evaluation result of the front face luminance relative value (refer to FIG. 44), it can be recognized that, by setting the average inclination gradient δa in a state wherein no lens pattern is formed equal to or higher than 0.25 (rad), a drop of the luminance of a lens sheet can be suppressed.

As described above, by providing convex portions on the rear face of a lens sheet, improvement in the external appearance blurring and improvement in the mechanical characteristics such as a sliding characteristic can be achieved without degrading the luminance. It is considered that the reduction of the external appearance blurring is caused by prevention of sticking to the diffuser by the convex portions. Further, it is considered that the improvement of the sliding test characteristic is caused by reduction of the friction upon sliding by the convex portion components.

The present invention is not restricted to the embodiment of the present invention described above, but various modifications and applications can be made without departing from the spirit and scope of the present invention. For example, a similar improvement effect of the front face luminance can be anticipated by disposition above a light guide plate.

Further, similar effects can be exhibited even where the lens sheet is disposed on the light emitting side face of the backlight from a light guide plate within a display unit which utilizes liquid crystal or even where the lens sheet is disposed on the incidence side front portion of a liquid crystal display panel.

Further, while, in the embodiment described above, a case wherein one lens sheet is provided in a backlight and a liquid crystal display apparatus is described as an example, a plurality of lens sheets may be provided.

Further, the backlight 1 is not limited to the one embodiment described hereinabove, but may be configured such that it includes the lens sheet 14 above a light guide plate, an EL (Electro Luminescence) light emitting face, a planar light emitting CCFL (Cold Cathode Fluorescent Tube) or some other light source. Also in this instance, a front face luminance improvement effect similar to that of the one embodiment described hereinabove can be achieved.

While, in the one embodiment described hereinabove, a case wherein a lens sheet is produced by a melt extrusion method is described, the lens sheet may be produced by a thermal press method. For example, a bead blasting or sand blasting machine on the market is used and the type of particles, particle size and shot speed are varied to produce a concave and convex shape on the face of the press plate for forming the rear face. A lens sheet can be obtained by vacuum thermoforming a thermoplastic resin using the press plate obtained in this manner and a press plate on which a concave and convex shape for forming cylindrical lens elements.

A production method of the lens sheet by a melt extrusion method is described more particularly.

First, glass beads having a particle size are blasted into an SUS material plate on the market having a thickness t of, for example, t=1 mm by a bead blast processing machine by Fuji Manufacturing Co., Ltd. to produce a press plate for forming the rear face side of a lens sheet. Thereupon, the blasting angle is set, for example, to an angle of approximately 30° with respect to a perpendicular direction to the SUS material plate.

Then, a sheet of a thickness t of t=200 μm made of, for example, polycarbonate or the like is sandwiched between the press sheet obtained in such a manner as described above and a metal mold having a lens pattern provided thereon and is press formed for 10 minutes at 170° C.×10 kg/cm², for example, by a vacuum thermal press machine, whereafter it is cooled to a room temperature. An object lens sheet is obtained thereby.

Further, while, in the one embodiment described hereinabove, an example wherein the convex portions 16 are provided on the cylindrical face of the elastic roll 24 to form the convex portions 16 on the rear face of the lens sheet 14 is described as an example, the shape of the cylindrical face of the elastic roll 24 is not limited to this. For example, where the rear face of the lens sheet 14 is to be formed as a flat face, the cylindrical face of the elastic roll 24 may be formed as a mirror face.

Further, while, in the one embodiment described hereinabove, an example wherein the convex portions 16 are provided on the cylindrical face of the elastic roll 24 to form the convex portions 16 on the rear face of the lens sheet 14 is described as an example, the shape of the cylindrical face of the elastic roll is not limited to this. For example, where the rear face of the lens sheet 14 is to be formed as a flat face, the cylindrical face of the elastic roll 24 may be formed as a mirror face.

Further, in the one embodiment described hereinabove, the liquid crystal display apparatus may further includes a protect sheet for preventing damage to the lens sheet 14. One of principal faces of the protect sheet is formed as a flat face while the other principal face is formed as a concave and convex face having convex portions provided thereon similarly to the rear face of the lens sheet 14. Where convex portions are to be formed only on one face of the protect sheet, the protect sheet is provided on the liquid crystal display apparatus in such a manner that the face of the protect sheet on which the convex portions are provided is opposed to the light sources 12. It is to be noted that the convex portions may be provided on the opposite faces of the protect sheet.

The protect sheet may be provided, for example, between the lens sheet 14 and the reflection type polarizer 18. Or, a protect sheet may be provided in place of the reflection type polarizer 18.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An optical sheet comprising cylindrical lens elements which have a hyperboloidal face or a paraboloidal face and are provided successively in a row on one of principal faces of said optical sheet, wherein a Z axis is taken in parallel to a normal line direction to said optical sheet and an X axis is taken in a direction of the row of said cylindrical lens elements, and wherein a cross sectional shape of said cylindrical lenses satisfies the following expression:

$$Z=X^2/(R+\sqrt{(R^2-(1+K)X^2)})$$

where R is a radius of curvature of a distal end vertex, and K is a conic constant; and convex portions having a height equal to or greater than 0.20 µm from an average central plane are further provided on the other principal face side opposite to the one principal face on which said cylindrical lens elements, wherein a density of said convex portions is equal to or higher than 70/mm² but equal to or lower than 500/mm².

2. The optical sheet according to claim 1, wherein the radius R of curvature, the conic constant K and a configuration unit width D satisfy the following numerical ranges:

$$0<R<D$$

$$-4<K\leq-1.$$

3. The optical sheet according to claim 1, wherein the radius R of curvature and the conic constant K satisfy the following numerical ranges:

$$0<R<D/2$$

$$-3<K-1.$$

4. The optical sheet according to claim 1, wherein the radius R of curvature and the conic constant K satisfy the following numerical ranges:

$$0<R<2D/5$$

$$-3<K\leq-1.$$

5. The optical sheet according to claim 1, wherein the average distance between said convex portions is equal to or greater than 50 µm but equal to or smaller than 120 µm.

6. The optical sheet according to claim 1, wherein said convex portions are provided such that, in a state wherein said cylindrical lens elements are not formed, a cloudiness degree of said optical sheet is equal to or lower than 60%.

7. The optical sheet according to claim 1, wherein said convex portions are provided such that, in a state wherein said cylindrical lens elements are not formed, the cloudiness degree of said optical sheet is equal to or lower than 20%.

8. The optical sheet according to claim 1, wherein the ten-point average roughness SRz of said convex portions is equal to or higher than 1 µm but equal to or lower than 15 µm.

9. The optical sheet according to claim 1, wherein the height of said convex portions at which the convex portion area occupies 1% is equal to or greater than 1 µm but equal to or smaller than 7 µm.

10. The optical sheet according to claim 1, wherein
the average inclination gradient of the face on the side on which said convex portions are provided is equal to or greater than 0.25.

11. The optical sheet according to claim 1, wherein the convex portions are provided on an other principal face side opposite to the one principal face.

12. The optical sheet according to claim 1, wherein the optical sheet is molded from the transparent thermoplastic resin.

13. The optical sheet according to claim 1, wherein at least one release agent is added to the thermoplastic resin in an amount equal to or greater than 0.02 wt % but equal to or less than 0.4%.

14. The optical sheet according to claim 1, wherein at least one ultraviolet absorbing agent or light stabilizer is contained in the thermoplastic resin in an amount equal to or greater than 0.02% but equal to or lower than 0.4 wt %.

15. The optical sheet according to claim 1, wherein the optical sheet is an integrated molded article, and is formed by thermal transfer.

16. An optical sheet comprising cylindrical lens elements which have a hyperboloidal face or a paraboloidal face and are provided successively in a row on one of principal faces of said optical sheet, wherein a Z axis is taken in parallel to a normal line direction to said optical sheet and an X axis is taken in a direction of the row of said cylindrical lens elements, and wherein a cross sectional shape of said cylindrical lenses satisfies the following expression:

$$Z=X^2/(R+\sqrt{(R^2-(1+K)X^2)})$$

where R is a radius of curvature of a distal end vertex, and K is a conic constant;

further comprising convex portions having a height equal to or greater than 0.20 µm from an average central plane on a principal face side opposite to the principal face on which said cylindrical lens elements are provided, wherein the average distance between said convex portions is equal to or greater than 50 μm but equal to or smaller than 120 μm.

17. An optical sheet comprising cylindrical lens elements which have a hyperboloidal face or a paraboloidal face and are provided successively in a row on one of principal faces of said optical sheet,
- wherein a Z axis is taken in parallel to a normal line direction to said optical sheet and an X axis is taken in a direction of the row of said cylindrical lens elements, and wherein a cross sectional shape of said cylindrical lenses satisfies the following expression:

$$Z=X^2/(R\sqrt{(R^2-(1+K)X^2)})$$

- where R is a radius of curvature of a distal end vertex, and K is a conic constant;
- further comprising convex portions on the principal face side opposite to the principal face on which said cylindrical lens elements are provided, wherein said convex portions are provided such that, in a state wherein said cylindrical lens elements are not formed, a cloudiness degree of said optical sheet is equal to or lower than 60%.

18. An optical sheet comprising cylindrical lens elements which have a hyperboloidal face or a paraboloidal face and are provided successively in a row on one of principal faces of said optical sheet,
- wherein a Z axis is taken in parallel to a normal line direction to said optical sheet and an X axis is taken in a direction of the row of said cylindrical lens elements, and wherein a cross sectional shape of said cylindrical lenses satisfies the following expression:

$$Z=X^2/(R+\sqrt{(R^2-(1+K)X^2)})$$

- where R is a radius of curvature of a distal end vertex, and K is a conic constant;
- further comprising convex portions on the principal face side opposite to the principal face on which said cylindrical lens elements are provided, wherein said convex portions are provided such that, in a state wherein said cylindrical lens elements are not formed, the cloudiness degree of said optical sheet is equal to or lower than 20%.

19. An optical sheet comprising cylindrical lens elements which have a hyperboloidal face or a paraboloidal face and are provided successively in a row on one of principal faces of said optical sheet,
- wherein a Z axis is taken in parallel to a normal line direction to said optical sheet and an X axis is taken in a direction of the row of said cylindrical lens elements, and wherein a cross sectional shape of said cylindrical lenses satisfies the following expression:

$$Z=X^2/(R+\sqrt{(R^2-(1+K)X^2)})$$

- where R is a radius of curvature of a distal end vertex, and K is a conic constant;
- further comprising convex portions on the principal face side opposite to the principal face on which said cylindrical lens elements are provided, wherein said convex portions are provided such that, in a state wherein the ten-point average roughness SRz of said convex portions is equal to or higher than 1 μm but equal to or lower than 15 μm.

20. An optical sheet comprising cylindrical lens elements which have a hyperboloidal face or a paraboloidal face and are provided successively in a row on one of principal faces of said optical sheet,
- wherein a Z axis is taken in parallel to a normal line direction to said optical sheet and an X axis is taken in a direction of the row of said cylindrical lens elements, and wherein a cross sectional shape of said cylindrical lenses satisfies the following expression:

$$Z=X^2/(R+\sqrt{(R^2-(1+K)X^2)})$$

- where R is a radius of curvature of a distal end vertex, and K is a conic constant;
- further comprising convex portions on the principal face side opposite to the one principal face on which said cylindrical lens elements are provided, wherein the height of said convex portions at which the convex portion area occupies 1% is equal to or greater than 1 μm but equal to or smaller than 7 μm.

21. An optical sheet comprising cylindrical lens elements which have a hyperboloidal face or a paraboloidal face and are provided successively in a row on one of principal faces of said optical sheet,
- wherein a Z axis is taken in parallel to a normal line direction to said optical sheet and an X axis is taken in a direction of the row of said cylindrical lens elements, and wherein a cross sectional shape of said cylindrical lenses satisfies the following expression:

$$Z=X^2/(R+\sqrt{(R^2-(1+K)X^2)})$$

- where R is a radius of curvature of a distal end vertex, and K is a conic constant;
- further comprising convex portions on the principal face side opposite to the principal face on which said cylindrical lens elements are provided, wherein the average inclination gradient of the face on the side on which said convex portions are provided is equal to or greater than 0.25.

22. A backlight comprising:
a light source for emitting illumination light; and
an optical sheet for raising a directivity of a illumination light emitted from said light source;
said optical sheet has, provided on one of principal faces thereof, cylindrical lens elements which have a hyperboloidal face or a paraboloidal face and are provided successively in a row;
where a Z axis is taken in parallel to a normal line direction to said optical sheet and an X axis is taken in a direction of the row of said cylindrical lens elements, a cross sectional shape of said cylindrical lenses satisfies the following expression:

$$Z=X^2/(R+\sqrt{(R^2-(1+K)X^2)})$$

where R is the radius of curvature of a distal end vertex, and K is a conic constant;
further comprising convex portions having a height equal to or greater than 0.20 μm from an average central plane and further provided on the other principal face side opposite to the one principal face on which said cylindrical lens elements, wherein a density of said convex portions is equal to or higher than 70/mm$^2$ but equal to or lower than 500/mm$^2$.

23. A backlight comprising:
a light source for emitting illumination light; and
an optical sheet for raising a directivity of a illumination light emitted from said light source;
said optical sheet has, provided on one of principal faces thereof, cylindrical lens elements which have a hyperboloidal face or a paraboloidal face and are provided successively in a row;

where a Z axis is taken in parallel to a normal line direction to said optical sheet and an X axis is taken in a direction of the row of said cylindrical lens elements, a cross sectional shape of said cylindrical lenses satisfies the following expression:

$$Z=X^2/(R+\sqrt{(R^2-(1+K)X^2)})$$

where R is the radius of curvature of a distal end vertex, and K is a conic constant; further comprising convex portions having a height equal to or greater than 0.20 μm from an average central plane on a principal face side opposite to the principal face on which said cylindrical lens elements are provided, wherein the average distance between said convex portions is equal to or greater than 50 μm but equal to or smaller than 120 μm.

24. A backlight comprising:
a light source for emitting illumination light; and
an optical sheet for raising a directivity of a illumination light emitted from said light source;
said optical sheet has, provided on one of principal faces thereof, cylindrical lens elements which have a hyperboloidal face or a paraboloidal face and are provided successively in a row;
where a Z axis is taken in parallel to a normal line direction to said optical sheet and an X axis is taken in a direction of the row of said cylindrical lens elements, a cross sectional shape of said cylindrical lenses satisfies the following expression:

$$Z=X^2/(R+\sqrt{(R^2-(1+K)X^2)})$$

where R is the radius of curvature of a distal end vertex, and K is a conic constant; further comprising convex portions on the principal face side opposite to the principal face on which said cylindrical lens elements are provided, wherein said convex portions are provided such that, in a state wherein said cylindrical lens elements are not formed, a cloudiness degree of said optical sheet is equal to or lower than 60%.

25. A backlight comprising:
a light source for emitting illumination light; and
an optical sheet for raising a directivity of a illumination light emitted from said light source;
said optical sheet has, provided on one of principal faces thereof, cylindrical lens elements which have a hyperboloidal face or a paraboloidal face and are provided successively in a row;
where a Z axis is taken in parallel to a normal line direction to said optical sheet and an X axis is taken in a direction of the row of said cylindrical lens elements, a cross sectional shape of said cylindrical lenses satisfies the following expression:

$$Z=X^2/(R+\sqrt{(R^2-(1+K)X^2)})$$

where R is the radius of curvature of a distal end vertex, and K is a conic constant; further comprising convex portions on the principal face side opposite to the principal face on which said cylindrical lens elements are provided, wherein said convex portions are provided such that, in a state wherein said cylindrical lens elements are not formed, the cloudiness degree of said optical sheet is equal to or lower than 20%.

26. A backlight comprising:
a light source for emitting illumination light; and
an optical sheet for raising a directivity of a illumination light emitted from said light source;
said optical sheet has, provided on one of principal faces thereof, cylindrical lens elements which have a hyperboloidal face or a paraboloidal face and are provided successively in a row;
where a Z axis is taken in parallel to a normal line direction to said optical sheet and an X axis is taken in a direction of the row of said cylindrical lens elements, a cross sectional shape of said cylindrical lenses satisfies the following expression:

$$Z=X^2/(R+\sqrt{(R^2-(1+K)X^2)})$$

where R is the radius of curvature of a distal end vertex, and K is a conic constant; further comprising convex portions on the principal face side opposite to the principal face on which said cylindrical lens elements are provided, wherein the ten-point average roughness SRz of said convex portions is equal to or higher than 1 μm but equal to or lower than 15 μm.

27. A backlight comprising:
a light source for emitting illumination light; and
an optical sheet for raising a directivity of a illumination light emitted from said light source;
said optical sheet has, provided on one of principal faces thereof, cylindrical lens elements which have a hyperboloidal face or a paraboloidal face and are provided successively in a row;
where a Z axis is taken in parallel to a normal line direction to said optical sheet and an X axis is taken in a direction of the row of said cylindrical lens elements, a cross sectional shape of said cylindrical lenses satisfies the following expression:

$$Z=X^2/(R+\sqrt{(R^2-(1+K)X^2)})$$

where R is the radius of curvature of a distal end vertex, and K is a conic constant; further comprising convex portions on the principal face side opposite to the one principal face on which said cylindrical lens elements are provided, wherein the height of said convex portions at which the convex portion area occupies 1% is equal to or greater than 1 μm but equal to or smaller than 7 μm.

28. A backlight comprising:
a light source for emitting illumination light; and
an optical sheet for raising a directivity of a illumination light emitted from said light source;
said optical sheet has, provided on one of principal faces thereof, cylindrical lens elements which have a hyperboloidal face or a paraboloidal face and are provided successively in a row;
where a Z axis is taken in parallel to a normal line direction to said optical sheet and an X axis is taken in a direction of the row of said cylindrical lens elements, a cross sectional shape of said cylindrical lenses satisfies the following expression:

$$Z=X^2/(R+\sqrt{(R^2-(1+K)X^2)})$$

where R is the radius of curvature of a distal end vertex, and K is a conic constant; further comprising convex portions on the principal face side opposite to the principal face on which said cylindrical lens elements are provided, wherein
the average inclination gradient of the face on the side on which said convex portions are provided is equal to or greater than 0.25.

29. A liquid crystal display apparatus, comprising:
a light source for emitting illumination light;
an optical sheet for raising the directivity of a illumination light emitted from said backlight; and a liquid crystal panel for displaying an image based on the illumination light emitted from said optical sheet;

said optical sheet has, provided on one of principal faces thereof, cylindrical lens elements which have a hyperboloidal face or a paraboloidal face and are provided successively in a row;

where a Z axis is taken in parallel to a normal line direction to said optical sheet and an X axis is taken in a direction of the row of said cylindrical lens elements, a cross sectional shape of said cylindrical lenses satisfies the following expression:

$$Z=X^2/(R+\sqrt{(R^2-(1+K)X^2)})$$

where R is the radius of curvature of a distal end vertex, and K is a conic constant;

further comprising convex portions having a height equal to or greater than 0.20 μm from an average central plane are further provided on the other principal face side opposite to the one principal face on which said cylindrical lens elements, wherein a density of said convex portions is equal to or higher than 70/mm² but equal to or lower than 500/mm².

30. A liquid crystal display apparatus, comprising:
a light source for emitting illumination light;
an optical sheet for raising the directivity of a illumination light emitted from said backlight; and
a liquid crystal panel for displaying an image based on the illumination light emitted from said optical sheet;
said optical sheet has, provided on one of principal faces thereof, cylindrical lens elements which have a hyperboloidal face or a paraboloidal face and are provided successively in a row;
where a Z axis is taken in parallel to a normal line direction to said optical sheet and an X axis is taken in a direction of the row of said cylindrical lens elements, a cross sectional shape of said cylindrical lenses satisfies the following expression:

$$Z=X^2/(R+\sqrt{(R^2-(1+K)X^2)})$$

where R is the radius of curvature of a distal end vertex, and K is a conic constant;

further comprising convex portions having a height equal to or greater than 0.20 μm from an average central plane on a principal face side opposite to the principal face on which said cylindrical lens elements are provided, wherein the average distance between said convex portions is equal to or greater than 50 μm but equal to or smaller than 120 μm.

31. A liquid crystal display apparatus, comprising:
a light source for emitting illumination light;
an optical sheet for raising the directivity of a illumination light emitted from said backlight; and
a liquid crystal panel for displaying an image based on the illumination light emitted from said optical sheet;
said optical sheet has, provided on one of principal faces thereof, cylindrical lens elements which have a hyperboloidal face or a paraboloidal face and are provided successively in a row;
where a Z axis is taken in parallel to a normal line direction to said optical sheet and an X axis is taken in a direction of the row of said cylindrical lens elements, a cross sectional shape of said cylindrical lenses satisfies the following expression:

$$Z=X^2/(R+\sqrt{(R^2-(1+K)X^2)})$$

where R is the radius of curvature of a distal end vertex, and K is a conic constant;

further comprising convex portions on the principal face side opposite to the principal face on which said cylindrical lens elements are provided, wherein said convex portions are provided such that, in a state wherein said cylindrical lens elements are not formed, a cloudiness degree of said optical sheet is equal to or lower than 60%.

32. A liquid crystal display apparatus, comprising:
a light source for emitting illumination light;
an optical sheet for raising the directivity of a illumination light emitted from said backlight; and
a liquid crystal panel for displaying an image based on the illumination light emitted from said optical sheet;
said optical sheet has, provided on one of principal faces thereof, cylindrical lens elements which have a hyperboloidal face or a paraboloidal face and are provided successively in a row;
where a Z axis is taken in parallel to a normal line direction to said optical sheet and an X axis is taken in a direction of the row of said cylindrical lens elements, a cross sectional shape of said cylindrical lenses satisfies the following expression:

$$Z=X^2/(R+\sqrt{(R^2-(1+K)X^2)})$$

where R is the radius of curvature of a distal end vertex, and K is a conic constant;

further comprising convex portions on the principal face side opposite to the principal face on which said cylindrical lens elements are provided, wherein said convex portions are provided such that, in a state wherein said cylindrical lens elements are not formed, the cloudiness degree of said optical sheet is equal to or lower than 20%.

33. A liquid crystal display apparatus, comprising:
a light source for emitting illumination light;
an optical sheet for raising the directivity of a illumination light emitted from said backlight; and
a liquid crystal panel for displaying an image based on the illumination light emitted from said optical sheet;
said optical sheet has, provided on one of principal faces thereof, cylindrical lens elements which have a hyperboloidal face or a paraboloidal face and are provided successively in a row;
where a Z axis is taken in parallel to a normal line direction to said optical sheet and an X axis is taken in a direction of the row of said cylindrical lens elements, a cross sectional shape of said cylindrical lenses satisfies the following expression:

$$Z=X^2/(R+\sqrt{(R^2-(1+K)X^2)})$$

where R is the radius of curvature of a distal end vertex, and K is a conic constant;

further comprising convex portions on the principal face side opposite to the principal face on which said cylindrical lens elements are provided, wherein the ten-point average roughness SRz of said convex portions is equal to or higher than 1 μm but equal to or lower than 15 μm.

34. A liquid crystal display apparatus, comprising:
a light source for emitting illumination light;
an optical sheet for raising the directivity of a illumination light emitted from said backlight; and
a liquid crystal panel for displaying an image based on the illumination light emitted from said optical sheet;
said optical sheet has, provided on one of principal faces thereol cylindrical lens elements which have a hyperboloidal face or a paraboloidal face and are provided successively in a row;

where a Z axis is taken in parallel to a normal line direction to said optical sheet and an X axis is taken in a direction of the row of said cylindrical lens elements, a cross sectional shape of said cylindrical lenses satisfies the following expression:

$$Z=X^2/(R+\sqrt{(R^2-(1+K)X^2)})$$

where R is the radius of curvature of a distal end vertex, and K is a conic constant;

further comprising convex portions on the principal face side opposite to the one principal face on which said cylindrical lens elements are provided, wherein the height of said convex portions at which the convex portion area occupies 1% is equal to or greater than 1 μm but equal to or smaller than 7 μm.

35. A liquid crystal display apparatus, comprising:

a light source for emitting illumination light;

an optical sheet for raising the directivity of a illumination light emitted from said backlight; and a liquid crystal panel for displaying an image based on the illumination light emitted from said optical sheet;

said optical sheet has, provided on one of principal faces thereof, cylindrical lens elements which have a hyperboloidal face or a paraboloidal face and are provided successively in a row;

where a Z axis is taken in parallel to a normal line direction to said optical sheet and an X axis is taken in a direction of the row of said cylindrical lens elements, a cross sectional shape of said cylindrical lenses satisfies the following expression:

$$Z=X^2/(R+\sqrt{(R^2-(1+K)X^2)})$$

where R is the radius of curvature of a distal end vertex, and K is a conic constant;

further comprising convex portions on the principal face side opposite to the principal face on which said cylindrical lens elements are provided, wherein the average inclination gradient of the face on the side on which said convex portions are provided is equal to or greater than 0.25.

* * * * *